US011272327B2

(12) United States Patent
Shimoshimano et al.

(10) Patent No.: US 11,272,327 B2
(45) Date of Patent: Mar. 8, 2022

(54) MANAGEMENT DEVICE, MANAGEMENT METHOD, RECORDING MEDIUM ENCODED WITH PROGRAM CAPABLE OF PERFORMING MULTIPLE COMMUNICATION MODES

(71) Applicant: JVCKENWOOD Corporation, Yokohama (JP)

(72) Inventors: Hideo Shimoshimano, Yokohama (JP); Ichiro Shishido, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 105 days.

(21) Appl. No.: 16/783,200

(22) Filed: Feb. 6, 2020

(65) Prior Publication Data
US 2020/0252759 A1 Aug. 6, 2020

(30) Foreign Application Priority Data
Feb. 6, 2019 (JP) .............................. JP2019-019585

(51) Int. Cl.
*H04L 12/26* (2006.01)
*H04W 4/10* (2009.01)
*H04W 4/70* (2018.01)
*H04W 76/14* (2018.01)
*H04W 92/18* (2009.01)

(52) U.S. Cl.
CPC ............ *H04W 4/10* (2013.01); *H04W 4/70* (2018.02); *H04W 76/14* (2018.02); *H04W 92/18* (2013.01)

(58) Field of Classification Search
None
See application file for complete search history.

(56) References Cited

U.S. PATENT DOCUMENTS

2010/0142414 A1* 6/2010 Patel ...................... H04W 4/10
370/277
2017/0280376 A1* 9/2017 Nagahama ............ H04W 48/06

FOREIGN PATENT DOCUMENTS

JP 2011135290 A 7/2011

* cited by examiner

*Primary Examiner* — Zewdu A Beyen
(74) *Attorney, Agent, or Firm* — Brundidge & Stanger, P.C.

(57) ABSTRACT

An index calculator calculates, for a terminal device, an easiness-of-communication index indicating a degree to which a user using the terminal device recognizes communication, by using information related to the terminal device. A communication circuit receives communication request data of a first communication mode or a second communication mode from a first terminal device originating a call, the communication request data designating a second terminal device as a destination of the call. The communication circuit transmits, when the communication request data of the second communication mode is received and the easiness-of-communication index of the second terminal device meets a predetermined condition, communication request data of the first communication mode to the second terminal device.

6 Claims, 41 Drawing Sheets

| RECORD No. | POINT OF TIME OF CALL | TERMINAL DEVICE NAME AND ID OF CALLING TERMINAL DEVICE | | TERMINAL DEVICE NAME AND ID OF CALLED TERMINAL DEVICE | |
|---|---|---|---|---|---|
| 001 | 10:19:14 | FIRST TERMINAL DEVICE | 001 | THIRD TERMINAL DEVICE | 003 |
| 002 | 10:19:25 | FIRST TERMINAL DEVICE | 001 | THIRD TERMINAL DEVICE | 003 |
| 003 | 10:25:14 | FOURTH TERMINAL DEVICE | 004 | FIRST TERMINAL DEVICE | 001 |
| 004 | 10:25:25 | FIRST TERMINAL DEVICE | 001 | FOURTH TERMINAL DEVICE | 004 |
| 005 | 10:27:26 | FOURTH TERMINAL DEVICE | 004 | SECOND TERMINAL DEVICE | 002 |
| 006 | 10:28:10 | SECOND TERMINAL DEVICE | 002 | FOURTH TERMINAL DEVICE | 004 |
| 007 | 10:35:14 | THIRD TERMINAL DEVICE | 003 | FIFTH TERMINAL DEVICE | 005 |
| 008 | 10:36:10 | FIFTH TERMINAL DEVICE | 005 | THIRD TERMINAL DEVICE | 003 |
| 009 | 10:39:10 | SECOND TERMINAL DEVICE | 002 | FOURTH TERMINAL DEVICE | 004 |
| 010 | 10:40:30 | FIFTH TERMINAL DEVICE | 005 | FOURTH TERMINAL DEVICE | 004 |
| 011 | 10:47:24 | THIRD TERMINAL DEVICE | 003 | FOURTH TERMINAL DEVICE | 004 |
| 012 | 10:47:55 | FOURTH TERMINAL DEVICE | 004 | THIRD TERMINAL DEVICE | 003 |
| 013 | 10:49:14 | SECOND TERMINAL DEVICE | 002 | FIRST TERMINAL DEVICE | 001 |
| 014 | 10:49:57 | FIRST TERMINAL DEVICE | 001 | SECOND TERMINAL DEVICE | 002 |
| 015 | 10:55:10 | SECOND TERMINAL DEVICE | 002 | FIRST TERMINAL DEVICE | 001 |
| 016 | 10:56:40 | FOURTH TERMINAL DEVICE | 004 | SECOND TERMINAL DEVICE | 002 |
| 017 | 10:59:10 | SECOND TERMINAL DEVICE | 002 | FOURTH TERMINAL DEVICE | 004 |
| 018 | 10:59:58 | THIRD TERMINAL DEVICE | 003 | FOURTH TERMINAL DEVICE | 004 |
| 019 | 11:02:20 | THIRD TERMINAL DEVICE | 003 | FOURTH TERMINAL DEVICE | 004 |
| 020 | 11:03:30 | FIFTH TERMINAL DEVICE | 005 | FOURTH TERMINAL DEVICE | 004 |
| 021 | 11:08:32 | FIFTH TERMINAL DEVICE | 005 | FOURTH TERMINAL DEVICE | 004 |
| 022 | 11:09:10 | FIRST TERMINAL DEVICE | 001 | SECOND TERMINAL DEVICE | 002 |
| 023 | 11:14:32 | FIFTH TERMINAL DEVICE | 005 | THIRD TERMINAL DEVICE | 003 |
| 024 | 11:14:56 | THIRD TERMINAL DEVICE | 003 | FIFTH TERMINAL DEVICE | 005 |
| 025 | 11:16:32 | FIRST TERMINAL DEVICE | 001 | SECOND TERMINAL DEVICE | 002 |
| 026 | 11:18:36 | FIFTH TERMINAL DEVICE | 005 | FOURTH TERMINAL DEVICE | 004 |
| 027 | 11:22:30 | THIRD TERMINAL DEVICE | 003 | SECOND TERMINAL DEVICE | 002 |
| 028 | 11:25:38 | THIRD TERMINAL DEVICE | 003 | FOURTH TERMINAL DEVICE | 004 |
| 029 | 11:27:41 | THIRD TERMINAL DEVICE | 003 | FIRST TERMINAL DEVICE | 001 |
| 030 | 11:28:10 | FIFTH TERMINAL DEVICE | 005 | SECOND TERMINAL DEVICE | 002 |

| TERMINAL DEVICE NAME AND ID | | ACTIVITY STATUS MEASURE |
|---|---|---|
| FIRST TERMINAL DEVICE | 001 | 9 |
| SECOND TERMINAL DEVICE | 002 | 6 |
| THIRD TERMINAL DEVICE | 003 | 10 |
| FOURTH TERMINAL DEVICE | 004 | 3 |
| FIFTH TERMINAL DEVICE | 005 | 10 |
| ... | ... | |

364

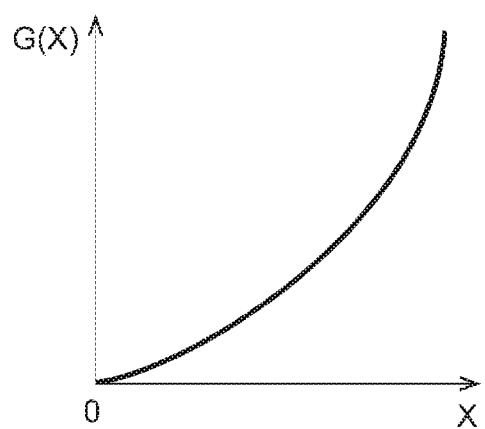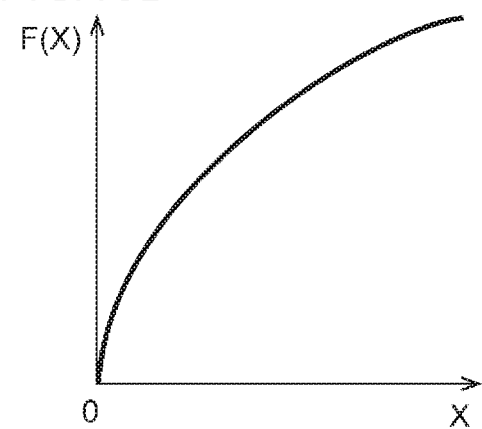
350

FIG.15

| TERMINAL DEVICE NAME AND ID | | THRESHOLD VALUE OF ACTIVITY STATUS MEASURE |
|---|---|---|
| FIRST TERMINAL DEVICE | 001 | 7 |
| SECOND TERMINAL DEVICE | 002 | 5 |
| THIRD TERMINAL DEVICE | 003 | 5 |
| FOURTH TERMINAL DEVICE | 004 | 9 |
| FIFTH TERMINAL DEVICE | 005 | 1 |
| ... | ... | |

| TERMINAL DEVICE ··· | | | | | | | | | | | | |
|---|---|---|---|---|---|---|---|---|---|---|---|---|
| year | 2016 | | | | | | | | | | | |
| FOURTH TERMINAL DEVICE | | | | | | | | | | | | 31 |
| year | 2016 | | | | | | | | | | | 0 |
| THIRD TERMINAL DEVICE | | | | | | | | | | | 31 | 3 |
| year | 2016 | | | | | | | | | | 0 | 3 |
| SECOND TERMINAL DEVICE | | | | | | | | | | 31 | 3 | 3 |
| year | 2016 | | | | | | | | | 0 | 3 | 3 |
| FIRST TERMINAL DEVICE | | | | | | | | | 31 | 3 | 3 | · |
| year | 2016 | | | | | | | | 0 | 3 | 3 | · |
| month | 10 | | | | | | | | 3 | 3 | · | 6 |
| day | 10 | 11 | 12 | 13 | 14 | 26 | 27 | 28 | 29 | 30 | 31 | 3 | 3 | · | 7 |
| 0:00:00 | 3 | 2 | 0 | 2 | 2 | 3 | 2 | 0 | 1 | 2 | 0 | 3 | 3 | · | 5 |
| 1:00:00 | 0 | 3 | 2 | 4 | 3 | 0 | 3 | 2 | 0 | 0 | 3 | 3 | · | 6 | 4 |
| 2:00:00 | 3 | 3 | 3 | 3 | 0 | 3 | 0 | 3 | 2 | 1 | 3 | 3 | · | 7 | 5 |
| 3:00:00 | 0 | 3 | 3 | 2 | 3 | 4 | 3 | 3 | 0 | 3 | 3 | · | 6 | 4 |
| 4:00:00 | 5 | 4 | 3 | 3 | 4 | 5 | 4 | 5 | 1 | 2 | 3 | · | 7 | 5 |
| ⋮ | | | | | | | | | | | | 6 | 4 |
| 20:00:00 | 6 | 7 | 6 | 5 | 8 | 7 | 7 | 6 | 5 | 8 | 6 | 5 | |
| 21:00:00 | 4 | 5 | 7 | 6 | 5 | 6 | 5 | 4 | 8 | 4 | 7 | 4 | |
| 22:00:00 | 4 | 4 | 5 | 5 | 4 | 4 | 4 | 4 | 3 | 1 | 5 | | |
| 23:00:00 | 4 | 5 | 4 | 4 | 2 | 4 | 5 | 4 | 3 | 0 | 4 | | |

| TERMINAL DEVICE NAME | TIME ZONE | AVERAGE VALUE |
|---|---|---|
| FIRST TERMINAL DEVICE | 00:00-01:00 | 2 |
| | 01:00-02:00 | 3 |
| | 02:00-03:00 | 2 |
| | 03:00-04:00 | 4 |
| | 04:00-05:00 | 6 |
| | ⋮ | ⋮ |
| | 20:00-21:00 | 6 |
| | 21:00-22:00 | 4 |
| | 22:00-23:00 | 5 |
| | 23:00-24:00 | 2 |
| SECOND TERMINAL DEVICE | 00:00-01:00 | 3 |
| | 01:00-02:00 | 3 |
| | 02:00-03:00 | 3 |
| | 03:00-04:00 | 5 |
| | 04:00-05:00 | 4 |
| | ⋮ | ⋮ |
| | 20:00-21:00 | 5 |
| | 21:00-22:00 | 2 |
| | 22:00-23:00 | 3 |
| | 23:00-24:00 | 1 |
| THIRD TERMINAL DEVICE | 00:00-01:00 | 2 |
| | 01:00-02:00 | 4 |
| | 02:00-03:00 | 2 |
| | 03:00-04:00 | 4 |
| | 04:00-05:00 | 4 |
| | ⋮ | ⋮ |
| | 20:00-21:00 | 5 |
| | 21:00-22:00 | 2 |
| | 22:00-23:00 | 1 |
| | 23:00-24:00 | 3 |
| ... | | |

| TERMINAL DEVICE NAME AND ID OF CALLING TERMINAL DEVICE | | DATE OF MEASURE-MENT | POINT OF TIME OF MEASURE-MENT | CURRENT POSITION (LATITUDE, LONGITUDE) | NOISE LEVEL(dB) |
|---|---|---|---|---|---|
| FIRST TERMINAL DEVICE | 001 | 2018/6/1 | 10:19:14 | (Na, Ea) | 55 |

FIG.24

| TERMINAL DEVICE NAME AND ID | | POINT OF TIME OF MEASUREMENT | CURRENT POSITION (LATITUDE, LONGITUDE) | NOISE LEVEL (dB) |
|---|---|---|---|---|
| FIRST TERMINAL DEVICE | 001 | 10:19:14 | (Na, Ea) | 55 |
| SECOND TERMINAL DEVICE | 002 | 10:19:51 | (Nb, Eb) | 42 |
| THIRD TERMINAL DEVICE | 003 | 10:19:17 | (Nc, Ec) | 67 |
| FOURTH TERMINAL DEVICE | 004 | 10:19:34 | (Nd, Ed) | 41 |
| FIFTH TERMINAL DEVICE | 005 | 10:19:18 | (Ne, Ee) | 65 |
| SIXTH TERMINAL DEVICE | 006 | 10:19:22 | (Nf, Ef) | 48 |
| | | . . . . . . . . . . . . . . . . | | |
| | | . . . . . . . . . . . . . . . . | | |
| | | . . . . . . . . . . . . . . . . | | |

| TERMINAL DEVICE NAME AND ID | | COMMUNICABLENESS STATUS |
|---|---|---|
| FIRST TERMINAL DEVICE | 001 | 0 |
| SECOND TERMINAL DEVICE | 002 | 1 |
| THIRD TERMINAL DEVICE | 003 | 0 |
| FOURTH TERMINAL DEVICE | 004 | 1 |
| FIFTH TERMINAL DEVICE | 005 | 1 |
| SIXTH TERMINAL DEVICE | 006 | 1 |
| . . . . . . . . . . . . . . . . . . . | | |
| . . . . . . . . . . . . . . . . . . . | | |
| . . . . . . . . . . . . . . . . . . . | | |

| TERMINAL DEVICE NAME AND ID | | DATE OF MEASUREMENT | POINT OF TIME OF MEASUREMENT | CURRENT POSITION (LATITUDE, LONGITUDE) | NOISE LEVEL (dB) |
|---|---|---|---|---|---|
| ⋮ | ⋮ | ⋮ | ⋮ | ⋮ | ⋮ |
| 3RD TERMINAL DEVICE | 003 | 2018/6/1 | 10:19:17 | (Nc1, Ec1) | 67 |
| ⋮ | ⋮ | ⋮ | ⋮ | ⋮ | ⋮ |
| 5TH TERMINAL DEVICE | 005 | 2018/6/1 | 10:19:18 | (Nc1, Ec1) | 58 |
| ⋮ | ⋮ | ⋮ | ⋮ | ⋮ | ⋮ |
| 3RD TERMINAL DEVICE | 003 | 2018/6/1 | 10:20:17 | (Nc2, Ec2) | 66 |
| ⋮ | ⋮ | ⋮ | ⋮ | ⋮ | ⋮ |
| 5TH TERMINAL DEVICE | 005 | 2018/6/1 | 10:20:18 | (Ne2, Ee2) | 69 |
| ⋮ | ⋮ | ⋮ | ⋮ | ⋮ | ⋮ |
| 3RD TERMINAL DEVICE | 003 | 2018/6/1 | 10:21:17 | (Nc3, Ec3) | 66 |
| ⋮ | ⋮ | ⋮ | ⋮ | ⋮ | ⋮ |
| 5TH TERMINAL DEVICE | 005 | 2018/6/1 | 10:21:18 | (Ne3, Ee3) | 69 |
| ⋮ | ⋮ | ⋮ | ⋮ | ⋮ | ⋮ |
| 3RD TERMINAL DEVICE | 003 | 2018/6/1 | 10:22:17 | (Nc4, Ec4) | 69 |
| ⋮ | ⋮ | ⋮ | ⋮ | ⋮ | ⋮ |
| 5TH TERMINAL DEVICE | 005 | 2018/6/1 | 10:22:18 | (Ne4, Ee4) | 70 |
| ⋮ | ⋮ | ⋮ | ⋮ | ⋮ | ⋮ |
| 3RD TERMINAL DEVICE | 003 | 2018/6/1 | 10:23:17 | (Nc5, Ec5) | 69 |
| ⋮ | ⋮ | ⋮ | ⋮ | ⋮ | ⋮ |
| 5TH TERMINAL DEVICE | 005 | 2018/6/1 | 10:23:18 | (Ne5, Ee5) | 78 |
| ⋮ | ⋮ | ⋮ | ⋮ | ⋮ | ⋮ |
| 3RD TERMINAL DEVICE | 003 | 2018/6/1 | 10:24:17 | (Nc6, Ec6) | 72 |
| ⋮ | ⋮ | ⋮ | ⋮ | ⋮ | ⋮ |
| 5TH TERMINAL DEVICE | 005 | 2018/6/1 | 10:24:18 | (Ne6, Ee6) | 80 |
| ⋮ | ⋮ | ⋮ | ⋮ | ⋮ | ⋮ |
| 3RD TERMINAL DEVICE | 003 | 2018/6/1 | 10:25:17 | (Nc7, Ec7) | 71 |
| ⋮ | ⋮ | ⋮ | ⋮ | ⋮ | ⋮ |
| 5TH TERMINAL DEVICE | 005 | 2018/6/1 | 10:25:18 | (Ne7, Ee7) | 79 |
| ⋮ | ⋮ | ⋮ | ⋮ | ⋮ | ⋮ |

| DATE OF MEASUREMENT | POINT OF TIME OF MEASUREMENT | CURRENT POSITION (LATITUDE, LONGITUDE) | NOISE LEVEL(dB) |
|---|---|---|---|
| 2018/6/1 | 10:19:17 | (Nc1, Ec1) | 67 |
| 2018/6/1 | 10:20:17 | (Ne2, Ee2) | 66 |
| 2018/6/1 | 10:20:18 | (Ne2, Ee2) | 69 |
| 2018/6/1 | 10:21:17 | (Nc3, Ec3) | 66 |
| 2018/6/1 | 10:21:18 | (Ne3, Ee3) | 69 |
| 2018/6/1 | 10:22:17 | (Nc4, Ec4) | 69 |
| 2018/6/1 | 10:22:18 | (Ne4, Ee4) | 70 |
| 2018/6/1 | 10:23:17 | (Nc5, Ec5) | 69 |
| 2018/6/1 | 10:23:18 | (Ne5, Ee5) | 78 |
| 2018/6/1 | 10:24:17 | (Nc6, Ec6) | 72 |
| 2018/6/1 | 10:24:18 | (Ne6, Ee6) | 80 |
| 2018/6/1 | 10:25:17 | (Nc7, Ec7) | 71 |
| 2018/6/1 | 10:25:18 | (Ne7, Ee7) | 79 |

340

FIG.30
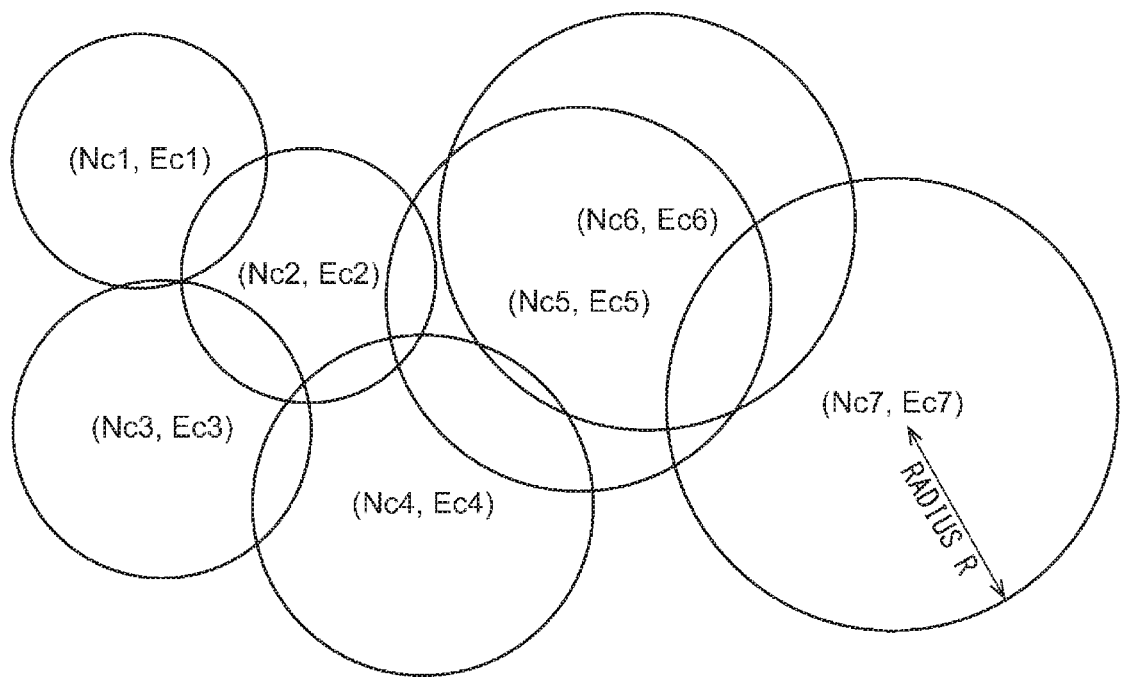
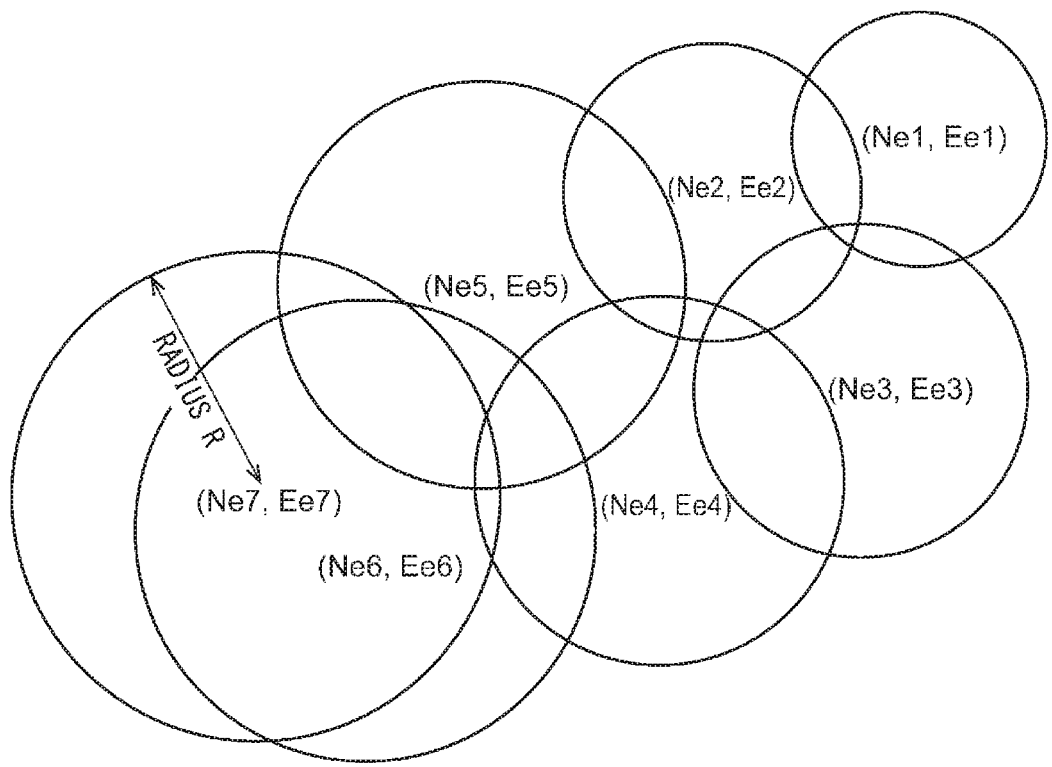
340

FIG.34

| TERMINAL DEVICE NAME AND ID | | DATE OF MEASUREMENT | POINT OF TIME OF MEASUREMENT | CURRENT POSITION (LATITUDE, LONGITUDE) |
|---|---|---|---|---|
| FIRST TERMINAL DEVICE | 001 | 2018/6/1 | 10:19:14 | (Na, Ea) |

FIG.37

| TERMINAL DEVICE NAME AND ID | | DATE OF MEASUREMENT | POINT OF TIME OF MEASUREMENT | CURRENT POSITION (LATITUDE, LONGITUDE) |
|---|---|---|---|---|
| 1ST TERMINAL DEVICE | 001 | 2018/6/1 | 10:19:14 | (Na1, Ea1) |
| 2ND TERMINAL DEVICE | 002 | 2018/6/1 | 10:19:51 | (Nb1, Eb1) |
| 3RD TERMINAL DEVICE | 003 | 2018/6/1 | 10:19:17 | (Nc1, Ec1) |
| 4TH TERMINAL DEVICE | 004 | 2018/6/1 | 10:19:34 | (Nd1, Ed1) |
| 5TH TERMINAL DEVICE | 005 | 2018/6/1 | 10:19:18 | (Ne1, Ee1) |
| 6TH TERMINAL DEVICE | 006 | 2018/6/1 | 10:19:22 | (Nf1, Ef1) |
| 1ST TERMINAL DEVICE | 001 | 2018/6/1 | 10:20:14 | (Na2, Ea2) |
| 2ND TERMINAL DEVICE | 002 | 2018/6/1 | 10:20:51 | (Nb2, Eb2) |
| 3RD TERMINAL DEVICE | 003 | 2018/6/1 | 10:20:17 | (Nc2, Ec2) |
| 4TH TERMINAL DEVICE | 004 | 2018/6/1 | 10:20:34 | (Nd2, Ed2) |
| 5TH TERMINAL DEVICE | 005 | 2018/6/1 | 10:20:18 | (Ne2, Ee2) |
| 6TH TERMINAL DEVICE | 006 | 2018/6/1 | 10:20:22 | (Nf2, Ef2) |
| 1ST TERMINAL DEVICE | 001 | 2018/6/1 | 10:21:14 | (Na3, Ea3) |
| 2ND TERMINAL DEVICE | 002 | 2018/6/1 | 10:21:51 | (Nb3, Eb3) |
| 3RD TERMINAL DEVICE | 003 | 2018/6/1 | 10:21:17 | (Nc3, Ec3) |
| 4TH TERMINAL DEVICE | 004 | 2018/6/1 | 10:21:34 | (Nd3, Ed3) |
| 5TH TERMINAL DEVICE | 005 | 2018/6/1 | 10:21:18 | (Ne3, Ee3) |
| 6TH TERMINAL DEVICE | 006 | 2018/6/1 | 10:21:22 | (Nf3, Ef3) |
| 1ST TERMINAL DEVICE | 001 | 2018/6/1 | 10:22:14 | (Na4, Ea4) |
| 2ND TERMINAL DEVICE | 002 | 2018/6/1 | 10:22:51 | (Nb4, Eb4) |
| 3RD TERMINAL DEVICE | 003 | 2018/6/1 | 10:22:17 | (Nc4, Ec4) |
| 4TH TERMINAL DEVICE | 004 | 2018/6/1 | 10:22:34 | (Nd4, Ed4) |
| 5TH TERMINAL DEVICE | 005 | 2018/6/1 | 10:22:18 | (Ne4, Ee4) |
| 6TH TERMINAL DEVICE | 006 | 2018/6/1 | 10:22:22 | (Nf4, Ef4) |
| 1ST TERMINAL DEVICE | 001 | 2018/6/1 | 10:23:14 | (Na5, Ea5) |
| 2ND TERMINAL DEVICE | 002 | 2018/6/1 | 10:23:51 | (Nb5, Eb5) |
| 3RD TERMINAL DEVICE | 003 | 2018/6/1 | 10:23:17 | (Nc5, Ec5) |
| 4TH TERMINAL DEVICE | 004 | 2018/6/1 | 10:23:34 | (Nd5, Ed5) |
| 5TH TERMINAL DEVICE | 005 | 2018/6/1 | 10:23:18 | (Ne5, Ee5) |
| 6TH TERMINAL DEVICE | 006 | 2018/6/1 | 10:23:22 | (Nf5, Ef5) |
| 1ST TERMINAL DEVICE | 001 | 2018/6/1 | 10:24:14 | (Na6, Ea6) |
| 2ND TERMINAL DEVICE | 002 | 2018/6/1 | 10:24:51 | (Nb6, Eb6) |
| 3RD TERMINAL DEVICE | 003 | 2018/6/1 | 10:24:17 | (Nc6, Ec6) |
| 4TH TERMINAL DEVICE | 004 | 2018/6/1 | 10:24:34 | (Nd6, Ed6) |
| 5TH TERMINAL DEVICE | 005 | 2018/6/1 | 10:24:18 | (Ne6, Ee6) |
| 6TH TERMINAL DEVICE | 006 | 2018/6/1 | 10:24:22 | (Nf6, Ef6) |
| 1ST TERMINAL DEVICE | 001 | 2018/6/1 | 10:25:14 | (Na7, Ea7) |
| 2ND TERMINAL DEVICE | 002 | 2018/6/1 | 10:25:51 | (Nb7, Eb7) |
| 3RD TERMINAL DEVICE | 003 | 2018/6/1 | 10:25:17 | (Nc7, Ec7) |
| 4TH TERMINAL DEVICE | 004 | 2018/6/1 | 10:25:34 | (Nd7, Ed7) |
| 5TH TERMINAL DEVICE | 005 | 2018/6/1 | 10:25:18 | (Ne7, Ee7) |
| 6TH TERMINAL DEVICE | 006 | 2018/6/1 | 10:25:22 | (Nf7, Ef7) |

| MOVING SPEED [km/h] | ACTIVITY STATUS | COMMUNICABLENESS STATUS |
|---|---|---|
| 0 | AT A STOP | 0 |
| 1 ~ 7 | WALKING | 1 |
| 8 ~ 15 | JOGGING | 0 |
| 16 ~ 25 | DRIVING A BICYCLE | 1 |
| 26 ~ 35 | DRIVING A MOTORIZED BICYCLE | 0 |
| 36 ~ 80 | ON BOARD A TRAMCAR | 0 |
| | ON BOARD A SUBWAY | |
| | ON BOARD A LOCAL OR RAPID TRAIN | |
| | ON BOARD A PASSENGER CAR ON A GENERAL ROAD | |
| | ON BOARD A BUS ON A GENERAL ROAD | |
| | ON BOARD A SHIP | |
| 81 ~ 300 | ON BOARD A BUS ON A HIGHWAY | 0 |
| | ON BOARD A PASSENGER CAR ON A HIGHWAY | |
| | ON BOARD A SHINKANSEN | |
| 301 ~ | ON BOARD AN AIRPLANE | 0 |

FIG.40

| MOVING SPEED [km/h] | ACTIVITY STATUS | COMMUNICABLENESS STATUS |
|---|---|---|
| 0 | AT A STOP AT HOME | 0 |
| | AT A STOP AT A PLACE OTHER THAN HOME | 1 |
| 1 ~ 7 | WALKING | 1 |
| 8 ~ 15 | JOGGING | 0 |
| 16 ~ 25 | DRIVING A BICYCLE | 1 |
| 26 ~ 35 | DRIVING A MOTORIZED BICYCLE | 0 |
| 36 ~ 80 | ON BOARD A TRAMCAR | 0 |
| | ON BOARD A SUBWAY | 0 |
| | ON BOARD A LOCAL OR RAPID TRAIN | 0 |
| | ON BOARD A PASSENGER CAR ON A GENERAL ROAD | 1 |
| | ON BOARD A BUS ON A GENERAL ROAD | 0 |
| | ON BOARD A SHIP | 0 |
| 81 ~ 300 | ON BOARD A BUS ON A HIGHWAY | 0 |
| | ON BOARD A PASSENGER CAR ON A HIGHWAY | 1 |
| | ON BOARD A SHINKANSEN | 0 |
| 301 ~ | ON BOARD AN AIRPLANE | 0 |

| MOVING SPEED [km/h] | ACTIVITY STATUS | ACTIVITY STATUS INDEX |
|---|---|---|
| 0 | AT A STOP AT HOME | 3 |
| | AT A STOP AT A PLACE OTHER THAN HOME | 8 |
| 1~7 | WALKING | 10 |
| 8~15 | JOGGING | 6 |
| 16~25 | DRIVING A BICYCLE | 8 |
| 26~35 | DRIVING A MOTORIZED BICYCLE | 4 |
| 36~80 | ON BOARD A TRAMCAR | 2 |
| | ON BOARD A SUBWAY | 2 |
| | ON BOARD A LOCAL OR RAPID TRAIN | 3 |
| | ON BOARD A PASSENGER CAR ON A GENERAL ROAD | 7 |
| | ON BOARD A BUS ON A GENERAL ROAD | 4 |
| | ON BOARD A SHIP | 2 |
| 81~300 | ON BOARD A BUS ON A HIGHWAY | 2 |
| | ON BOARD A PASSENGER CAR ON A HIGHWAY | 7 |
| | ON BOARD A SHINKANSEN | 2 |
| 301~ | ON BOARD AN AIRPLANE | 1 |

340

MANAGEMENT DEVICE, MANAGEMENT METHOD, RECORDING MEDIUM ENCODED WITH PROGRAM CAPABLE OF PERFORMING MULTIPLE COMMUNICATION MODES

CROSS-REFERENCE TO RELATED APPLICATION

This application is based upon and claims the benefit of priority from the prior Japanese Patent Application No. 2019-19585, filed on Feb. 6, 2019, the entire contents of which is incorporated herein by reference.

BACKGROUND OF THE INVENTION

1. Field

The present invention relates to a communication technology and, more particularly, to a management device capable of performing a plurality of communication modes.

2. Description of the Related Art

A communication system comprised of a plurality of terminal devices may support a plurality of communication modes in some cases. For example, communication is started after a certain user operation is performed in a terminal device receiving a call signal in the first communication mode, and communication is started even when a certain user operation is not performed in a terminal device receiving a call signal. In the first communication mode, communication is started after the called user performs a certain user operation. Therefore, communication is not started without the user's knowledge, and the user can properly know the occurrence of communication. In the second communication mode, on the other hand, communication is started even when a certain user operation is not performed so that communication can be started promptly. Thus, the plurality of different communication modes have different characteristics and benefits.

Patent literature 1 proposes a system in which a relay device relays communication between a wireless communication device and a telephone set via a network. In this system, the relay device responds to a call from a telephone set on the condition that a response instruction is properly given from a portable handset, which is a wireless communication device. The relay device creates a branch to a talk mode in the case of an isolated incoming call, to a wireless call mode in the case of broadcasting, and to a session initiation protocol (SIP) call origination mode in the case of a call originated from a wireless communication device.

[Patent literature 1] JP2011-135290

When a user attempts to start communication with a recipient (communication partner) by using a given communication mode, the communication partner is not necessarily in a situation suited to being called in that communication mode. Even when a user starts communication in the second communication mode, for example, the originated speech may not be recognized by the communication partner if the communication partner is away from the terminal device. It is therefore desired to use a plurality of types of communication modes properly depending on the situation of the communication partner. In the related art, however, not enough consideration has been given to using a plurality of types of communication modes properly.

SUMMARY OF THE INVENTION

A management device according to an embodiment is adapted to manage a terminal device, and includes: an index calculator that calculates, for the terminal device, an easiness-of-communication index indicating a degree to which a user using the terminal device recognizes communication, by using information related to the terminal device; a receiver that receives communication request data of a first communication mode or a second communication mode from a first terminal device originating a call, the communication request data designating a second terminal device as a destination of the call; and a transmitter that transmits, when the receiver receives the communication request data of the second communication mode and the easiness-of-communication index of the second terminal device meets a predetermined condition, the communication request data of the first communication mode to the second terminal device. The first communication mode is a communication mode in which communication between the first terminal device and the second terminal device is started after a predetermined user operation is performed in the second terminal device, and the second communication mode is a communication mode in which communication between the first terminal device and the second terminal device is started even if a predetermined user operation is not performed in the second terminal device.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 8 shows a data structure of the record table in the management device;

FIG. 9 shows a data structure of the activity status measure table in the management device;

FIGS. 10A and 10B show functions used in the index calculator of the management device;

FIG. 15 shows a data structure of the activity status threshold value table stored in the storage of the management device according to a variation of embodiment 1;

FIG. 16 shows a data structure of the activity status measure table stored in the storage of the management device of embodiment 2;

FIG. 17 shows a data structure of the activity status measure average value table stored in the storage of the management device;

FIG. 21 shows a data structure of a noise level packet transmitted from the terminal device;

FIG. 24 shows a data structure of the noise level table in the management device;

FIG. 25 shows a data structure of the communicableness status table in the management device;

FIG. 28 shows a data structure of the noise level record table stored in the storage of the management device of embodiment 5;

FIG. 29 shows a data structure of the high-noise position table stored in the storage of the management device;

FIG. 30 shows a high-noise area map stored in the storage of the management device;

FIG. 34 shows a data structure of a position information packet transmitted from the terminal device;

FIG. 37 shows a data structure of the record table in the management device;

FIG. 38 shows a data structure of the activity status definition table in the management device;

FIG. 40 shows a data structure of the activity status definition table in the management device of embodiment 9; and FIG. 41 shows a data structure of the activity status definition table stored in the storage of the management device of embodiment 11.

DETAILED DESCRIPTION OF THE PREFERRED EMBODIMENT

The invention will now be described by reference to the preferred embodiments. This does not intend to limit the scope of the present invention, but to exemplify the invention.

Embodiment 1

Figure 1:
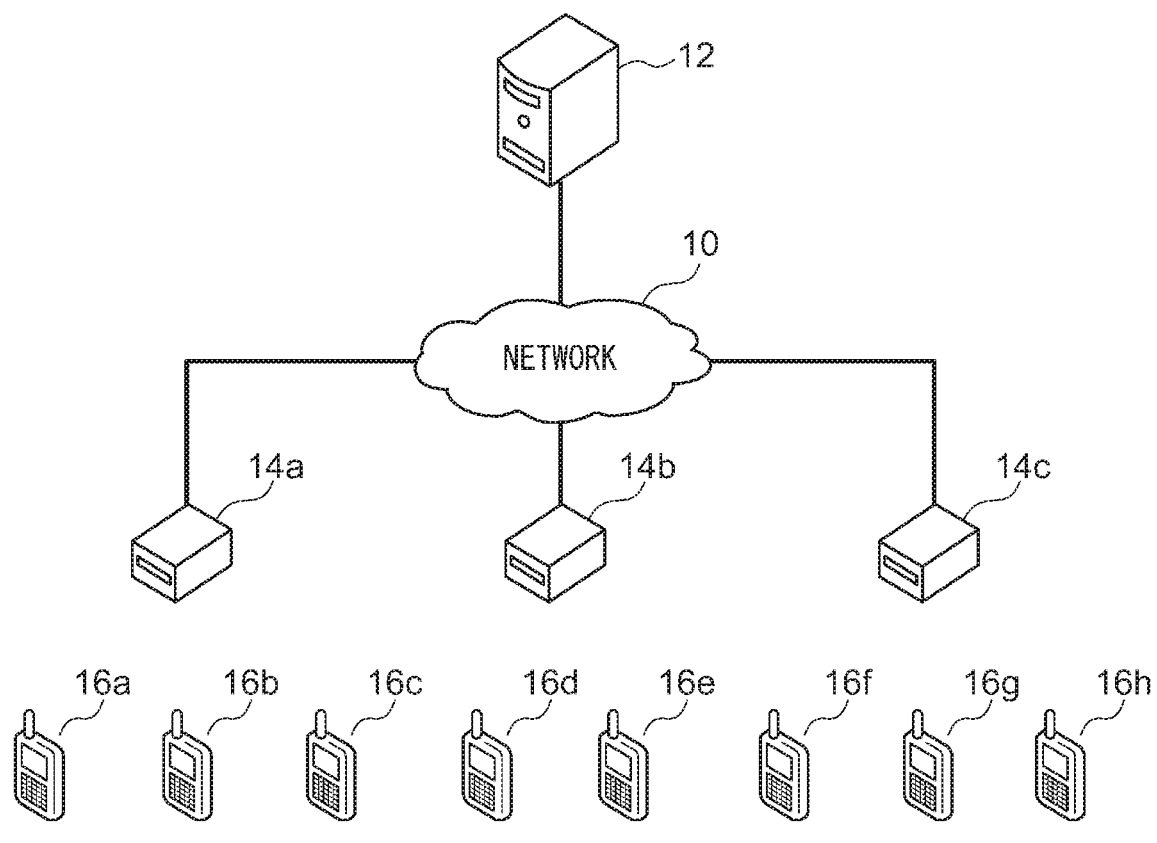
FIG. 1 shows a configuration of a communication system according to embodiment 1.

FIG. 1 shows a configuration of a communication system 100. The communication system 100 includes a network 10, a management device 12, a first base station device 14a, a second base station device 14b, a third base station device 14c, which are generically referred to as base station devices 14, and a first terminal device 16a, ..., an eighth terminal device 16h, which are generically referred to as terminal devices 16. The number of base station devices 14 included in the communication system 100 is not limited to "3", and the number of terminal devices 16 is not limited to "8". There can be more or fewer base station devices or terminal devices.

The terminal device 16 is called an IP transceiver or a push-to-talk over cellular (PoC) transceiver and performs voice communication. Voice communication is performed in the push-to-talk scheme, in which individual calls, group calls, simultaneous calls, and neighbor calls are possible. To perform such voice communication, the terminal device 16 is connected to the base station device 14. The half-duplex or full-duplex communication scheme is used as a communication scheme for communication between the base station device 14 and the terminal device 16.

The plurality of base station devices 14 are mutually connected by the network 10. The network 10 is, for example, an Internet protocol network. The management device 12 is connected to the network 10. The management device 12 is comprised of, for example, a session initiation protocol server and performs an SIP sequence process for calls between the terminal devices 16.

In this configuration, the user of the terminal device 16 holds the talk button of the terminal device 16 down to make a voice call with another user using a further terminal device 16. Over a period of time during which the user of one of the plurality of terminal devices 16 involved in a given voice call is holding the talk button down and making a call, the other users cannot make a call even if they push the talk button, in the case the communication scheme is a half-duplex communication scheme. Operations initiated when the talk button is held down to start a call include normal call origination and ring back tone (hereinafter, "RBT") call origination.

Figure 2A:
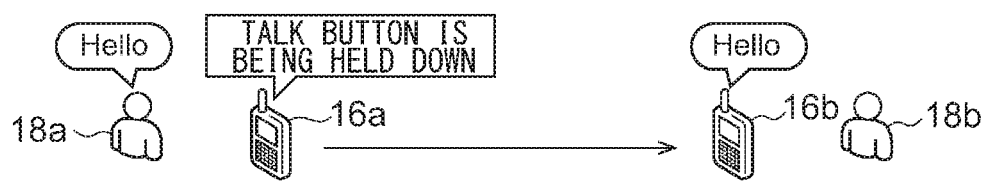
FIGS. 2A and 2B show an outline of normal call origination in the communication system.
Figure 2B:
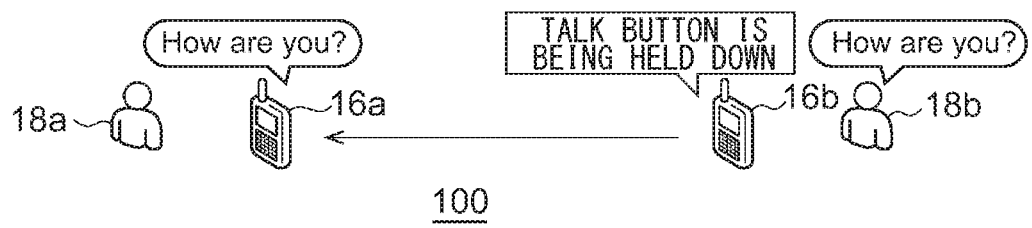

FIGS. 2A-2B show an outline of normal call origination in the communication system 100. Communication between two terminal devices 16 including the first terminal device 16a and the second terminal device 16b is assumed. Communication may take place between three or more terminal devices 16 or may be one-to-many group communication. The first terminal device 16a is used by a first user 18a, and the second terminal device 16b is used by a second user 18b. It is assumed that half-duplex communication is used.

Referring to FIG. 2A, a voice call between the first user 18a and the second user 18b is started and maintained while the first user 18a is holding the talk button of the first terminal device 16a down, even if the second user 18b does not perform any user operation in the second terminal device 16b. To describe it more specifically, the voice originated by the first user 18a is transmitted in the form of a voice signal from the first terminal device 16a to the second terminal device 16b, while the first user 18a is holding the talk button of the first terminal device 16a down. The second terminal device 16b reproduces the received voice signal and outputs the voice. FIG. 2B shows a process that follows the process of FIG. 2A. The voice originated by the second user 18b is transmitted in the form of a voice signal from the second terminal device 16b to the first terminal device 16a, while the second user 18b is holding the talk button of the second terminal device 16b down. The first terminal device 16a reproduces the received voice signal and outputs the voice. In this way, the first user 18a and the second user 18b alternately hold the talk button down to talk.

Figure 3A:
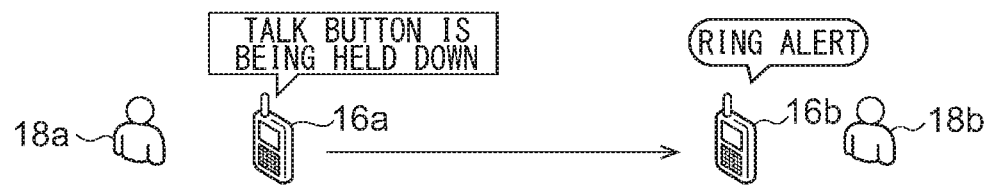
FIGS. 3A, 3B, 3C and 3D show an outline of RBT call origination in the communication system.
Figure 3B:
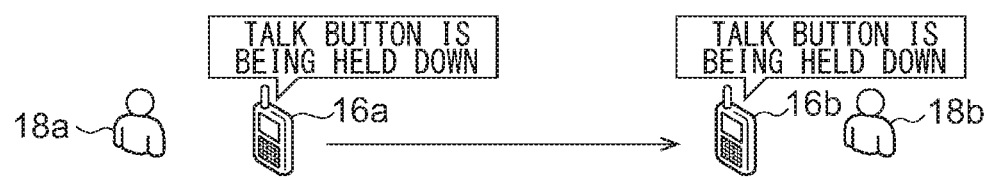
Figure 3C:
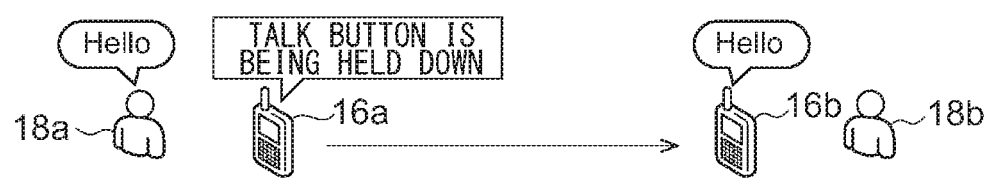
Figure 3D:
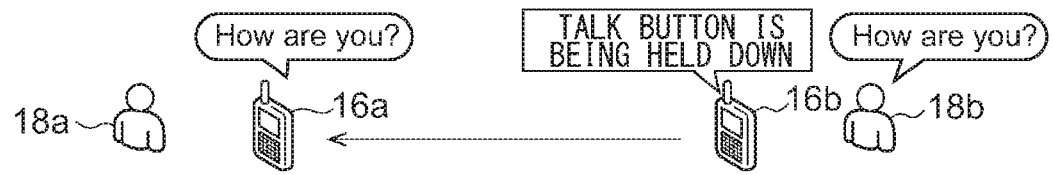

FIGS. 3A-3D show an outline of RBT call origination in the communication system 100. FIGS. 3A-3D are similar to FIGS. 2A-2B. While the first user 18a is holding the talk button of the first terminal device 16a down, the first terminal device 16a outputs a ring-back tone. The second terminal device 16b does not start a voice call and outputs a ring alert. FIG. 3B shows a process that follows the process of FIG. 3A. When the second user 18b hearing the ring alert performs a predetermined user operation such as holding the talk button of the second terminal device 16b down, a transition to the status of FIG. 3C is made to start a talk. When the first user 18a stops holding the talk button of the first terminal device 16a down (releases the talk button), the talk of FIG. 3C is terminated. When the second user 18b holds the talk button of the second terminal device 16b down within a predetermined period of time since the termination of the talk, a return call (call back) from the second terminal device 16b to the first terminal device 16a is started. This status is shown in FIG. 3D. In a return call in response to an RBT call origination, the ring-back tone of the second terminal device 16b or the ring alert of the first terminal device 16a are not normally output, and the devices are immediately placed in a status of communication.

When the second user 18b holds the talk button of the second terminal device 16b down after an elapse of the predetermined period of time since the termination of the talk of FIG. 3C, a new RBT call origination instead of a return call is initiated. In this case, the ring-back tone of the second terminal device 16b and the ring alert of the first terminal device 16a are output. As described above, RBT call origination requires a user operation in the receiving (called) terminal device 16 to start a voice call. Therefore, RBT call origination is used when it is necessary to communicate information to the destination of call properly. In the description given above, it is assumed that RBT call origination is performed by a user operation of keeping the talk button held down. RBT call origination may be performed by an alternative user operation. For example, RBT call origination may be performed by holding the talk button down once (for a short period of time).

Figure 4A:
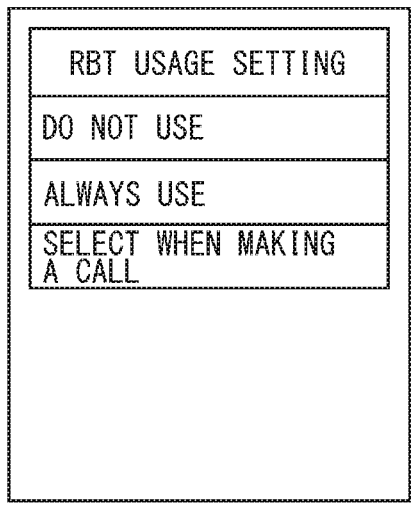
FIGS. 4A and 4B show screens displayed on the display of the terminal device.
Figure 4B:
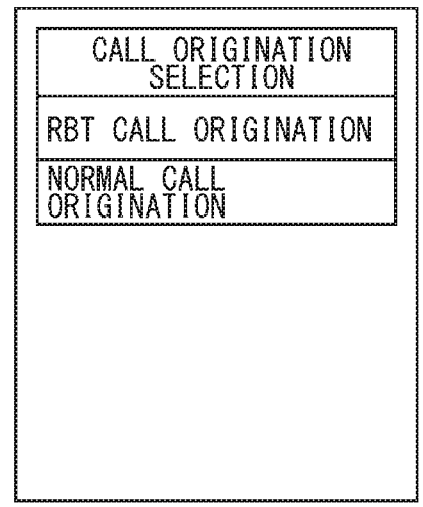

Switching between normal call origination and RBT call origination is generally performed based on the setting in the calling terminal device 16. When "normal call origination" is set in the terminal device 16, or when "normal call origination or RBT call origination to originate a call" is set and "normal call origination" is selected to originate a call, normal call origination is performed. FIGS. 4A-4B show screens displayed on the display of the terminal device 16. These are examples of screen views for providing the setting related to normal call origination and RBT call origination in the terminal device 16. The operation performed when originating a call is set by using the RBT usage setting screen of FIG. 4A. In the case "do not use" is set, normal call origination is performed after the talk button is held down.

In the case "always use" is set, RBT call origination is performed after the talk button is held down. In the case "select when originating a call" is set, a call origination selection screen of FIG. 4B is displayed after the talk button is held down. In other words, the user 18 selects normal call origination or RBT call origination every time the user start a call (for each session of call origination). In the case "RBT call origination" is selected in the call origination selection screen of FIG. 4B, RBT call origination is performed. In the case "normal call origination" is selected, normal call origination is performed. "RBT call origination" may be referred to as "first communication mode", and "normal call origination" may be referred to as "second communication mode".

Figure 5A:
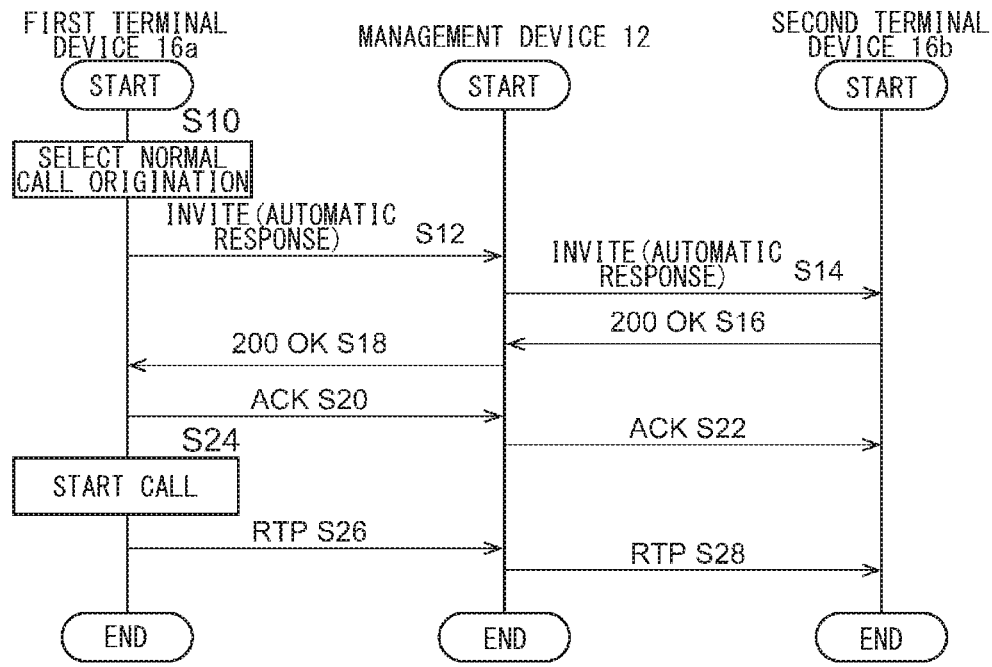
FIGS. 5A and 5B are sequence diagrams showing steps of call origination in the communication system.
Figure 5B:
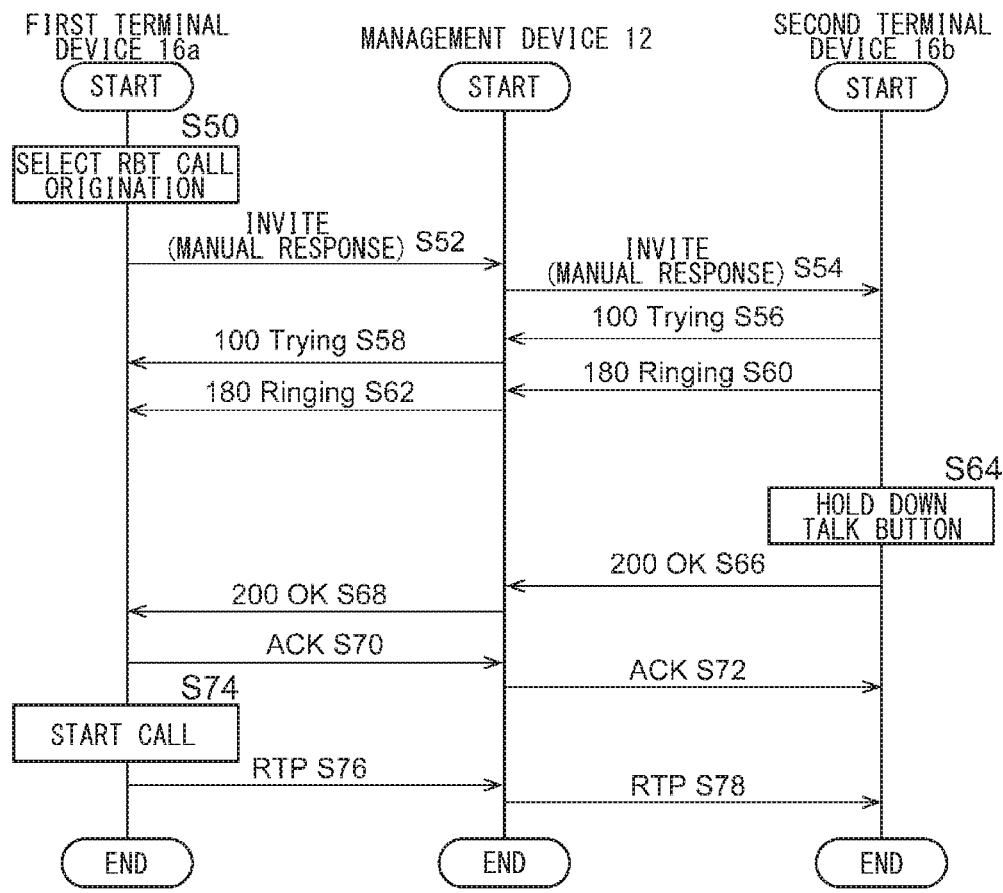

FIGS. 5A-5B are sequence diagrams showing steps of call origination in the communication system 100. FIG. 5A shows steps in normal call origination in SIP communication from the first terminal device 16a to the second terminal device 16b. After normal call origination is selected in the first terminal device 16a (S10), the first terminal device 16a transmits INVITE (automatic response) to the second terminal device 16b (S12). INVITE (automatic response) thus transmitted is delivered to the second terminal device 16b via the management device 12 (S14). After receiving INVITE (automatic response), the second terminal device 16b transmits a status code 200OK to the first terminal device 16a (S16). The status code 200OK thus transmitted is transmitted to the first terminal device 16a via the management device 12 (S18). After receiving the status code 200OK, the first terminal device 16a transmits acknowledge (ACK) (S20). ACK thus transmitted is transmitted to the second terminal device 16b via the management device 12 (S22). After transmitting ACK, the first terminal device 16a starts transmitting call (talk) data by using RTP (S24, S26, S28). Communication between the first terminal device 16a/the second terminal device 16b and the management device 12 is performed via the base station device 14. For brevity of the description, the base station device 14 is omitted in FIGS. 5A-5B.

FIG. 5B shows steps performed when RBT call origination from the first terminal device 16a to the second terminal device 16b is made in SIP communication. After RBT call origination is selected in the first terminal device 16a (S50), the first terminal device 16a transmits INVITE (manual response) to the second terminal device 16b (S52). INVITE (manual response) thus transmitted is transmitted to the second terminal device 16b via the management device 12 (S54). After receiving INVITE (manual response), the second terminal device 16b transmits a status code 100Trying to the first terminal device 16a (S56). The status code 100Trying thus transmitted is transmitted to the first terminal device 16a via the management device 12 (S58). After transmitting the status code 100Trying, the second terminal device 16b transmits a status code 180Ringing to the first terminal device 16a (S60). The status code 180Ringing thus transmitted is transmitted to the first terminal device 16a via the management device 12 (S62). The first terminal device 16a stands by without starting a call until ACK is received.

When the talk button of the second terminal device 16b is held down (S64) subsequently, the second terminal device 16b transmits a status code 200OK to the first terminal device 16a (S66). The status code 200OK thus transmitted is transmitted to the first terminal device 16a via the management device 12 (S68). After receiving the status code 200OK, the First terminal device 16a transmits ACK (S70). ACK thus transmitted is transmitted to the second terminal device 16b via the management device 12 (S72). After transmitting ACK, the first terminal device 16a starts transmitting call (talk) data by using RTP (S74, S76, S78).

As described above, a call is started in the operation for normal call origination without manipulating the talk button in the receiving terminal device 16. For this reason, normal call origination is advantageous in that a talk can be started promptly, but the originated information will be all wasted if the user using the receiving terminal device 16 is not near the terminal device 16 because, for example, the user has left his or her seat, or is taking a sleep. If normal call origination is performed invariably because the user does not fully understand the specification or user operation method of the terminal device 16 or because of a mistaken setting, the call might not be heard at the receiving end even when it is necessary to communicate the information to the recipient properly. Meanwhile, RBT call origination is advantageous in that the information is properly communicated to the recipient user but is also disadvantageous in that the user operation of the user 18 will be complicated. For this reason, the convenience for the user 18 may be impaired if RBT call origination is invariably set. This embodiment is directed to the purpose of using RBT call origination (first communication mode) and normal call origination (second communication mode) suitably.

Figure 6:
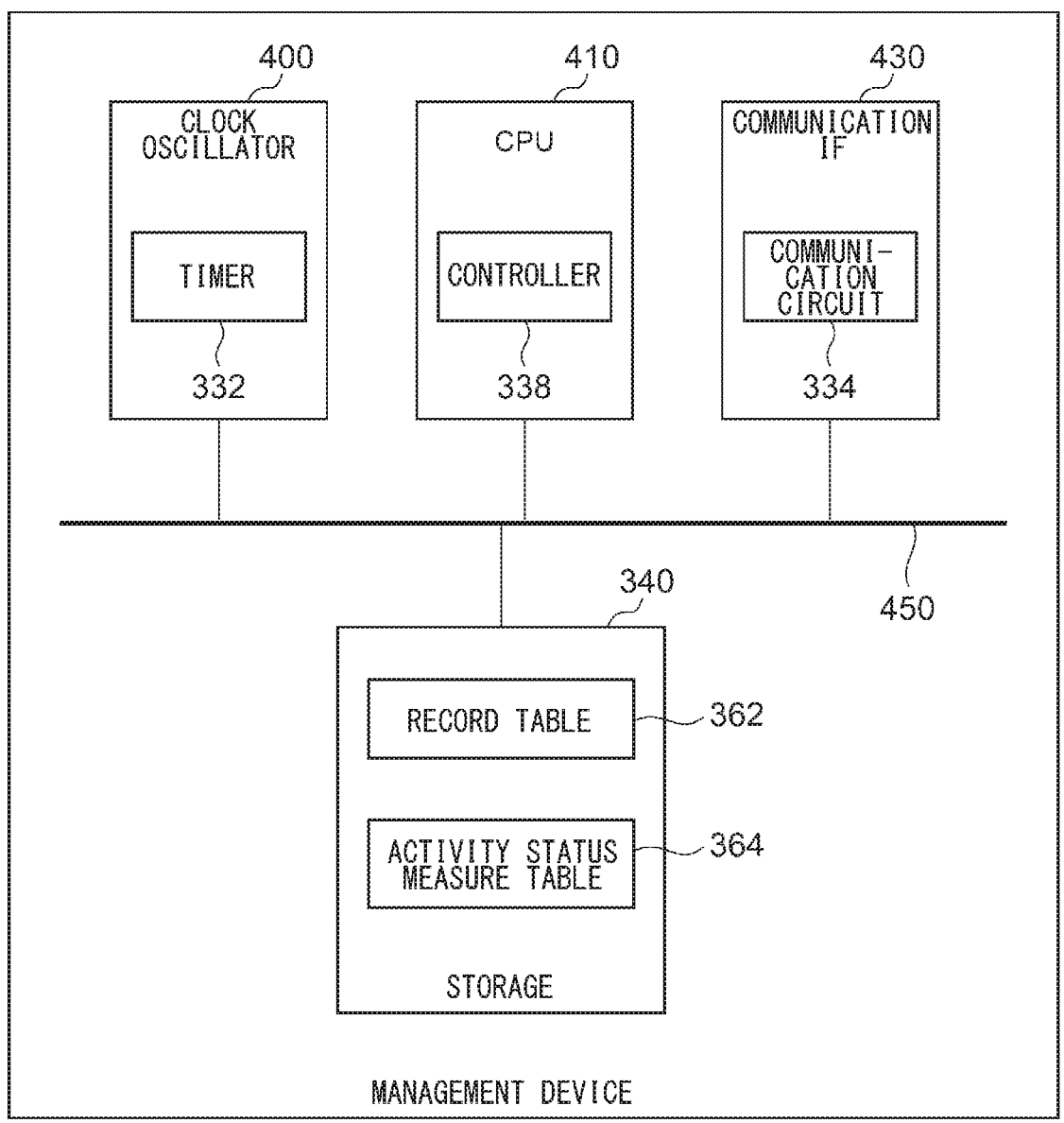
FIG. 6 shows a hardware configuration and functional blocks of the management device.

FIG. 6 shows a hardware configuration and functional blocks of the management device 12. The management device 12 includes a clock oscillator 400, a central processing unit (CPU) 410, a communication IF 430, and a storage 340. The clock oscillator 400, the CPU 410, the communication IF 430, and the storage 340 are connected by a bus 450.

The clock oscillator 400 is, for example, a crystal oscillator and generates a signal of a predetermined frequency. The CPU 410 performs a process in the management device 12. The communication IF 430 is connected to the network 10 and communicates with the base station device 14. The communication IF 430 also communicates with the terminal device 16 via the base station device 14. The storage 340 is a medium for storing information and is, for example, a hard disk or a solid-state drive (SSD).

The clock oscillator 400 includes a timer 332, the CPU 410 includes a controller 338, and the communication IF 430 includes a communication circuit 334. The storage 340 includes a record table 362 and an activity status measure table 364.

Figure 7:
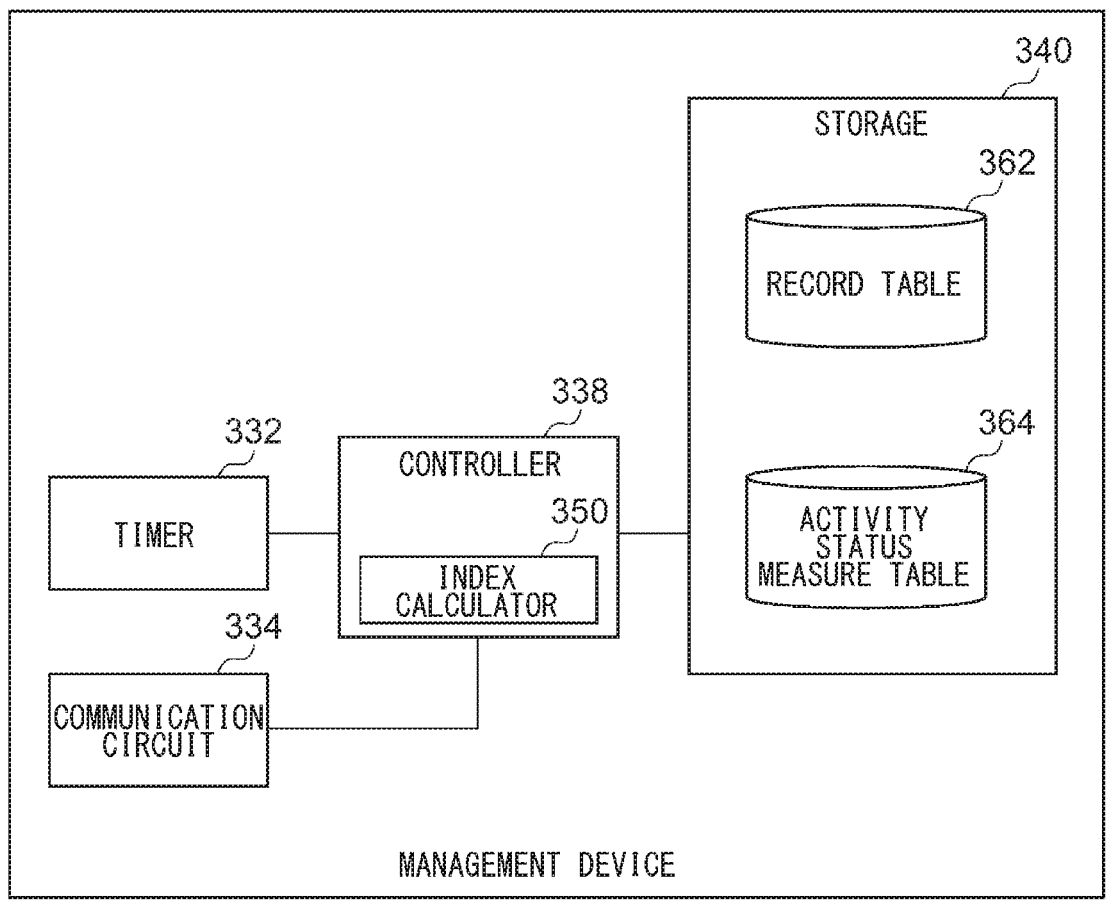
FIG. 7 shows detailed functional blocks of the management device.

FIG. 7 shows detailed functional blocks of the management device 12. The management device 12 includes the timer 332, the communication circuit 334, the controller 338, and the storage 340. The controller 338 includes an index calculator 350, and the storage 340 includes the record table 362 and the activity status measure table 364. The communication circuit 334 detects a call by receiving a signal from the terminal device 16. The signal includes, as information related to the terminal device, the terminal device name of the calling terminal device and the terminal device name of the called terminal device. The communication circuit 334 can receive a signal like this from each of the plurality of terminal devices 16. When a call is detected in the communication circuit 334, the controller 338 acquires the current time from the timer 332 and acquires the terminal device name of the calling terminal device and the terminal device name of the called terminal device. The controller 338 may be provided with the function of the timer 332. Subsequently, the controller 338 appends the current time, the terminal device name and ID (terminal device identifier) of the calling terminal device, and the terminal device name and ID of the called terminal device to the record table 362. The record table 362 records the point of time of a call made between the terminal devices 16 and the terminal device names.

FIG. 8 shows a data structure of the record table 362 stored in the storage 340 of the management device 12. The record table 362 records call origination from the terminal device 16 detected by the management device 12 at a given point of time. The IDs of the terminal devices 16 are such that the first terminal device 16a (ID:001), the second terminal device 16b (ID:002), the third terminal device 16c (ID: 003), the fourth terminal device 16d (ID: 004), and the fifth terminal device 16e (ID: 005). "Record No." (record number) is a number for identifying the record information. The smaller the value of the record No., the older the record information, and the larger the value, the newer the record information. The point of time when a given terminal device 16 originated a call to a further terminal device 16 is entered in the "point of time of call" field. In the "terminal device name and ID of calling terminal device" field and the "terminal device name and ID of called terminal device" field, the respective terminal device names and terminal device IDs are entered. The record No. 001 in the illustrated example indicates call origination from the first terminal device 16a (ID:001) to the third terminal device 16c (ID: 003) at the point of time "10:19:14". An exemplary entry "10:19:14" in the "point of time of call" field means "19 minutes and 14 seconds past 10 o'clock".

The record table 362 is capable of storing a certain number of (e.g., 30) records. When new point of time information is appended in a state in which the number of records has reached the upper limit, old record information is deleted sequentially. In the example of FIG. 8, when a terminal device 16 originates a call after the time "11:28:10", the record of the record No. 001 at the point of time of call "10:19:14" is deleted. In the above example, the record No. of the record information appended after "11:28:10" is recorded with No. 030. The record information at "11:28:10" hitherto recorded with the record No. 030 is adjusted to have the record No. 029. When the record of the record No. 001 at the point of time of call "10:19:14" is deleted, the record No. of the record information of No. 002 at the point of time of call "10:19:25" is adjusted to No. 001. Thus, in the example of FIG. 8, the record No. of the oldest record information is always No. 001, and the record No. of the newest record information is always No. 030, even when an old record is deleted and a new record is added. In the example shown in FIG. 8, only the point of time is recorded in the "point of time of call" field, but the date (year, month, date) may be additionally recorded. In other words, the date and time of the call may be recorded. A predetermined number of immediately preceding records may be stored in the record table 362, but a record covering a predetermined period of time (e.g., the last three hours) may be stored. Reference is made back to FIG. 7.

In this embodiment, the index calculator 350 calculates an easiness-of-communication index indicating the easiness with which the user using the terminal device recognizes communication. An easiness-of-communication index is, for example, an index indicating a degree to which the user of a terminal device receiving a communication request from a further terminal device recognizes (knows) the occurrence of a communication request occurs or the content of communication. The easiness-of-communication index can be said to be an index indicating the degree to which the user using terminal device recognizes communication. Also, the easiness-of-communication index can be said to be an index of the easiness of communication with the terminal device 16. In this embodiment, an activity status measure is used as one of easiness-of-communication indices. The activity status measure is an index (numerical value) showing an estimation of the activity status of the user using the terminal device 16 based on the information indicating a call origination process (a call origination operation) performed in the terminal device 16. The activity status measure table 364 records the activity status measure of each terminal device 16. The controller 338 updates the activity status measure table 364 based on the record in the record table 362 and by referring to the result the activity status estimation process described later. FIG. 9 shows a data structure of the activity status measure table 364 in the management device 12. The terminal device name and ID of each terminal device 16 are entered in the "terminal device name and ID" field. The activity status measure is updated (overwritten) by the result of the activity status estimation process described later. FIG. 9 shows that the minimum value of the activity status measure is 0, and the maximum value is 10 by way of example. The range between the minimum value and the maximum value may be otherwise. For example, the minimum value may be 0 and the maximum value may be 100, etc. Reference is made back to FIG. 7.

The controller 338 detects the information on the terminal device 16 from the communication circuit 334 and appends the point of time and a record related to the terminal device 16 to the record table 362. The index calculator 350 then performs an activity status estimation process at a predetermined interval (e.g., at an interval of one minute). The activity status estimation process is a process to calculate the activity status measure of each terminal device 16. This can be said to a process of calculating an activity status measure (easiness-of-communication index) in each of the plurality of terminal devices 16, based on the received information. The index calculator 350 updates the activity status value in the activity status measure table 364 with the activity status measure of each terminal device 16 yielded by the activity status estimation process. After the activity status measure table 364 is updated or at a predetermined interval (e.g., at an interval of one minute), the index calculator 350 delivers the whole content of the activity status measure table 364 to each terminal device 16 from the communication circuit 334. This is equivalent to transmitting the easiness-of-communication index to the each of the plurality of terminal devices 16.

A description will be given of the detail of the activity status estimation process. To calculate the activity status measure AX of the X-th terminal device 16x arbitrarily selected from the terminal devices 16, the index calculator 350 searches the records in the record table 362 designating the X-th terminal device 16x as the calling terminal to identify a record with the newest point of time of call origination (the record closest to the current time). The point of time of call origination corresponds to the point of time of call mentioned above. The identified record will be referred to as the latest call origination record of the X-th terminal device 16x, and the value of the record No. will be denoted by "NS". In the case there are no call origination records in which the X-th terminal device 16x is the calling terminal, NS is set to "000". The index calculator 350 searches those records designating the X-th terminal device 16x as the receiving terminal and having a value of the record No. larger than NS to identify records with the point of time of reception up to the current time and counts the number of identified records. In other words, of the records related to the X-th terminal device 16x, the index calculator 350 counts the number of reception records newer than the latest call origination record.

In order to originate a call, it is necessary for the user 18 to manipulate the X-th terminal device 16x actively. It is therefore possible to estimate that the X-th user 18x of the X-th terminal device 16x was near the X-th terminal device 16x and was active (not asleep) at the point of time of the record "NS". In this embodiment, the status in which the user 18 can know the content of communication (e.g., the status in which the user 18 is not asleep or the status in which the user 18 is not occupied by an activity other than communication) will be referred to as "active status". The number of records counted here represents the number of times that the X-th terminal device 16x receives a call after the last point of time when the user 18 was identified to be active near the X-th terminal device 16x. In other words, it is predicted that the smaller the number of records counted, the more likely it is that the X-th user 18x can know the content of communication and that the larger the number of records counted, the less likely it is that the user can know the content of communication.

In the activity status estimation process, the "likelihood that the user can know the content of communication" above is a turned into a numerical value indicating the activity status measure. Denoting the number of records showing that the X-th terminal device 16x receives a call since the point of time of NS until the current time by CountX, the activity status measure AX of the X-th terminal device 16x is given as follows.

$$AX = \text{the maximum value of the activity status measure} \times (\alpha \times CountX) \quad \text{(formula 1)}$$

where α is a predetermined coefficient greater than 0. For brevity of the description, the maximum value of the activity status measure is assumed to be "10", and the value of the coefficient α in (formula 1) is assumed to be "1". As can be known from (formula 1), the smaller the value of CountX, the higher the activity status measure X. In other words, the smaller the value of CountX, the more likely it is predicted to be that the user can know the content of communication.

The activity status estimation process will be described in specific detail by using the example of FIG. 8. In the case of the first terminal device 16a, the point of time of call origination closest to the current time is "11:16:32" of the record No. 025 so that NS is "025". After "11:16:32", the first terminal device 16a received a call from a further terminal device 16 only once at "11:27:41" of the record No. 029, when it received a call from the third terminal device 16c, so that CountA is "1". In other words, the activity status measure A of the first terminal device 16a is "9", based on a calculation "10−(1×1)".

In the case of the second terminal device 16b, the point of time of call origination closest to the current time is "10:59:32" of the record No. 017 so that NS is "017". After "10:59:32", the second terminal device 16b received calls at "11:09:10" of the record No. 022 from the first terminal device 16a, at "11:16:32" of the record No. 025 from the first terminal device 16a, at "11:22:30" of the record No. 027 from the third terminal device 16c, and at "11:28:10" of the record No. 030 from the fifth terminal device 16e, so that CountB is "4". In other words, the activity status measure B of the second terminal device 16b is "6", based on a calculation "10−(1×4)".

By processing the third terminal device 16c, the fourth terminal device 16d, and the fifth terminal device 16e similarly, it will be found that CountC is "0", CountD is "7", CountE is "0", the activity status measure C is "10", the activity status measure D is "3", and the activity status measure E is "10". In the case the value of ($\alpha \times$CountX) of the X-th terminal device 16x exceeds the maximum value of the activity status measure, i.e., in the case a negative value of the activity status measure X results, the activity status measure X can be uniformly "0".

Alternatively, the index calculator 350 may calculate the activity status measure X by using a value (output) returned from a nonlinear function G with CountX as an argument (input). More specifically, the activity status measure AX is calculated according to (formula 2).

$AX$=the maximum value of the activity status measure$-(\alpha \times G(\text{Count}X))$ (formula 2)

where $\alpha$ is a predetermined coefficient greater than 0. Any of various functions may be used as the function G. FIGS. 10A-10B show functions used in the index calculator 350 of the management device 12. FIG. 10A is an example of the function G. The function G is a monotonically increasing function in which the greater the input, the greater the output. The function G has an exponential nature in which the greater the input, the greater the increase rate of the output. Alternatively, a function having a logarithmic nature, in which the greater the input, the smaller the increase rate of the output, may be used as the function G. Using a linear monotonically increasing function as the function G results in the process defined by (formula 1).

The index calculator 350 may calculate the activity status measure AX as follows by using, instead of CountX, an elapsed time TX elapsed since the last call origination from the X-th terminal device 16x until the current time.

$AX$=the maximum value of the activity status measure$-(\alpha \times F(TX))$ (formula 3)

where $\alpha$ is a predetermined coefficient greater than 0. Any of various functions may be used as the function F. FIG. 10B is an example of the function F. The function F is a monotonically increasing function in which the greater the input, the greater the output. The function F also has a logarithmic nature in which the greater the input, the smaller the increase rate of the output. Alternatively, a function having an exponential nature, in which the greater the input, the greater the increase rate of the output, may be used as the function F. A linear monotonically increasing function may be used as the function F.

The index calculator 350 may calculate the activity status measure AX by using both CountX and the elapsed time TX according to (formula 4) or (formula 5).

$AX$=the maximum value of the activity status measure$-(\alpha \times G(\text{Count}X) \times F(TX))$ (formula 4)

$AX$=the maximum value of the activity status measure$-(\alpha \times G(\text{Count}X)+\beta \times F(TX))$ (formula 5)

According to (formula 4) and (formula 5), the greater CountX, the smaller the activity status measure AX, and the longer the elapsed time TX, the smaller the activity status measure X. It is indicated that the smaller (lower) the activity status measure AX, i.e., the smaller (lower) the easiness-of-communication index, the more difficult it is for the X-th user 18x of the X-th terminal device 16x to recognize communication from a further terminal device 16. Conversely, the greater (higher) the activity status measure AX, i.e., the greater (higher) the easiness-of-communication index, the easier it is for the X-th user 18x of the X-th terminal device 16x to recognize communication from a further terminal device 16. The relationship between the magnitude of the activity status measure (easiness-of-communication index) and the easiness with which the user 18 recognizes communication may be arbitrarily set. For example, the relationship may be configured such that the smaller the easiness-of-communication index, the easier it is for the user 18 to recognize communication. A predetermined coefficient $\alpha$ is used in (formula 1)-(formula 5), but the coefficient may have different values depending on the formula.

To summarize the above, the index calculator 350 calculates the activity status measure based on at least one of the number of times that the terminal device 16 receives a call since the call origination from that terminal device 16 and the elapsed time elapsed since the point of time of call origination from the terminal device 16. The activity status measure is one of easiness-of-communication indices and indicates the activity status of the user 18 using the terminal device 16. The larger the number of times that the terminal device 16 receives a call since the call origination from that terminal device 16, or the longer the elapsed time elapsed since the point of time of call origination from the terminal device 16, the lower the activity status measure.

Figure 11:
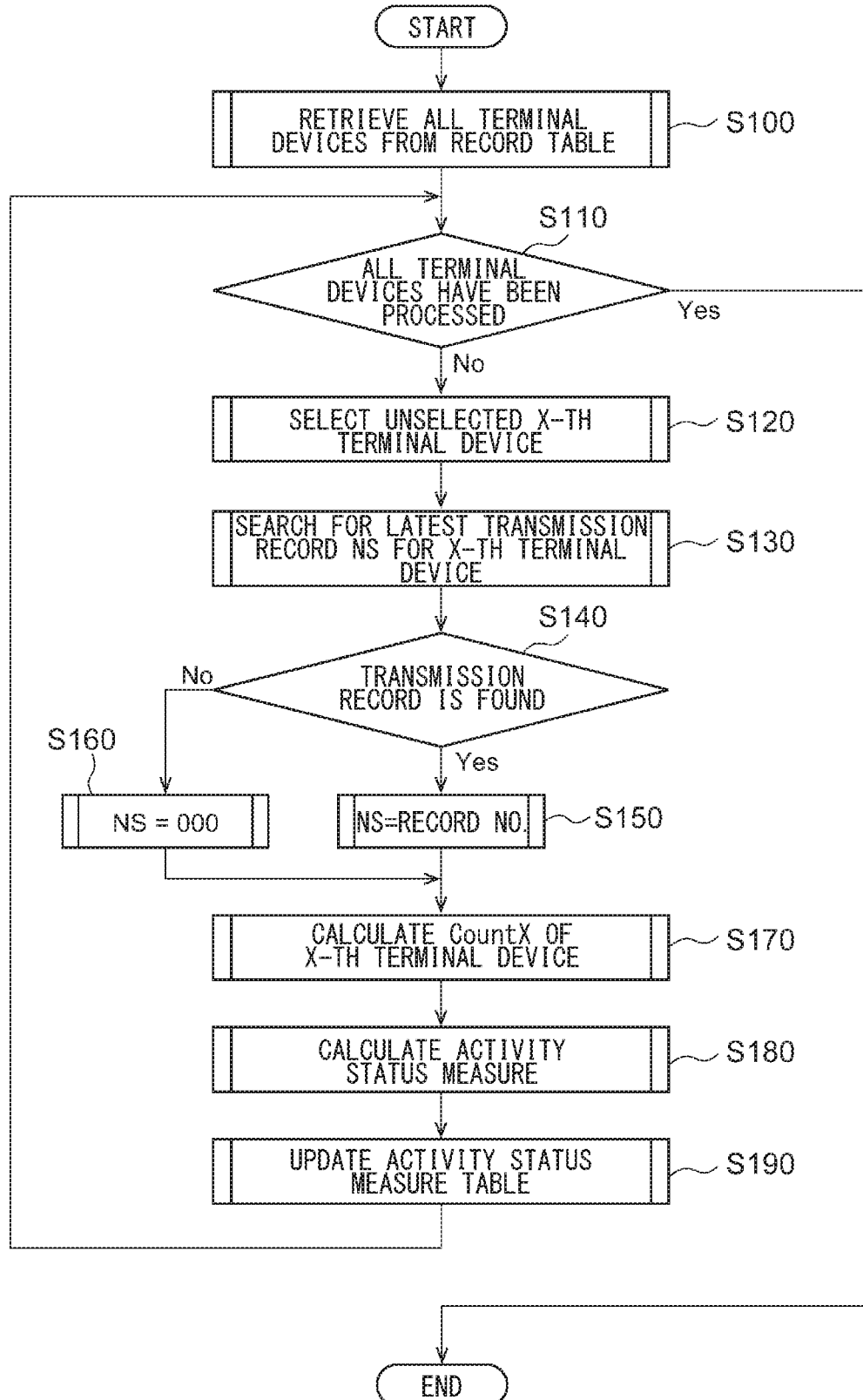
FIG. 11 is a flowchart showing a sequence of steps performed in the management device.

FIG. 11 is a flowchart showing a sequence of steps performed in the management device 12. The flowchart shows steps of the activity status estimation process. In S100, the index calculator 350 refers to the record table 362 and retrieves all terminal devices 16 recorded as calling terminal devices 16 and as receiving terminal devices 16 in the record. All terminal device names and IDs retrieved are saved in a list ML. The list ML is initialized when the steps are started. The list ML is emptied temporarily, and all terminal device names and IDs retrieved are then saved in the list. In S110, the index calculator 350 refers to the list ML and determines whether all terminal devices 16 have been processed. When all terminal devices 16 have been processed, i.e., when one or more terminal device names and IDs are not saved in the list ML (S110: Yes), the process is terminated. When not all of the terminal devices 16 have been processed, i.e., when one or more terminal device names and IDs are saved in the list ML (S110: No), control proceeds to S120.

In S120, the index calculator 350 selects an arbitrary X-th terminal device 16x from the terminal devices 16 saved in the list ML. In this step, the index calculator 350 retrieves the terminal device name and ID of the X-th terminal device 16x from the list ML and then deletes the terminal device name and ID of the X-th terminal device 16x from the list ML. In other words, information on the unprocessed terminal devices 16 is saved in the list ML, and one of the unprocessed terminal devices 16 is selected in S120. The index calculator 350 then proceeds to S130. In S130, the index calculator 350 refers to the record table 362 and searches for the latest transmission record of the X-th terminal device 16x. As described above, the record table 362 stores a predetermined number of records or records covering a predetermined period of time. The index calculator 350 then proceeds to S140. In S140, the index calculator 350 determines whether a transmission record is identified to be available in the search of S130. When a transmission record is available (S140: Yes), control proceeds to S150. When a transmission record is not available (S140: No), control proceeds to S160. In S150, the index calculator 350 sets the record No. of the transmission record acquired in S130 in a variable NS. The index calculator 350 then proceeds to S170. Since "no transmission records", the index calculator 350 sets "000" in the variable NS in S160 and then proceeds to S170. In S170, the index calculator 350 calculates the number of records (CountX) showing that the X-th terminal device 16x receives a call since the point of time of NS until the current time. The index calculator 350 then proceeds to S180. In S180, the index calculator 350 calculates the activity status measure X of the X-th terminal device 16x from CountX calculated in S170 according to, for example, (formula 1). The index calculator 350 then proceeds to S190.

In S190, the index calculator 350 updates (overwrites) the activity status measure of the X-th terminal device 16x in the activity status measure table 364 with the activity status measure X calculated in S180. When the terminal device name and ID of the X-th terminal device 16x is not found in the activity status measure table 364, the index calculator 350 appends a new record for the X-th terminal device 16x and stores the terminal device name, ID, activity status measure in the record. The index calculator 350 then returns to S110. As described above, every time the index calculator 350 updates the activity status measure table 364 by running steps in the above flowchart, the index calculator 350 delivers the whole content of the new activity status measure table 364 to each terminal device 16. Alternatively, the index calculator 350 delivers the whole content of the activity status measure table 364 to each terminal device 16 at a predetermined interval (e.g., at an interval of one minute).

Figure 12:
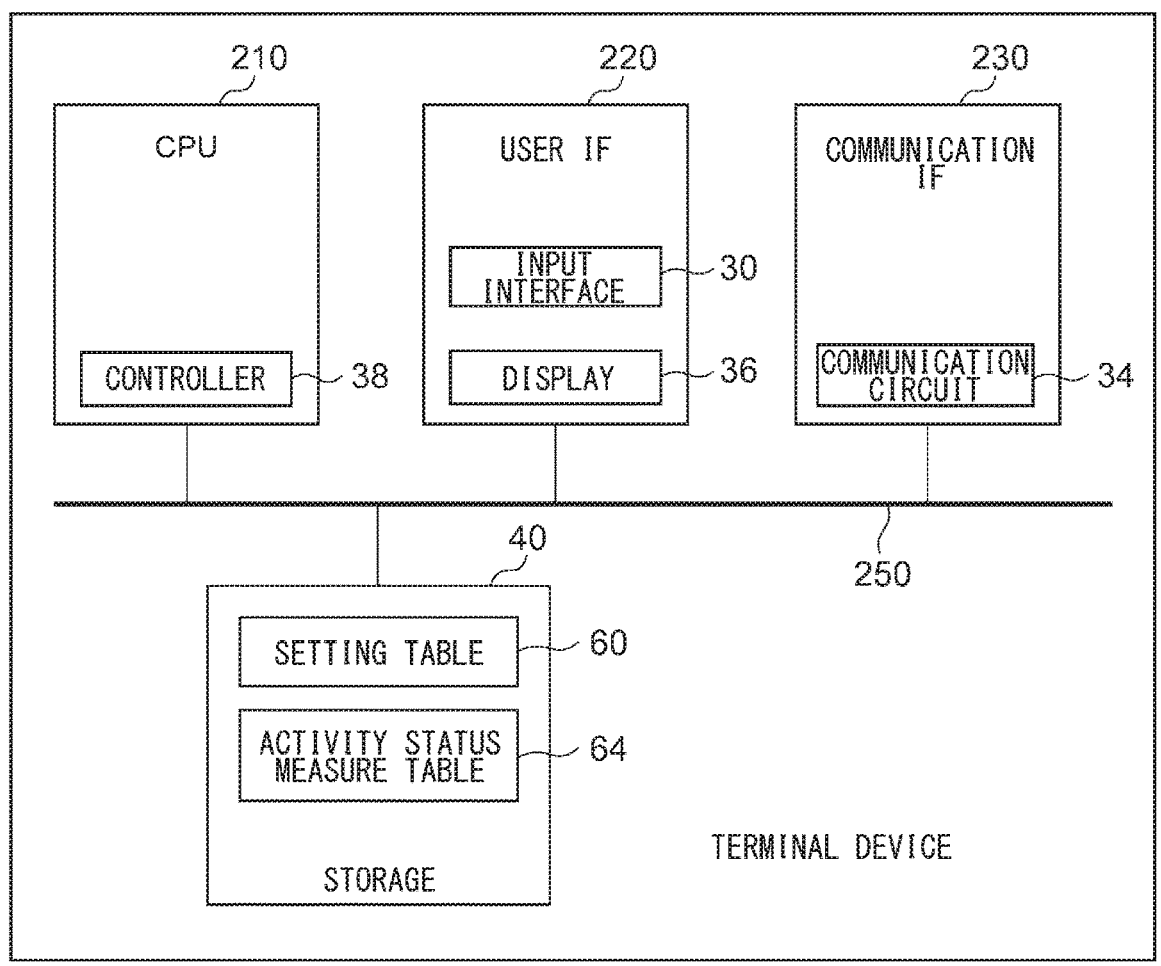
FIG. 12 shows a hardware configuration and functional blocks of the terminal device.

FIG. 12 shows a hardware configuration and functional blocks of the terminal device 16. The terminal device 16 includes a CPU 210, a user interface (IF) 220, a communication IF 230, and a storage 40. The CPU 210, the user IF 220, the communication IF 230, and the storage 40 are connected by a bus 250.

The user IF 220 is an interface for the user 18. The user IF 220 receives information from the user 18 or presents information to the user 18. The communication IF 230 communicates with the base station device 14 by using wireless communication. The communication IF 230 also communicates with the management device 12 via the base station device 14. The storage 40 is a medium for storing information and is comprised of, for example, a non-volatile semiconductor memory.

The CPU 210 includes a controller 38, and the user IF 220 includes an input interface 30 and a display 36, and the communication IF 230 includes a communication circuit 34. The storage 40 includes a setting table 60 and an activity status measure table 64.

Figure 13:
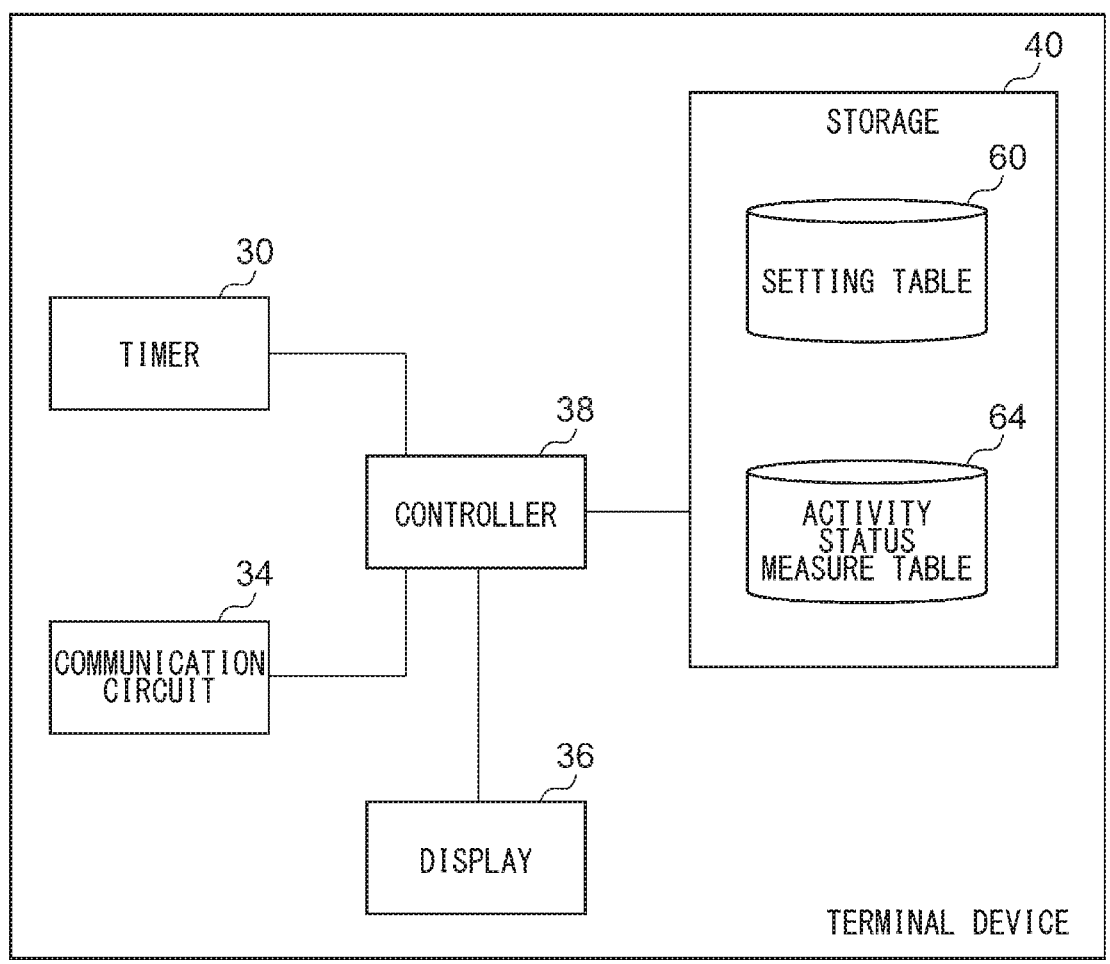
FIG. 13 shows detailed functional blocks of the terminal device.

FIG. 13 shows detailed functional blocks of the terminal device 16. The terminal device 16 includes the input interface 30, the communication circuit 34, the display 36, the controller 38, and the storage 40. The storage 40 includes the setting table 60 and the activity status measure table 64. The input interface 30 includes buttons manipulated by the user 18 of the terminal device 16, an input device such as a touch-sensitive panel, and an interface for notifying the controller 38 of the status of the input device. The input interface 30 also includes a talk button held down to originate a call. The status of the talk button held down is detected in the input interface 30 and input to the controller 38.

The display 36 is an interface for displaying the setting and call status of the terminal device 16 and is, for example, a display. Various setting information related to the terminal device 16 is recorded in the setting table 60. For example, information related to RBT usage setting (RBT setting information) is recorded in the setting table 60. More specifically, information (e.g., the values 0, 1, 2) indicating which of "do not use", "always use", "select when making a call" is selected by the user 18 is recorded in the RBT usage setting.

The communication circuit 34 receives the activity status measure of each terminal device 16 delivered from the management device 12. The activity status measure indicates the activity status of the user 18 using the terminal device 16 and is one of easiness-of-communication indices showing the easiness of communication in each of the plurality of terminal devices 16. The activity status measure table 64 keeps a record of the activity status measure received in the communication circuit 34. When the communication circuit 34 receives information on the activity status measure of each terminal device 16 from the management device 12, the communication circuit 34 notifies the controller 38 of the reception, whereupon the controller 38 temporarily initializes the content of the activity status measure table 64 and then records the information on the activity status measure of each terminal device 16 received. The configuration of the activity status measure table 64 is the same as that of FIG. 9.

The user 18 of the terminal device 16 selects a destination terminal device 16 and then talks with the user of a further terminal device 16 by holding the talk button down in the input interface 30. It is assumed here that the X-th terminal device 16x is selected as the destination terminal device 16. When the input interface 30 detects that the talk button is held down, the controller 38 refers to the setting table 60 and checks the RBT usage setting. When "do not use" is selected in the RBT usage setting in FIG. 4A, or when "select when making a call" is selected in the RBT usage setting and "normal call origination" is selected in the "call origination selection" screen of FIG. 4B, the controller 38 acquires the activity status measure of the destination X-th terminal device 16x from the activity status measure table 64. When the activity status measure acquired is less than a predetermined value (a predetermined threshold value of, for example, 7), the controller 38 switches the call origination method from normal call origination to RBT call origination automatically. This represents a case where it is not so likely that the X-th user 18x will know the content of communication in the destination X-th terminal device 16x, i.e., it is possible that the call origination information of the user 18 of the host terminal device 16 will be wasted. This step is based on the knowledge that it is unnatural for the X-th terminal device 16x to originate a call a single time regardless of the fact that the X-th terminal device 16x has received calls a certain number of times and that it is likely that the X-th user 18x of the X-th terminal device 16x is not near or nor active.

Given that the content of the activity status measure table 64 of the terminal device 16 is the same as that of FIG. 9 and that the threshold value is set to "7", the terminal devices 16 for which a switch is made from normal call origination to RBT call origination are the second terminal device 16b (ID: 002) and the fourth terminal device 16d (ID: 004) with values less than the threshold value "7". When the activity status measure is equal to or more than the threshold value, the controller 38 maintains normal call origination. The threshold values of the activity status measure need not be equal for all terminal devices 16 and may be individually defined for the terminal devices 16. When it is known that the second user 18b of the second terminal device 16b does not originate a call often but hears the received call information in many cases, the threshold value for the second terminal device 16b may be lower (smaller) than normal. Alternatively, the respective users 18 of the terminal devices 16 may set the threshold value for determination of RBT call origination on his or her own judgment. For example, when the user 18 attempting to call a further terminal device 16 judges that the information originated by the user 18 is not so important and that there is no problem if it is not heard at the receiving end, the user may set the threshold value for the terminal device 16 used to a low value. When the user judges that the information originated by the user 18 is important and that there is a problem if it is not heard, the user 18 may set the threshold value for the terminal device 16 used to a high value.

In this way, the controller 38 selects either RBT call origination or normal call origination by referring to the activity status measure table 64. RBT call origination is a communication mode in which communication is started when a certain user operation is performed in a further terminal device 16. Normal call origination is a communication mode in which communication is started even when a certain user operation is not performed in a further terminal device 16. The communication circuit 34 transmits a call signal to the further terminal device 16 in accordance with the communication mode selected in the controller 38.

Figure 14:
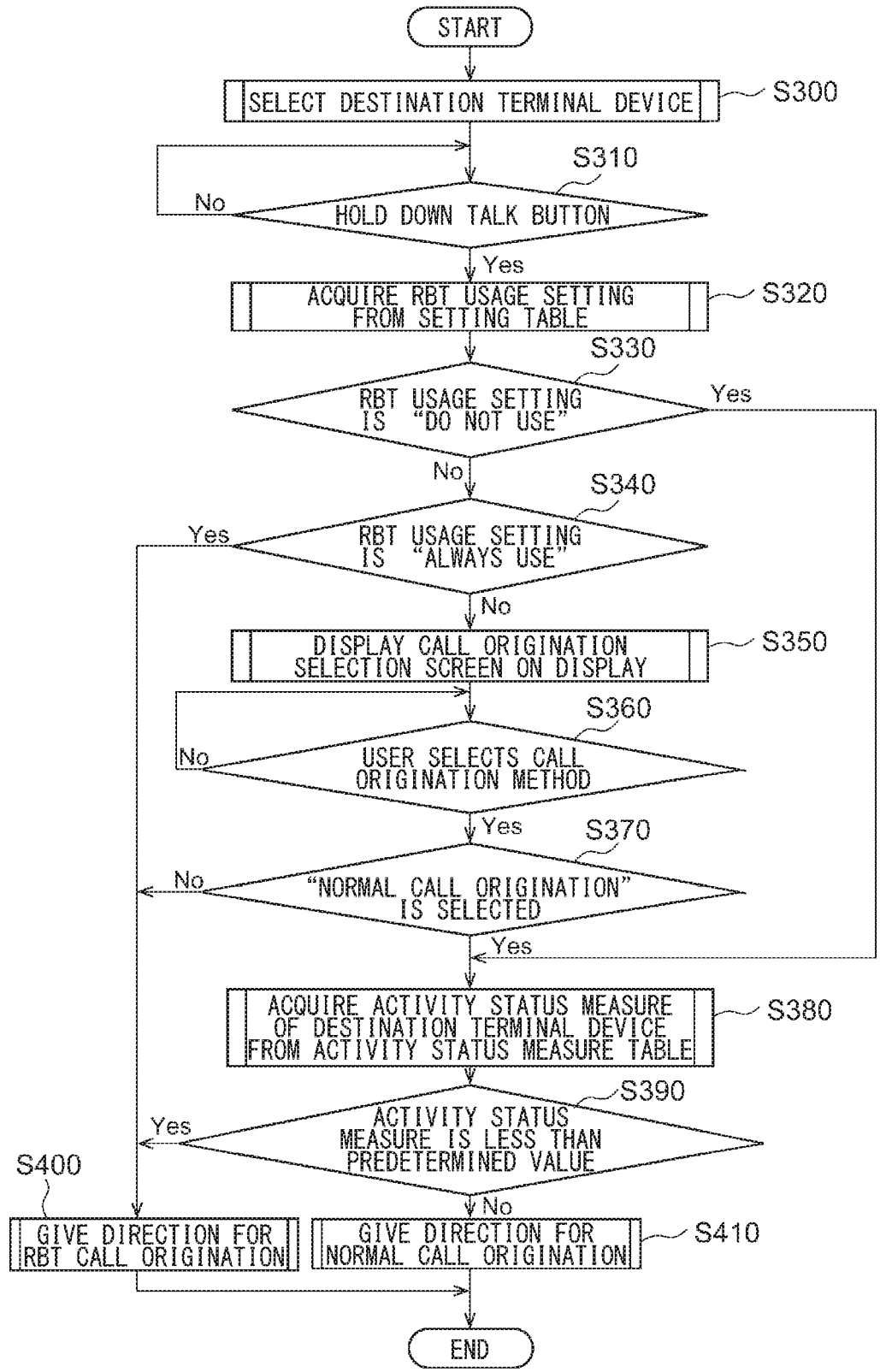
FIG. 14 is a flowchart showing a sequence of steps performed in the terminal device.

FIG. 14 is a flowchart showing a sequence of steps performed in the terminal device 16. In S300, the controller 38 records the ID of the terminal device 16 to which a call is originated in a variable Mt. The controller 38 then proceeds to S310. In S310, the controller 38 monitors whether the talk button is held down in the input interface 30. When the talk button is not detected as being held down (S310: No), the controller 38 returns to S310 and repeats the step. When the talk button is detected as being held down (S310: Yes), the controller 38 proceeds to S320. In S320, the controller 38 acquires the RBT usage setting from the setting table 60. The setting table 60 records data related to the usage of RBT selected by the user 18 (data indicating one of "do not use", "always use", "select when making a call"), and the controller 38 acquires the data. The controller 38 then proceeds to S330.

In the case the RBT usage setting is found to indicate "do not use" in S330 (S330: Yes), the controller 38 proceeds to S350. In the case the RBT usage setting is other than "do not use" (S330: No), the controller 38 proceeds to S340. In the case the RBT usage setting is found to indicate "always use" in S340 (S340: Yes), the controller 38 proceeds to S400. In the case the RBT usage setting is other than "always use" (S340: No), the controller 38 proceeds to S350. When the controller 38 proceeds to S350, it means that "select when making a call" is selected. In S350, the controller 38 causes the display 36 to display the call origination selection screen shown in FIG. 48. The controller 38 then proceeds to S360.

In S360, the controller 38 determines whether the user 18 has selected the call origination scheme of the terminal device 16. When the call origination scheme is selected (S360: Yes), the controller 38 proceeds to S370. When the call origination scheme is not selected (S360: No), the controller 38 returns to S360 and repeats the step. In S370, the controller 38 acquires, via the input interface 30, data indicating "RBT call origination" or "normal call origination" selected by the user 18. The controller 38 determines whether "normal call origination" is selected in the call origination selection screen. When "normal call origination" is selected in the call origination selection screen (S370: Yes), the controller 38 proceeds to S380. In the case an option other than "normal call origination" is selected in the call origination selection screen, i.e., in the case "RBT call origination" is selected in this embodiment (S370: No), the controller 38 proceeds to S400.

In S380, the controller 38 acquires from the activity status measure table 64 the activity status measure value of the terminal device 16 recorded in the variable Mt and records the value in a variable Act. When there is no information on the terminal device 16 recorded in the variable Mt, the maximum value "10" of the activity status measure in the example of FIG. 9 is set in the variable Act. In S390, the controller 38 determines whether the variable Act is less than a predetermined value. When the variable Act is less than the predetermined value (S380: Yes), the controller 38 proceeds to S400. When the variable Act is not less than the predetermined value (S380: No), the controller 38 proceeds to S410. In S400, the controller 38 directs the communication circuit 34 to perform RBT call origination and terminates the process. In S410, the controller 38 directs the communication circuit 34 to perform normal call origination and terminates the process. The process in S380-S390 is called "RBT call origination assistance process".

According to the embodiment, the easiness-of-communication index indicating the easiness of communication in the terminal device is calculated for each of a plurality of terminal devices, and the easiness-of-communication index is transmitted to each of the plurality of terminal devices. Therefore, it is possible to allow a plurality of types of communication modes to be used properly. By calculating the easiness-of-communication index based on the number of times that the terminal device receives a call since the call origination from the terminal device, the activity status of the user using the terminal device can be reflected in the easiness-of-communication index. By calculating the easiness-of-communication index based on the elapsed time elapsed since the point of time of call origination from the terminal device, the activity status of the user using the terminal device can be reflected in the easiness-of-communication index. Since it is expected that the larger the number of times that the terminal device receives a call since the call origination from the terminal device, the lower the activity status of the user, the activity status of the user can be represented by the easiness-of-communication index. Since it is expected that the longer the elapsed time since the point of time of call origination from the terminal device, the lower the activity status of the user, the activity status of the user can be represented by the easiness-of-communication index.

By selecting one of the first communication mode and the second communication mode based on the easiness-of-communication index received, the plurality of types of communication modes can be used properly. Since the easiness-of-communication index indicates the activity status of the user using the terminal device, the plurality of types of communication modes can be used properly according to the activity status. By causing the management device to determine the activity status of each terminal device and notify the terminal device of the result of determination, the occurrence of wasted calls resulting from changing the communication method in the terminal device is reduced. The user operation of the user is prevented from becoming complicated and, at the same time, information can be properly communicated to the receiving end.

Variation of Embodiment 1

A description will now be given of a variation of embodiment 1. In the variation, each terminal device 16 transmits the threshold of its own to the management device 12, and the threshold values of the respective terminal devices 16 are recorded in the storage 340 of the management device 12 in the form of an activity status threshold value table. The communication system 100, the management device 12, and the terminal device 16 according to the variation are of the same type as those of FIGS. 1, 6, 7, 12, and 13. The description below highlights a difference from embodiment 1. The user 18 of each terminal device 16 manipulates the input interface 30 to input the threshold value of the host terminal device 16, based on the balance between call origination and call reception, frequency of leaving the seat, behavior pattern, etc. The communication circuit 34 of each terminal device 16 transmits the threshold value that should be compared with the activity status measure to the management device 12. The communication circuit 334 of the management device 12 receives the threshold value from each terminal device 16.

The controller 338 aggregates the threshold values for the plurality of terminal devices 16 and stores the values in the storage 340 in the form of an activity status threshold value table. FIG. 15 shows a data structure of the activity status threshold value table stored in the storage 340 of the management device 12. The name of the terminal device 16 and the ID of the terminal device 16 are entered in the "terminal device name and ID" field, and the value transmitted from each terminal device 16 is entered in the "threshold value of activity status measure" field. The communication circuit 334 periodically transmits the activity status threshold table to each of the plurality of terminal devices 16.

The communication circuit 34 of the terminal device 16 receives the activity status threshold value table from the management device 12. The controller 38 stores the activity status threshold value table in the storage 40. When a call is originated to a further terminal device 16, the controller 38 of the terminal device 16 refers to the activity statue threshold value table in the storage 40 and acquires the threshold value of the activity status measure of the receiving terminal device 16. The controller 38 defines the acquired threshold value as PV and compares the activity status measure of the receiving terminal device 16 with PV. When the activity status measure of the receiving terminal device 16 is less than PV, the controller 38 automatically switches the call origination method to RBT call origination.

In other words, the controller 38 retrieves the threshold value for the receiving terminal device 16 from the activity status threshold value table and selects RBT call origination or normal call origination by comparing the activity status measure of the receiving terminal device 16 with the retrieved threshold value. Referring to FIGS. 9 and 15, when the user 18 of the first terminal device 16a originates a call to the second terminal device 16b, for example, the current activity status measure of the second terminal device 16b is "6", and the threshold value (predetermined value) PV for the activity status measure of the second terminal device 16b is "5". In this case, the current activity status measure "6" of the second terminal device 16b is larger than the PV of the second terminal device 16b of "5" so that the controller 38 does not switch to RBT call origination.

According to this variation, the threshold value that should be compared with the activity status of the user is received from each terminal device, and the table aggregating the threshold values for the plurality of terminal devices is transmitted to each of the plurality of terminal devices. Therefore, the plurality of terminal devices are notified of the threshold values for the respective terminal devices. By notifying the plurality of terminal devices of the threshold values of the respective terminal devices, the threshold values unique to the respective terminal devices can be used.

By receiving the table aggregating the threshold values for the plurality of terminal devices and using the table by retrieving the threshold value for the further terminal device from the table, the threshold values unique to the respective terminal devices can be used. By causing the terminal device that tends to have a low activity status measure, i.e. the terminal device that receives a call but does not originate a call often to set the predetermined value for the activity status measure of its own to a low value, the likelihood of wasted switches to RBT call origination at the transmitting end is reduced.

Embodiment 2

A description will now be given of embodiment 2. In embodiment 2, the controller of the management device creates a time-zone-based activity status measure table in the storage to keep a record of the activity status measure of each terminal device for each predetermined time zones over a long period of time. The communication system 100, the management device 12, and the terminal device 16 according to embodiment 2 are of the same type as those of FIGS. 1, 6, 7, 12, and 13. The following description concerns a difference from the foregoing.

FIG. 16 shows a data structure of the time-zone-based activity status measure table 364 stored in the storage 340 of the management device 12. The activity status measure of the terminal device 16 at a given point of time is stored in a table dedicated to each terminal device 16 individually. For example, the activity status measure of each terminal device 16 in each time zone (an interval of 1 hour) in a 24-hour unit (from 00:00:00 to 23:59:59) is calculated, and the activity status measure is recorded over a predetermined period of time (e.g., two months). Numerals indicate the activity status measure calculated in the associated time zone. The number of days for which the record is made may be smaller or larger than that of the exemplary configuration.

The controller 338 of the management device 12 creates an activity status measure average value table that stores an average value of the activity status measures for each time zone. The activity status measure average value table is created by using the value of the activity status measure for each time zone in the time-zone-based activity status measure table. In the case two-month data is recorded in the time-zone-based activation status measure table, for example, the controller 38 uses the two-month data to calculate an average value of the activity status measures for each time zone and records the average value in the activity status measure average value table. The average value can be said to be the activity status measure averaged for each time zone.

FIG. 17 shows a data structure of the activity status measure average value table stored in the storage 340 of the management device 12. The name of each terminal device 16 is entered in the "terminal device name" Field, the time zone over which the average value of the activity status measures is calculated is entered in the "time zone" field, and the average value of the activity status measures in that time zone is entered in the "average value" field. For example, the average value of the first terminal device 16a in the time zone "00:00-01:00" is an average value derived from averaging the activity status measures recorded in the column "00:00-01:00" in the table for the first terminal device 16a in the date-based and time-zone-based activity status measure table of FIG. 16. The activity status measure average value table makes it possible to estimate a time zone in which the activity status measure of each terminal device 16 is high and a time zone in which it is low.

The communication circuit 34 of the terminal device 16 transmits the activity status measure average value table to each terminal device 16 at a predetermined interval (e.g., once in every 24 hours). The communication circuit 34 of the terminal device 16 receives the activity status measure average value table from the management device 12 and then records the activity status measure average value table in the storage 40. The flow of the call origination process in the terminal device 16 according to this embodiment is similar to that of the process of embodiment 1 shown in FIG. 14. The difference is that, unlike the case of embodiment 1, the RBT call origination assistance process (S380-S390) includes S380A-S390A in this embodiment. When the terminal device 16 originates a call to a further terminal device 16, S300 through S370 in the flowchart of FIG. 14 of embodiment 1 are performed. In S380A corresponding to S380, the controller 38 acquires "the average value of the activity status measures of the destination terminal device 16 from the activation status measure average value table" instead of acquiring the average status measure value from the activity status measure table 64. In this process, the controller 38 identifies the time zone corresponding to the current time (the point of time of the process) from among the time zones in the activity status measure average value table and acquires the average value of the activity status measures in the identified time zone. The controller 38 proceeds from S380A to S390A. In S390A corresponding to S390, the controller 38 determines whether the average value of the activity status measures is less than a predetermined value.

Alternatively, the activity status measure average value table may be created for each combination of the day of week and the time zone. For example, 168 (seven days (Monday-Sunday)×24 hours (for each hour)=168) cells are prepared per one terminal device 16 in the table, and the average value of the activity status measures is calculated for each cell. When the step of S380A is performed at "13:30:00" on Thursday, for example, the activity status measure average value corresponding to the time zone "13:00-14:00 on Thursday" is acquired from the activity status measure average value table. Similarly, the activity status measure average value table may be created for each combination of the date and the time zone. For example, 744 (31 days×24 hours=744) cells are prepared per one terminal device 16 in the table, and the average value of the activity status measures is calculated for each cell.

Alternatively, the controller 38 may change the determination condition in S390A in accordance with the date and time when S390A is performed. For example, the controller 38 may refer to the activity status measure average value table to identify a period in which the activity status measure is relatively low (the time zone, day of week, date, or a combination of these) and may change the determination condition in S390A in the case the current time falls within the identified period. In the case the time zone between 13:00 and 14:00 after lunch is identified as a time zone of low activity status measure and the current time falls within that time zone, the controller 38 may configure the threshold value used in S390A to be larger than normal, making transition to S400 easier. As already described above, the controller 38 may change the determination process in S390A for each combination of the day of week and the time zone or each combination of the date and the time zone.

Alternatively, the controller 38 may not use the activity status measure average value table. The user 18 of the terminal device 16 or the manager of the communication system may register a particular period (the time zone, day of week, date, or a combination of these) in advance and may change the determination condition in S390 depending on whether the current time falls within the particular period.

According to this embodiment, the easiness-of-communication index shows the activity status of the user averaged for each time zone so that the communication mode suited to the time zone can be used. Since the process is performed by using the activity status measure extending over a long period of time, the precision of RBT call origination assistance is improved.

Embodiment 3

A description will now be given of embodiment 3. In embodiment 3, RBT call origination assistance is not performed in the terminal device, and RBT call origination assistance is performed in the management device. The communication system 100, the management device 12, and the terminal device 16 according to embodiment 3 are of the same type as those of FIGS. 1, 6, 7, 12, and 13. The following description concerns a difference from the foregoing.

As in embodiment 1, the index calculator 350 of the management device 12 calculates the activity status measure as the easiness-of-communication index, based on at least one of the number of times that the terminal device 16 receives a call since the call origination from that terminal device 16 and the elapsed time elapsed since the point of time of call origination from the terminal device 16. The storage 340 stores the activity status measure table 364 aggregating the activity status measures of the plurality of terminal devices 16. As described above, the larger the number of times that the terminal device 16 receives a call since the call origination from that terminal device 16, or the longer the elapsed time elapsed since the point of time of call origination from the terminal device 16, the lower the activity status measure. In this embodiment, the management device 12 does not deliver the information in the activity status measure table 364 to each terminal device 16. Meanwhile, the terminal device 16 omits the steps of S380-S390 in the flowchart shown in FIG. 14. When a determination of Yes is yielded in S370, the terminal device 16 performs normal call origination in S410.

Subsequently, the communication circuit 334 of the management device 12 receives communication request data for RBT call origination (the first communication mode) or normal call origination (the second communication mode) from the calling terminal device 16 (the call originating terminal device 16). The communication request data is also called communication start request data or communication start data. When the communication circuit 334 receives normal call origination of the calling terminal device 16, the management device 12 performs steps similar to S380-S390. In other words, the controller 338 refers to the activity status measure table 364. When the activity status measure of the destination terminal device 16 is less than the predetermined value, the controller 338 calls the destination terminal device 16 by using the RBT call origination protocol instead of the normal call origination protocol.

Figure 18:
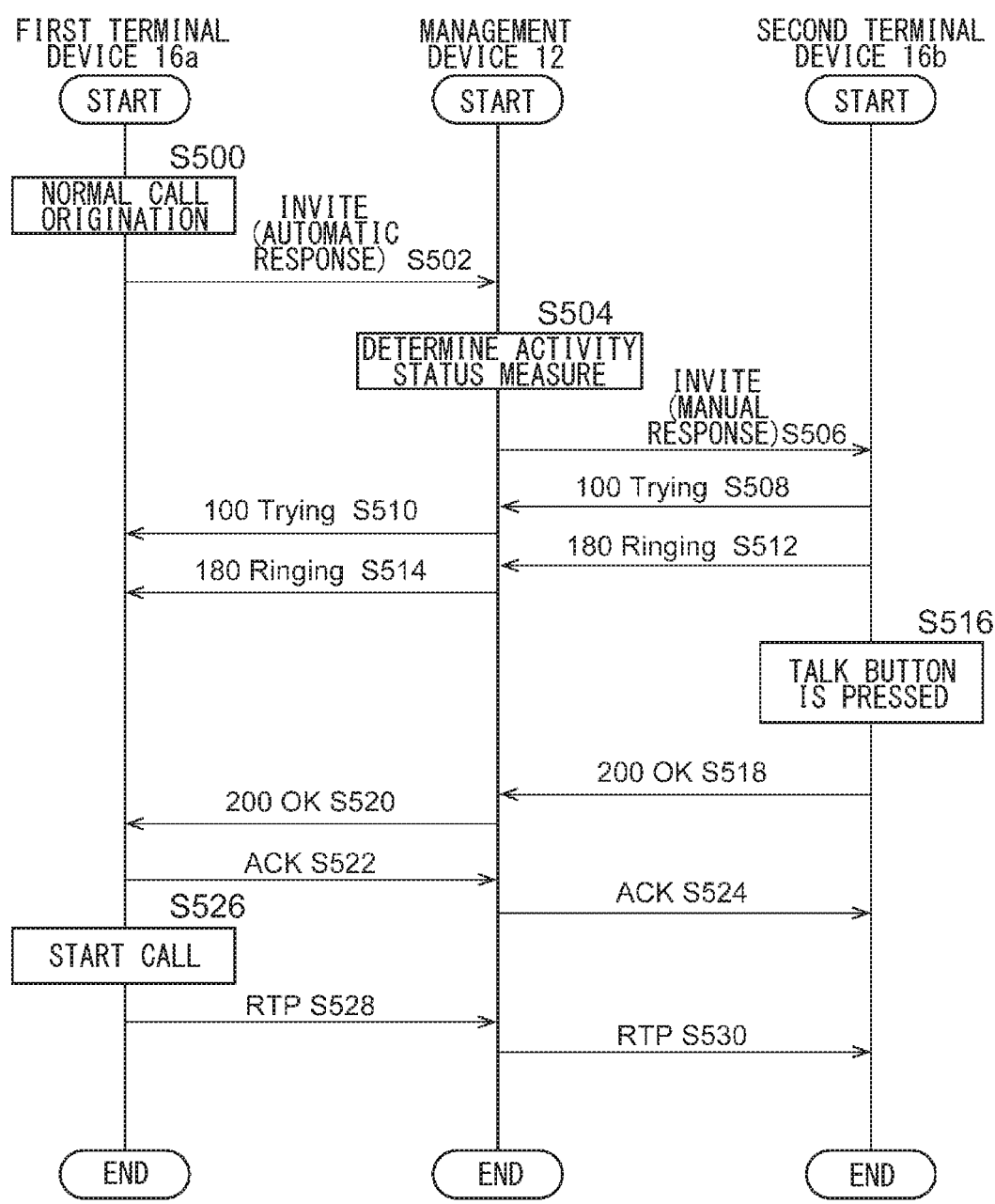
FIG. 18 is a sequence diagram showing steps for communication in the communication system of embodiment 3.

FIG. 18 is a sequence diagram showing steps for communication in the communication system 100. The diagram shows a system operation performed when normal call origination from the first terminal device 16a to the second terminal device 16b is performed. After normal call origination is selected in the first terminal device 16a (S500), the first terminal device 16*a* transmits INVITE (automatic response) to the second terminal device 16*b* (S502). The transmitted INVITE (automatic response) is received by the management device 12. In other words, the management device 12 receives, from the call originating first terminal device 16*a*, communication request data of the second communication mode designating the second terminal device 16*b* as the destination. After receiving INVITE, the management device 12 performs the RBT call origination assistance process (S380-S390). In other words, the management device 12 acquires the activity status measure of the destination second terminal device 16*b* from the activity status measure table 364. The management device 12 determines whether the activity status measure of the second terminal device 16*b* is less than the predetermined value (S504). The diagram shows a case where the activity status measure of the second terminal device 16*b* is less than the predetermined value. When the activity status measure of the second terminal device 16*b* is less than the predetermined value, the management device 12 changes INVITE (automatic response) From the first terminal device 16*a* to INVITE (manual response) and transmits INVITE (manual response) to the second terminal device 16*b* (transforms the protocol) (S506). In other words, when the management device 12 receives communication request data of the second communication mode and when the easiness-of-communication index of the destination second terminal device 16*b* meets a predetermined condition, the management device 12 transmits communication request data of the first communication mode to the second terminal device 16*b*. When the management device 12 receives communication request data of the second communication mode and when the easiness-of-communication index of the second terminal device 16*b* does not meet the predetermined condition, the management device 12 transmits INVITE (automatic response), i.e., communication request data of the second communication mode, to the second terminal device 16*b*. When the management device 12 receives INVITE (manual response) from the first terminal device 16*a*, i.e., receives communication request data of the first communication mode, the management device 12 transmits communication request data of the first communication mode to the second terminal device 16*b*, although the step is omitted in the sequence shown in FIG. 18.

After receiving INVITE (manual response), the second terminal device 16*b* transmits a status code 100Trying to the first terminal device 16*a* (S508). The transmitted status code 100Trying is transmitted to the first terminal device 16*a* via the management device 12 (S510). After transmitting the status code 100Trying, the second terminal device 16*b* transmits a status code 180Ringing to the first terminal device 16*a* (S512). The transmitted status code 180Ringing is transmitted to the first terminal device 16*a* via the management device 12 (S514).

Subsequently, when the talk button of the second terminal device 16*b* is held down (S516), the second terminal device 16*b* transmits a status code 200OK to the first terminal device 16*a* (S518). The transmitted status code 200OK is transmitted to the first terminal device 16*a* via the management device 12 (S520). After receiving the status code 200OK, the first terminal device 16*a* transmits ACK (S522). ACK thus transmitted is transmitted to the second terminal device 16*b* via the management device 12 (S524). After transmitting ACK, the first terminal device 16*a* starts transmitting call data by using RTP (S526, S528, S530).

The management device 12 may perform the variation of embodiment 1. The communication circuit 334 receives from each terminal device 16 the threshold value that should be compared with the activity status of the user 18. The storage 340 stores the activity status threshold value table. The controller 338 uses the activity status threshold value table to determine whether the activity status measure of the receiving terminal device 16 meets a predetermined condition. The communication circuit 334 performs RBT call origination or normal call origination based on the result of determination. Alternatively, the management device 12 may perform the process of embodiment 2. The controller 338 of the management device 12 may perform the RBT call origination assistance process by using the activity status measure average value table showing the activity status of the user 18 averaged for each time zone. In other words, the management device 12 may perform steps similar to S380A-S390A.

According to this embodiment, the easiness-of-communication index indicating the easiness of communication in the terminal device is calculated for each of the plurality of terminal devices, and, when the easiness-of-communication index meets a predetermined condition, the second communication mode is switched to the first communication mode. Therefore, the plurality of types of communication modes can be used properly. By calculating the easiness-of-communication index based on the number of times that the terminal device receives a call since the call origination from the terminal device, the activity status of the user using the terminal device can be reflected in the easiness-of-communication index. By calculating the easiness-of-communication index based on the elapsed time elapsed since the point of time of call origination from the terminal device, the activity status of the user using the terminal device can be reflected in the easiness-of-communication index. Since it is expected that the larger the number of times that the terminal device receives a call since the call origination from the terminal device, the lower the activity status of the user, the easiness-of-communication index can represent the activity status of the user. Since it is expected that the longer the elapsed time since the point of time of call origination from the terminal device, the lower the activity status of the user, the easiness-of-communication index can represent the activity status of the user.

By receiving the table aggregating the threshold values for the plurality of terminal devices, the threshold values for the respective terminal devices can be used. By causing the easiness-of-communication index to show the activity status of the user averaged for each time zone, the communication mode suited to the time zone can be used. The process of delivering the activity status measure table from the management device to the terminal device and the RBT call origination assistance process in the terminal device can be omitted so that the amount of processing and necessary memory size of the terminal device can be reduced. Since the amount of processing and necessary memory size of the terminal device can be reduced, the cost of the terminal device can be reduced. Since the RBT call origination assistance process is performed in the management device, which has a higher processing capacity than the terminal device and is provided with rich resources (memory, etc.), a more complicated process can be performed. Modification of the program of the management device is easier than modification of the program of each terminal device so that the RBT call origination assistance process can be modified easily.

Embodiment 4

A description will now be given of embodiment 4. In the normal call origination process, a call is initiated without holding the talk button down in the receiving terminal device. Therefore, the content of a call may not be understood or heard if the noise level around the place where the user at the receiving end is located is high. The place where the noise level is high is a place where the ambient noise is large and is exemplified by the neighborhood of an airport where huge airliners leave and arrive, the neighborhood of military facilities or military bases where fighter planes leave and arrive, the neighborhood of construction sites of buildings, roads, etc., the neighborhood of railway stations, railway tracks, or railway crossings, and the neighborhood of large commercial facilities (shopping malls), of large leisure facilities (amusement parks, theme parks), of indoor or outdoor spectator facilities (ball parks, football grounds), etc. If "normal call origination" to a terminal device located in a place of a high noise level is performed, the originated information may not be accurately communicated to the user at the receiving end due to the noise around the recipient. In embodiment 4, the noise level around the place where the user is located is measured. The occurrence of wasted calls is reduced by determining whether the ambient noise level presents a problem at the time of reception of a call. The communication system 100 according to embodiment 4 is of the same type as that of FIG. 1. The description below highlights a difference from the foregoing.

Figure 19:
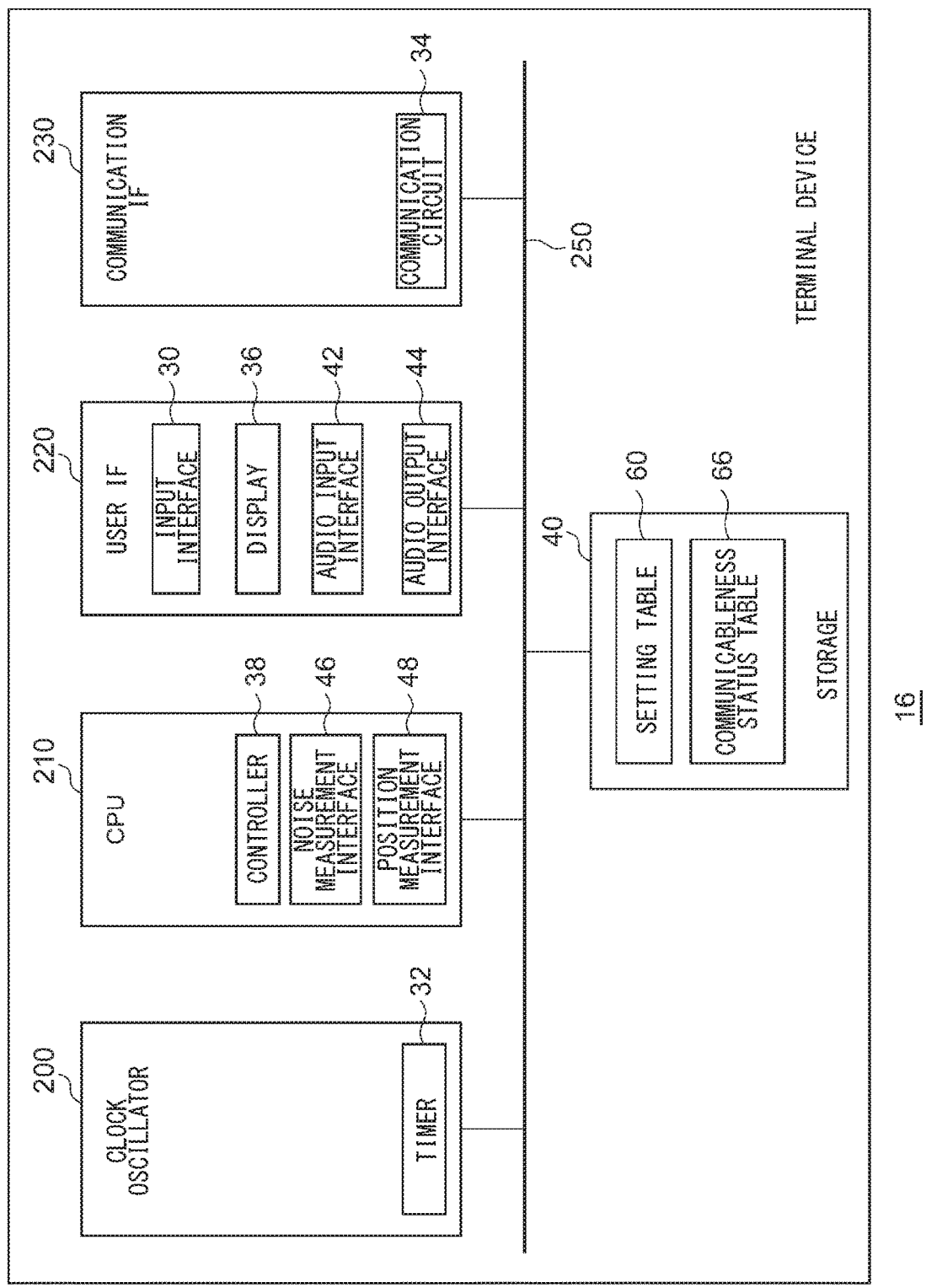
FIG. 19 shows a hardware configuration and functional blocks of the terminal device of embodiment 4.

FIG. 19 shows a hardware configuration and functional blocks of the terminal device 16. The terminal device 16 includes a clock oscillator 200, a CPU 210, a user IF 220, a communication IF 230, and a storage 40. The clock oscillator 200, the CPU 210, the user IF 220, the communication IF 230, and the storage 40 are connected by a bus 250. The clock oscillator 200 includes a timer 32, the CPU 210 includes a controller 38, a noise measurement interface 46, and a position measurement interface 48, the user IF 220 includes an input interface 30, a display 36, an audio input interface 42, and an audio output interface 44, and the communication IF 230 includes a communication circuit 34. The storage 40 includes the setting table 60 and a communicableness status table 66.

Figure 20:
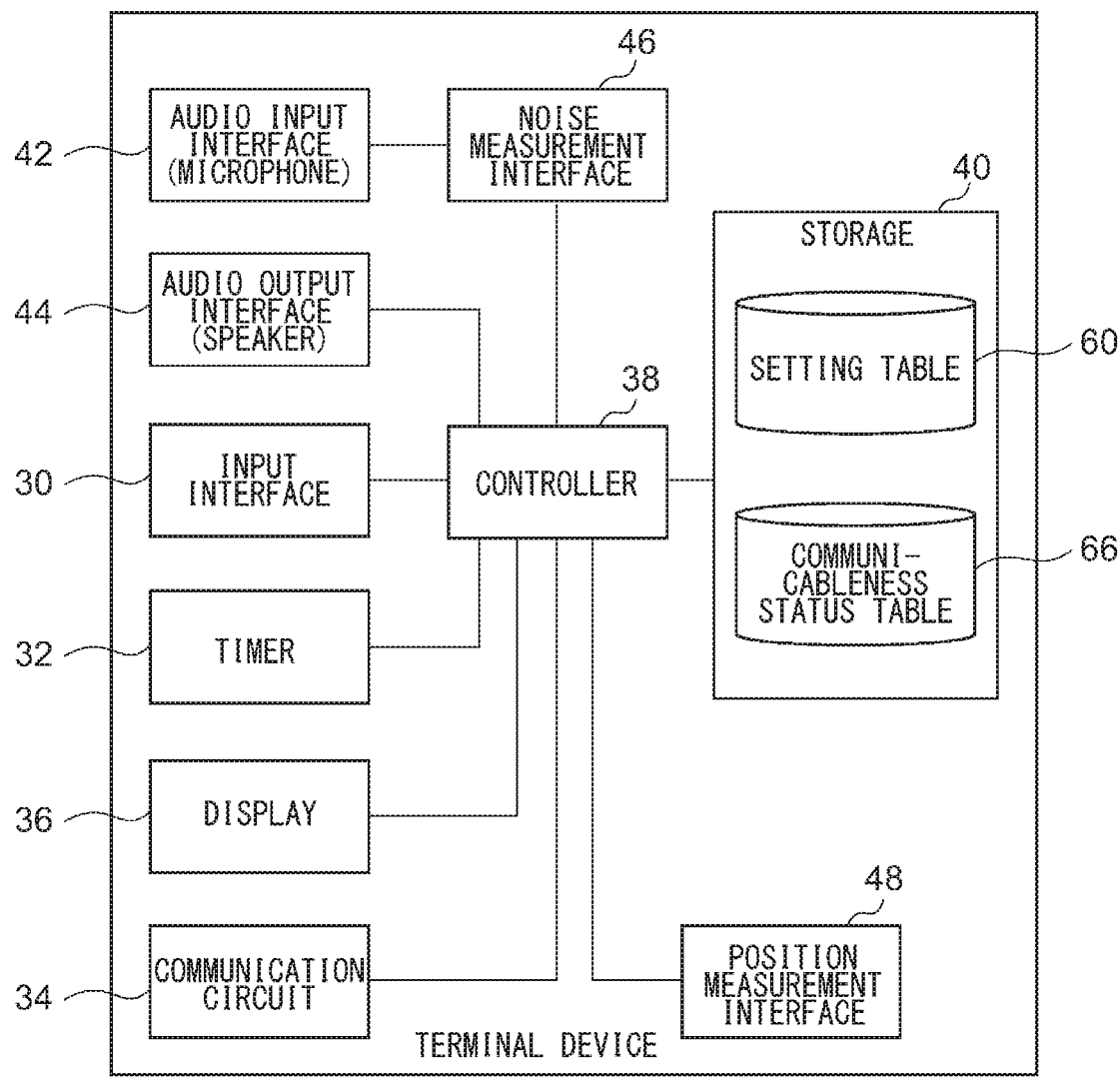
FIG. 20 shows detailed functional blocks of the terminal device.

FIG. 20 shows detailed functional blocks of the terminal device 16. The terminal device 16 includes the input interface 30, the timer 32, the communication circuit 34, the display 36, the controller 38, the storage 40, the audio input interface 42, the audio output interface 44, the noise measurement interface 46, and the position measurement interface 48. The storage 40 includes the setting table 60 and the communicableness status table 66. As described above, the status of the talk button being held down is detected in the input interface 30 and input to the controller 38. The display 36 is an interface for displaying the setting and call status of the terminal device 16. Various setting information related to the terminal device 16 is recorded in the setting table 60. The communicableness status table 66 stored in the storage 40 lists the communicableness status of the terminal devices 16 received from the management device 12. In this embodiment, the communicableness status is used as one of easiness-of-communication indices. Details will be described later.

The audio input interface 42 is, for example, a microphone and is an input interface for audio information used when the user 18 makes a call. In this embodiment, the audio input interface 42 is also used to measure the noise level. The microphone to make a call and the microphone to measure the ambient noise level may be common (the same) or different. For example, a microphone to make a call may be provided on the front surface of the terminal device 16, i.e., on the surface provided with the input interface 30 and the display 36, and another microphone for measuring the ambient noise level may be provided on the back surface of the terminal device 16. By using a common microphone, the cost of the terminal device 16 can be reduced. By providing a microphone dedicated to measurement of ambient noise level, it is possible to measure the noise level more precisely for reasons like "it is easy to measure a noise level during a call" and "measurement can be made with frequency characteristics suited to noise level measurement".

The noise measurement interface 46 turns the acoustic status around the terminal device 16 detected by the audio input interface 42 into a numerical value indicating the noise level. To turn the status into a numerical value, a publicly known technology may be used, and a description thereof is omitted. The audio output interface 44 is a speaker or the like and outputs the sound of a call, an alert sound, etc. The position measurement interface 48 measures the position in which the terminal device 16 is currently located. To describe it more specifically, the position measurement interface 48 acquires the latitude and longitude of the current location from a Global Positioning System (GPS) device.

The controller 38 directs the noise measurement interface 46 to measure the current noise level at a predetermined interval (e.g., once in every one minute). When directed by the controller 38 to measure the noise level, the noise measurement interface 46 receives a signal commensurate with the ambient acoustic status from the audio input interface 42 and turns the status into a numerical value indicating the noise level. Any method of deriving a numerical value of the noise level may be used. In this embodiment, decibel (dB) is used as a unit. The noise measurement interface 46 outputs the noise level turned into a numerical value to the controller 38. When the controller 38 receives the noise level from the noise measurement interface 46, the controller 38 acquires the current time from the timer 32 and acquires the position information (latitude and longitude) on the position where the terminal device 16 is currently located from the position measurement interface 48. The controller 38 turns the current time acquired from the timer 32, the position information (latitude, longitude) acquired from the position measurement interface 48, and the noise level received from the noise measurement interface 46 into a packet. In this embodiment, the packet is called a noise level packet.

FIG. 21 shows a data structure of a noise level packet transmitted from the terminal device 16. As shown in the figure, the name and ID of the terminal device 16 are entered in the "terminal device ID and ID" field. The current time acquired from the timer 32 is entered in the "point of time of measurement" field, the position information (latitude, longitude) acquired from the position measurement interface 48 is entered in the "current position (latitude, longitude)" field, and the noise level received from the noise measurement interface 46 is entered in the "noise level (dB)" field. An exemplary entry "10:19:14" in the "point of time of measurement" field means "19 minutes and 14 seconds past 10 o'clock". In the case the user 18 is talking to the user of a further terminal device 16 at a point of time that the noise level is measured, the noise measurement interface 46 may suspend the measurement of the noise level or may measure the noise level once the talk with the user of the further terminal device 16 is terminated.

In the case a microphone for measuring the noise level is provided in the terminal device 16 as mentioned above, in particular, the noise level measurement process may be performed during a talk. By subtracting, from the output signal of the microphone for measuring the noise level, the component in phase with the output signal of the microphone for a voice call, for example, the signal for the sound of a call is reduced and the noise component is extracted. In the case the terminal device 16 is located indoors or underground and it is not possible to acquire the position information (latitude, longitude) from the position measurement interface 48, the controller 38 may suspend generating a noise level packet. Reference is made back to FIG. 20. The communication circuit 34 is used for communication with the management device 12 and for communication with a further terminal device 16. For example, the communication circuit 34 transmits the noise level packet to the management device 12.

Figure 22:
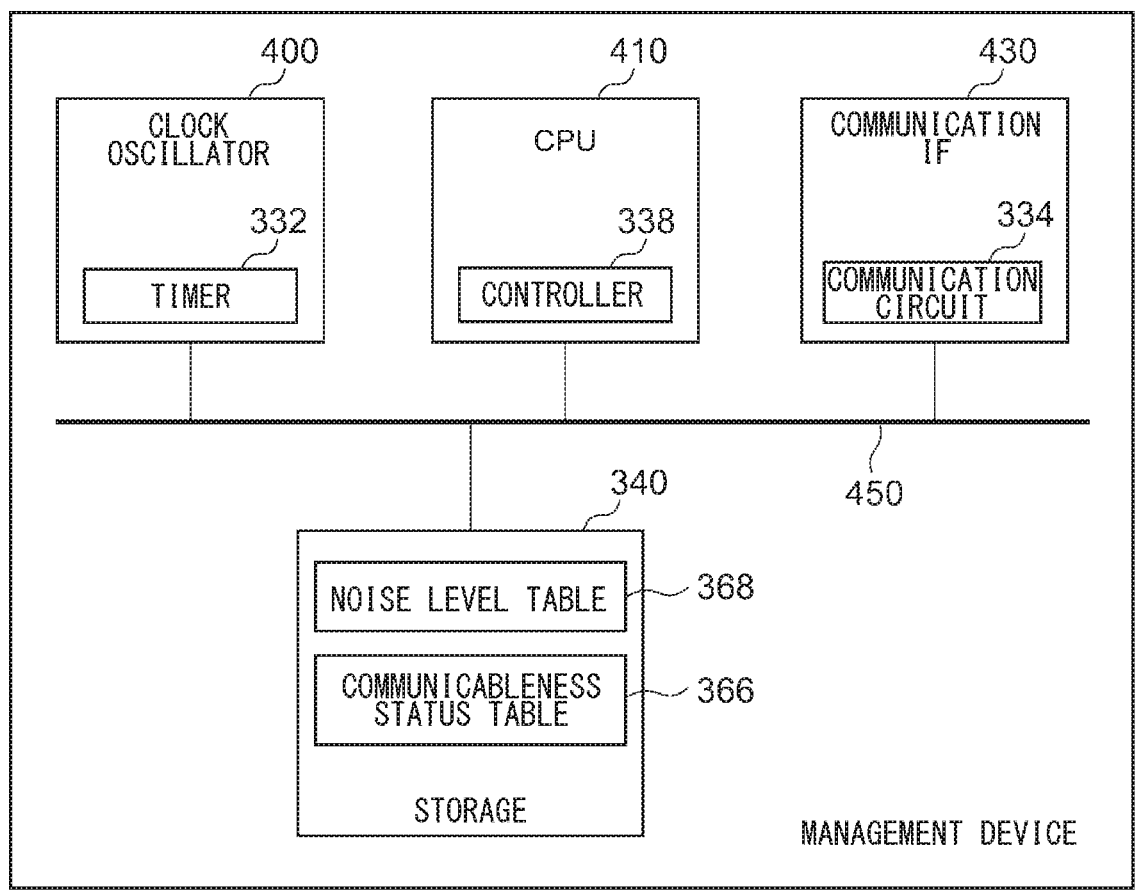
FIG. 22 shows a hardware configuration and functional blocks of the management device.

FIG. 22 shows a hardware configuration and functional blocks of the management device 12. The management device 12 includes a clock oscillator 400, a CPU 410, a communication IF 430, and a storage 340. The clock oscillator 400, the CPU 410, the communication IF 430, and the storage 340 are connected by a bus 450. The clock oscillator 400 includes a timer 332, the CPU 410 includes a controller 338, and the communication IF 430 includes a communication circuit 334. The storage 340 includes a communicableness status table 366 and a noise level table 368.

Figure 23:
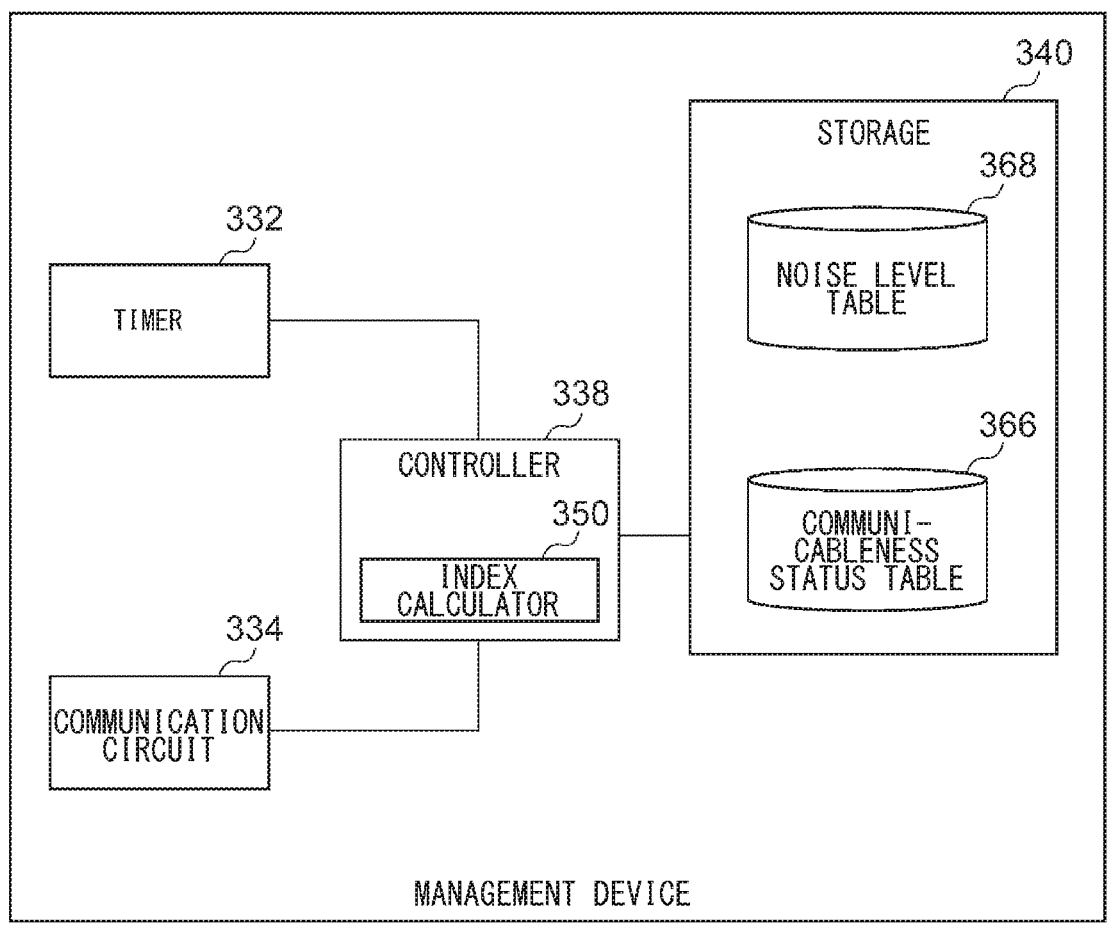
FIG. 23 shows detailed functional blocks of the management device.

FIG. 23 shows detailed functional blocks of the management device 12. The management device 12 includes the timer 332, the communication circuit 334, the controller 338, and the storage 340. The controller 338 includes an index calculator 350, and the storage 340 includes the communicableness status table 366 and the noise level table 368. The communication circuit 334 detects a call by receiving a signal from the terminal device 16. The communication circuit 334 also receives a noise level packet transmitted from the terminal device 16 at a predetermined interval. The noise level packet represents information related to the loudness of sound around the terminal device 16. The communication circuit 334 outputs the noise level packet to the controller 338.

When the noise level packet is received from each terminal device 16, the controller 338 updates (overwrites) the noise level table 368 with the content of the received noise level packet. In the case there are no records for the terminal device 16 in the noise level table 368, the controller 338 adds a new record for the terminal device 16. In other words, the noise level table 368 keeps a record of the latest information on the noise level for each terminal device 16. The noise level table 368 records the noise level packet transmitted from each terminal device 16. FIG. 24 shows a data structure of the noise level table 368 in the management device 12. The parameters in the noise level table 368 are the same as those described with reference to FIG. 21 showing an exemplary configuration of the noise level packet. Reference is made back to FIG. 23. Details of the communicableness status table 366 will be described later.

The index calculator 350 of the controller 338 refers to the noise level table 368 and performs a communicableness status determination process at a predetermined interval (e.g., once in every one minute) or at a point of time that a noise level packet is received from one of the terminal devices 16. The communicableness status determination process is a process for determining the noise status around the terminal device 16 by referring to the noise level around each terminal device recorded in the noise level table 368. Details of the communicableness status determination process will be described later. The communicableness status table 366 in the storage 340 is updated by performing the communicableness status determination process.

FIG. 25 shows a data structure of the communicableness status table 366 in the management device 12. The name and ID of the terminal device 16 are entered in the "terminal device name and ID" field. The result of determination as to whether it is difficult, due to the ambient noise, to talk when the terminal device 16 receives a call from another terminal is entered in the "communicableness status" field. In the case the communicableness status is "1", it means that the noise level around the terminal device 16 is less than a predetermined value (e.g., 60 dB) and the likelihood that a call originated to the terminal device 16 is not heard is low. In the case the communicableness status is "0", it means that the noise level around the terminal device 16 is equal to or more than a predetermined value (e.g., 60 dB) and the likelihood that a call originated to the terminal device 16 is not heard is high. In other words, the communicableness status indicates the easiness with which the user 18 using the terminal device 16 recognizes communication. The communicableness status also indicates the easiness with which the user 18 using the terminal device 16 recognizes the presence of communication (call) and/or the easiness with which the user 18 understands the content of communication (call). Reference is made back to FIG. 23.

A description will now be given of the detail of the communicableness status determination process. The index calculator 350 determines the communicableness status of all terminal devices 16 listed in the noise level table 368. To determine the communicableness status of the N-th terminal device 16$n$, the index calculator 350 acquires the current position (latitude, longitude) of the N-th terminal device 16$n$ and the current position (latitude, longitude) of the further terminal devices 16 from the noise level table 368. The index calculator 350 also searches for another M-th terminal device 16$m$ located in the neighborhood of the N-th terminal device 16$n$. Denoting the latitude and longitude of the N-th terminal device 16$n$ by (Nn, En) and denoting the latitude and longitude of the M-th terminal device 16$m$ by (Nm, Em), the distance d between the N-th terminal device 16$n$ and the Meth terminal device 16$m$ is calculated according to (formula 6).

$$d = R \cos^{-1}(\sin E_n \sin E_m + \cos E_n \cos E_m \cos(N_m - N_n)) \quad \text{(formula 6)}$$

where R denotes the radius of the earth (6378.137 km).

Alternatively, the distance d may be calculated according to the approximation of (formula 7).

$$d = \sqrt{(\delta_1(N_m - N_n))^2 + (\delta_2(E_m - E_n))^2} \quad \text{(formula 7)}$$

where δ1 is an average distance per one degree of latitude. For example, δ1=111 km. δ2 is an average distance per one degree of longitude. For example, δ2=91 km. When the distance d is less than a predetermined distance (e.g., 10 m), it can be said that the N-th terminal device 16$n$ and the M-th terminal device 16$m$ are located in the neighborhood. The M-th terminal device 16$m$ that meets this condition is referred to as a neighboring terminal device 16 of the N-th terminal device 16$n$. In the case there are plurality of (a total of p) neighboring M-th terminal devices 16$m$, those will be referred to as the M1-th terminal device 16$m$1-the Mp-th terminal device 16$mp$. When the distance d is equal to or larger than a predetermined distance (e.g., 10 m), it cannot be said that the N-th terminal device 16$n$ and the M-th terminal device 16$m$ are located in the neighborhood.

When no terminal devices 16 are located in the neighborhood of the N-th terminal device 16$n$, i.e., when one or more M-th terminal devices 16$m$ are not located, the index calculator 350 acquires the noise level (dB) of the N-th terminal device 16$n$ from the noise level table 368. When the value of the noise level (dB) of the N-th terminal device 16n is less than a predetermined value (e.g., 60), the index calculator 350 determines that the communicableness status of the N-th terminal device 16n is "1" and sets the communicableness status of the N-th terminal device 16n in the communicableness status table 366 to "1". When the value of the noise level (dB) of the N-th terminal device 16n is equal to or larger than a predetermined value (e.g., 60), the index calculator 350 determines that the communicableness status of the N-th terminal device 16n is "0" and sets the communicableness status of the N-th terminal device 16n in the communicableness status table 366 to "0".

When there is any other terminal device 16 located in the neighborhood of the N-th terminal device 16n, the index calculator 350 acquires the points of time of measurement of all M-th terminal devices 16m in the neighborhood of the N-th terminal device 16n from the noise level table 368. Of all M-th terminal devices 16m(M1-Mp) in the neighborhood, the terminal device 16 with the newest (latest) point of time of measurement is defined as the Mk-th terminal device 16mk. The index calculator 350 compares the point of time of measurement of the N-th terminal device 16n with the point of time of measurement of the Mk-th terminal device 16mk and determines whether the point of time of measurement of the Mk-th terminal device 16mk is later than the point of time of measurement of the N-th terminal device 16n. This is equivalent to determining whether the point of time of measurement of the Mk-th terminal device 16mk is newer than the point of time of measurement of the N-th terminal device 16n. When the point of time of measurement of the Mk-th terminal device 16mk is older than the point of time of measurement of the N-th terminal device 16n, the index calculator 350 performs the same process as performed when one or more M-th terminal devices 16m are not located, i.e., when no terminal devices 16 are located in the neighborhood of the N-th terminal device 16n.

When the point of time of measurement of the Mk-th terminal device 16mk is newer than the point of time of measurement of the N-th terminal device 16n, the index calculator 350 acquires the noise level (dB) of the Mk-th terminal device 16mk from the noise level table 368. This represents a case where the Mk-th terminal device 16mk is located in the neighborhood of the N-th terminal device 16n and transmitted the noise level packet at a point of time later than that of the N-th terminal device 16n. When the value of the noise level (dB) of the Mk-th terminal device 16mk is less than a predetermined value (e.g., 60), the index calculator 350 determines the communicableness status of the N-th terminal device 16n is "1" and updates the communicableness status of the N-th terminal device 16n in the communicableness status table 366 to "1". When the value of the noise level (dB) of the Mk-th terminal device 16mk is equal to or larger than a predetermined value (e.g., 60), the index calculator 350 determines the communicableness status of the N-th terminal device 16n is "0" and updates the communicableness status of the N-th terminal device 16n in the communicableness status table 366 to "0". The process is based on a knowledge that the noise level of the Mk-th terminal device 16mk located in the neighborhood of the N-th terminal device 16n and having transmitted the noise level packet at a point of time later than that of the N-th terminal device 16n is more accurate as the noise level of the N-th terminal device 16n at the current time.

Provided that the third terminal device 16c is located in the neighborhood of the first terminal device 16a in the example of FIG. 24, the point of time of measurement "10:19:17" of the third terminal device 16c is newer than the point of time "10:19:14" of the first terminal device 16a. It can therefore be said that the noise level in the noise level packet transmitted from the third terminal device 16c is more accurate as the noise level of the first terminal device 16a at the current time. Based on this finding, the noise level of the third terminal device 16c is referred to in the communicableness status determination of the first terminal device 16a. In other words, even if the noise level of the first terminal device 16a is "55", the noise level "67" of the third terminal device 16c is determined to be the noise level of the first terminal device 16a. The value is larger than the predetermined value in this embodiment (e.g., 60) so that the communicableness status of the first terminal device 10a is determined to be "0".

Similarly, provided that the sixth terminal device 16f is located in the neighborhood of the fifth terminal device 16e, the point of time of measurement "10:19:22" of the sixth terminal device 16f is newer than the point of time of measurement "10:19:18" of the fifth terminal device 16e. It can therefore be said that the noise level in the noise level packet transmitted from the sixth terminal device 16f is more accurate as the noise level of the fifth terminal device 16e at the current time. Based on this finding, the noise level of the sixth terminal device 16f is referred to in the communicableness status determination of the fifth terminal device 16e. In other words, even if the noise level of the fifth terminal device 16e is "65", the noise level "48" of the sixth terminal device 16f is determined to be the noise level of the fifth terminal device 16e. The value is less than the predetermined value in this embodiment (e.g., 60) so that the communicableness status of the fifth terminal device 10e is determined to be "1". In other words, the index calculator 350 calculates the easiness with which the user 18 using a given terminal device 16 recognizes communication, based on the information related to the loudness of sound around the given terminal device 16 and the information related to the loudness of sound around the terminal device 16 different from the given terminal device 16.

Figure 26:
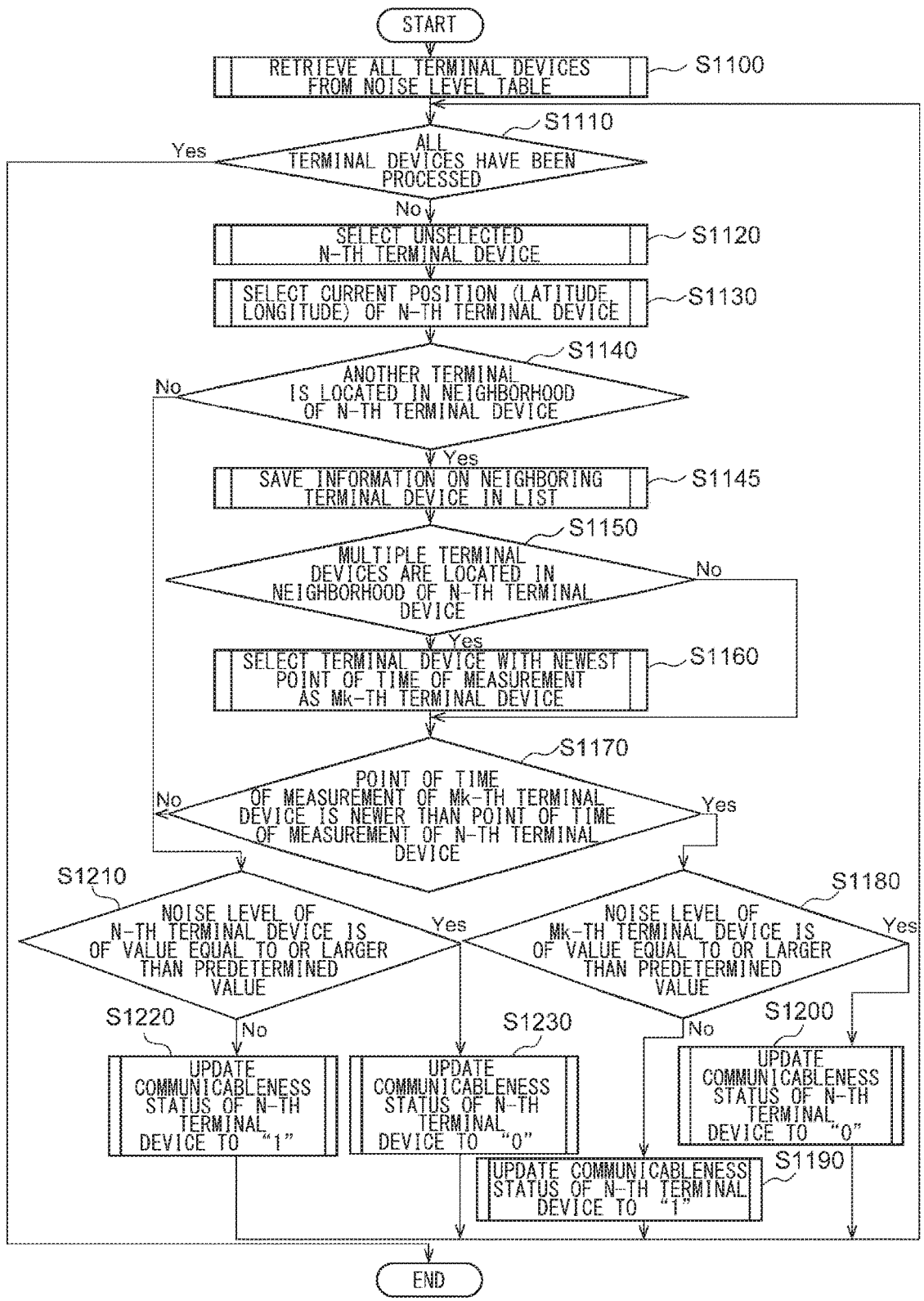
FIG. 26 is a flowchart showing a sequence of steps performed in the management device.

FIG. 26 is a flowchart showing a sequence of steps of the communicableness status determination process performed in the management device 12. In S1100, the index calculator 350 refers to the noise level table 368 and retrieves all terminal devices 16 recorded as terminal devices 16 in the noise level table 368. The index calculator 350 saves the terminal device names and IDs of all terminal devices retrieved in the list ML. The list ML is initialized when the steps are started. The list ML is emptied temporarily, and all terminal device names and IDs retrieved are then saved in a list ML. In S1110, the index calculator 350 refers to the list ML and determines whether all terminal devices 16 have been processed. When all terminal devices 16 have been processed, i.e., when one or more terminal device names and IDs are not saved in the list ML (S1110: Yes), the process is terminated. When not all of the terminal devices 16 have been processed, i.e., when one or more names and IDs are saved in the list ML (S1110: No), control proceeds to S1120. In S1120, the index calculator 350 selects an arbitrary N-th terminal device 16n from the terminal devices 16 saved in the list ML. The index calculator 350 retrieves the terminal device name and ID of the N-th terminal device 16n from the list ML and then deletes the terminal device name and ID of the N-th terminal device 16n from the list ML. In other words, information on the unprocessed terminal devices 16 is saved in the list ML, and one of the unprocessed terminal devices 16 is selected in S1120. The index calculator 350 then proceeds to S1130.

In S1130, the index calculator 350 refers to the noise level table 368 and acquires the position information (latitude, longitude) on the N-th terminal device 16n. The index calculator 350 then proceeds to S1140. In S1140, the index calculator 350 determines whether any other terminal devices 16 are located in the neighborhood of the N-th terminal device 16n. More specifically, the index calculator 350 acquires the current position (latitude, longitude) of all terminal devices other than the N-th terminal device 16n in the noise level table 368 and calculates the distance d between the N-th terminal device 16n and each of all terminal devices other than the N-th terminal device 16n. When there are no terminal devices 16 for which the distance d is less than a predetermined value (S1140: No), it is determined that no other terminal devices 16 are located in the neighborhood, and control proceeds to S1210. When there is any other terminal device 16 for which the distance d is less than the predetermined value (S1140: Yes), it is determined that a further terminal device 16 is located in the neighborhood, and control proceeds to S1145. In S1145, the index calculator 350 saves the information on the neighboring terminal device 16 in the list. More specifically, the index calculator 350 saves the terminal device name and ID for which the distance d is less than the predetermined value in a list NL. The list NL is initialized when the steps are started. The list NL is emptied temporarily, and all terminal device names and IDs retrieved are then saved in the list NL. The index calculator 350 then proceeds to S1150. In S1150, the index calculator 350 refers to the list NL updated in S1145 and determines whether there are a plurality of terminal devices 16 in the neighborhood of the N-th terminal device 16n. When there are a plurality of terminal devices 16 in the neighborhood of the N-th terminal device 16n (S1150: Yes), the index calculator 350 proceeds to S1160. When there is a single terminal device 16 in the neighborhood of the N-th terminal device 16n (S1150: No), the index calculator 350 records the terminal device name and ID recorded in the list NL in a variable MM. The index calculator 350 then proceeds to S1170.

In S1160, the index calculator 350 retrieves the points of time of measurement of all terminal devices recorded in the list NL from the noise level table 368. Of the points of time of measurement acquired, the index calculator 350 records the terminal device name and ID of the terminal device 16 for which the newest point of time of measurement is recorded in the variable MM. The index calculator 350 then proceeds to S1170. In S1170, the index calculator 350 defines the terminal device 16 recorded in the variable MM as the Mk-th terminal device 16mk and acquires the point of time of measurement of the Mk-th terminal device 16mk and the point of time of measurement of the N-th terminal device 16n from the noise level table 368. When the point of time of measurement of the Mk-th terminal device 16mk is newer than the point of time of measurement of the N-th terminal device 16n (S1170: Yes), the index calculator 350 proceeds to S1180. When the point of time of measurement of the Mk-th terminal device 16mk is not newer than the point of time of measurement of the N-th terminal device 16n (S1170: No), the index calculator 350 proceeds to S1210.

In S1180, the index calculator 350 acquires the noise level of the Mk-th terminal device 16mk from the noise level table 368 and determines whether the noise level is of a value equal to or larger than a predetermined value (e.g., 60). When the noise level is of a value equal to or larger than the predetermined value (S1180: Yes), the index calculator 350 proceeds to S1200. When the noise level is of a value less than the predetermined value (S1180: No), the index calculator 350 proceeds to S1190. In S1190, the index calculator 350 updates the communicableness status of the N-th terminal device 16n in the communicableness status table 366 to "1". The index calculator 350 then returns to S1110. In S1200, the index calculator 350 updates the communicableness status of the N-th terminal device 16n in the communicableness status table 366 to "0". The index calculator 350 then returns to S1110. In S1210, the index calculator 350 acquires the noise level of the N-th terminal device 16n from the noise level table 368 and determines whether the noise level is of a value equal to larger than a predetermined value (e.g., 60). When the noise level is of a value equal to or larger than the predetermined value (S1210: Yes), the index calculator 350 proceeds to S1230. When the noise level is of a value less than the predetermined value (S1210: No), the index calculator 350 proceeds to S1220. The step of S1220 is the same as that of S1190. The step of S1230 is the same as that of S1200. After the communicableness status determination process is terminated, the communication circuit 334 of the management device 12 transmits the communicableness status table 366 to each terminal device 16. The terminal device 16 receives the communicableness status table 366 from the management device 12 and stores it as the communicableness status table 66 in the storage 40.

The communicableness status is described above as being determined by using the noise level of a single Mk-th terminal device 16mk. Alternatively, the communicableness status of the N-th terminal device 16n may be determined by using the noise levels of a plurality of terminal devices 16. When there are a plurality of M-th terminal devices 16m having points of time of measurement newer than the point of time of measurement of the N-th terminal device 16n, the index calculator 350 may calculate an average value L1 of the noise levels thereof and determine the communicableness status of the N-th terminal device 16n in accordance with whether the average value L1 is equal to or larger than a predetermined value. The average value L1 may be a simple average or may be a weighted average derived by using a weight coefficient such that the newer the point of time of measurement, the larger the value of the weight coefficient. Alternatively, the index calculator 350 may use the distance d between the N-th terminal device 16n and the M-th terminal device 16m and calculate the average value L1 as a weighted average such that the smaller the distance d, the larger the value of the weight coefficient. The weight coefficient used may be such that the smaller the distance d and the newer the point of time of measurement, the larger the value of the weight coefficient. By using the noise levels of a plurality of terminal devices 16, the precision of determination of the communicableness status may be improved.

Alternatively, the index calculator 350 may use the noise levels of both the N-th terminal device 16n and the Mk-th terminal device 16mk to determine the communicableness status of the N-th terminal device 16n. For example, the index calculator 350 may calculate an average value L2 of the noise level of the N-th terminal device 16n and the noise level of the Mk-th terminal device 16mk and determine the communicableness status of the N-th terminal device 16n in accordance with whether the average value L2 is equal to or larger than a predetermined value. In this process, the index calculator 350 may calculate a weighted average using weight coefficients corresponding to the N-th terminal device 16n and the Mk-th terminal device 16mk, respectively. By configuring the weight coefficient for the N-th terminal device 16n to be relatively large and the weight coefficient for the Mk-th terminal device 16mk to be relatively small, a determination can be made such that the noise level of the N-th terminal device 16*n* is weighted higher but the noise level of the neighboring Mk-th terminal device 16*mk* is also considered. The weight coefficients may be changed depending on the point of time of measurement of the N-th terminal device 16*n* and the point of time of measurement of the Mk-th terminal device 16*mk*. For example, the larger the value (time difference) derived from subtracting the point of time of measurement of the N-th terminal device 16*n* from the point of time of measurement of th Mk-th terminal device 16*mk*, the relatively larger the weight coefficient for the Mk-th terminal device 16*mk*, and the smaller the time difference, the relatively larger the weight coefficient for the N-th terminal device 16*n*. When there are a plurality of neighboring M-th terminal devices 16*m*, the index calculator 350 may use the noise level of the N-th terminal device 16*n* and the noise levels of the plurality of M-th terminal devices 16*m* to calculate an average value L3 and determine the communicableness status of the N-th terminal device 16*n*. Still alternatively, the index calculator 350 may make a determination by using the noise level of the neighboring M-th terminal device 16*m* regardless of the point of time of measurement. For example, the index calculator 350 may calculate an average value L4 of the noise level of the N-th terminal device 16*n* and the noise level of the neighboring M-th terminal device 16*m* (one or more terminal devices 16) and determine the communicableness status of the N-th terminal device 16*n* accordingly.

A description will now be given of a process performed when the terminal device 16 originates a call to a further terminal device 16 in this embodiment. The communication circuit 34 of the terminal device 16 receives the communicableness status table 366 from the management device 12, The controller 338 updates the content of the communicableness status table 66 in the storage 44 based on the communicableness status table 366 received. The communicableness status table 66 indicates the easiness with which the user 18 using the terminal device 16 recognizes communication.

Figure 27:
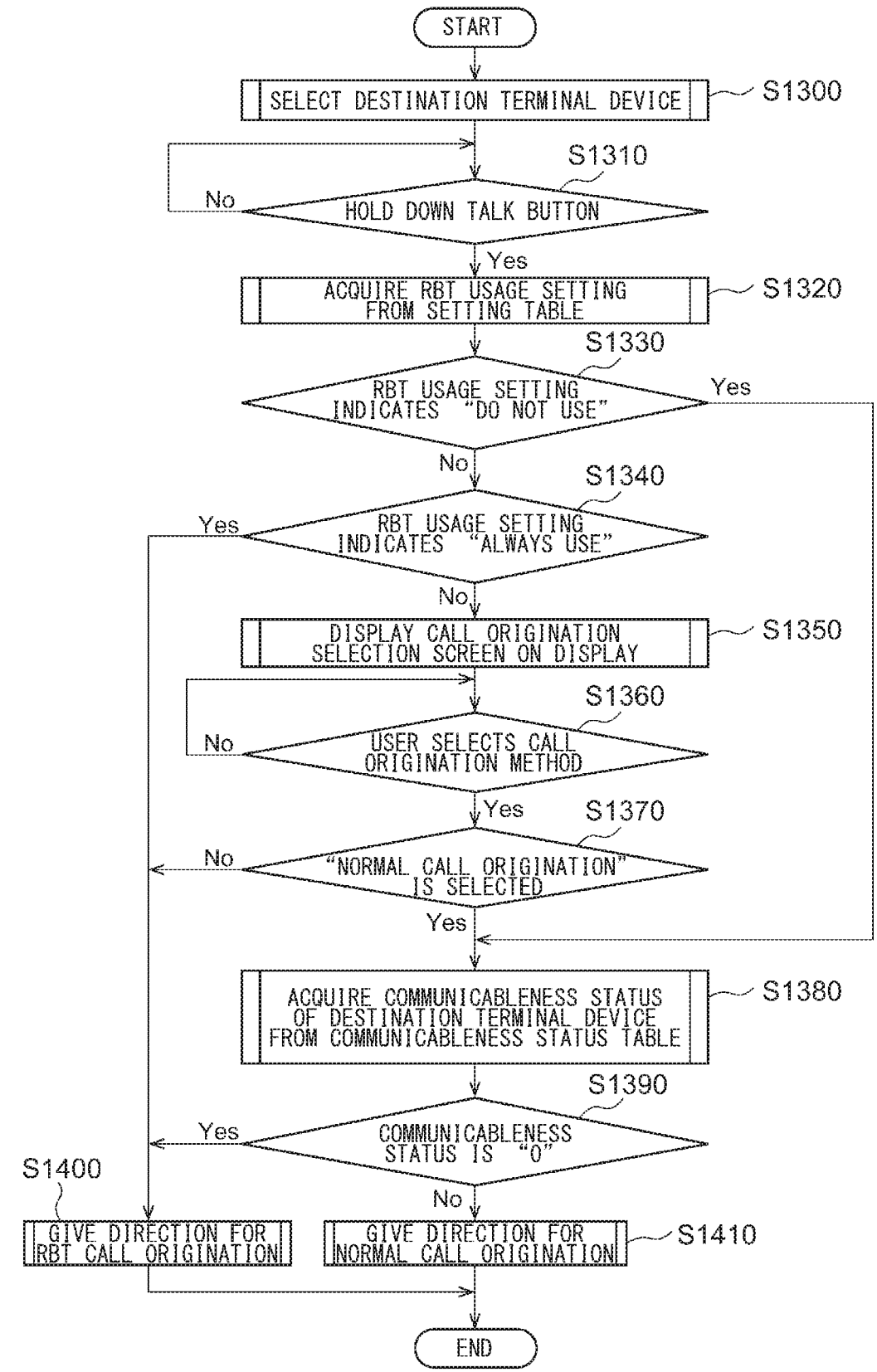
FIG. 27 is a flowchart showing a sequence of steps performed in the terminal device.

FIG. 27 is a flowchart showing a sequence of steps performed in the terminal device 16. In S1300, the controller 38 records the ID of the destination terminal device 16 in the variable Mt. The controller 38 then proceeds to S1310. In S1310, the controller 38 monitors whether the talk button is held down in the input interface 30. When the talk button is not detected as being held down (S1310: No), the controller 38 returns to S1310 and repeats the step. When the talk button is detected as being held down (S1310: Yes), the controller 38 proceeds to S1320. In S1320, the controller 38 acquires the RBT usage setting from the setting table 60. The setting table 60 records data related to the usage of RBT selected by the user 18 (data indicating one of "do not use", "always use", "select when making a call"), and the controller 38 acquires the data. The controller 38 then proceeds to S1330.

In the case the RBT usage setting is found to indicate "do not use" in S1330 (S1330: Yes), the controller 38 proceeds to S1380. In the case the RBT usage setting is other than "do not use" (S1330: No), the controller 38 proceeds to S1340. In the case the RBT usage setting is found to indicate "always use" in S1340 (S1340: Yes), the controller 38 proceeds to S1400. In the case the RBT usage setting is other than "always use" (S1340: No), the controller 38 proceeds to S1350. When the controller 38 proceeds to S1350, it means that "select when making a call" is selected.

In S1350, the controller 38 causes the display 36 to display the call origination selection screen shown in FIG. 4B. The controller 38 then proceeds to S1360. In S1360, the controller 38 determines whether the user 18 has selected the call origination scheme of the terminal device 16. When the call origination scheme is selected (S1360: Yes), the controller 38 proceeds to S1370. When the call origination scheme is not selected (S1360: No), the controller 38 returns to S1360 and repeats the step. In S1370, the controller 38 acquires, via the input interface 30, data indicating "RBT call origination" or "normal call origination" selected by the terminal device 16. The controller 38 determines whether "normal call origination" is selected in the call origination selection screen. When "normal call origination" is selected in the call origination selection screen (S1370: Yes), the controller 38 proceeds to S1380. In the case an option other than "normal call origination" is selected in the call origination selection screen, i.e., in the case "RBT call origination" is selected in this embodiment (S1370: No), the controller 38 proceeds to S1400.

In S1380, the controller 38 acquires the communicableness status of the terminal device 16 recorded in the variable Mt from the communicableness status table 66 and records the status in a variable ST. When there are no information on the terminal device 16 recorded in the variable Mt, "1" is set in the variable ST. The controller 38 then proceeds to S1390. In S1390, the controller 38 determines whether the variable ST is "0". When the variable ST is "0" (S1390: Yes), the controller 38 proceeds to S1400. When the variable ST is not "0" (S1390: No), the controller 38 proceeds to S1410. In S1400, the controller 38 directs the communication circuit 34 to perform RBT call origination and terminates the process. In S1410, the controller 38 directs the communication circuit 34 to perform normal call origination and terminates the process. The process in S1380-S1390 is called "RBT call origination assistance process".

When the communicableness status of the host terminal device 16 is "0" or when the noise level measured in the host terminal device 16 is of a value equal to or larger than a predetermined value, the controller 38 may control the audio output interface 44 to configure the volume of the sound of a call and/or the ring-back tone to be larger than normal. Alternatively, when the communicableness status of the host terminal device 16 is "1" or when the noise level measured in the host terminal device 16 is less than a predetermined value, the controller 38 may control the volume of the sound of a call and/or the ring-back tone to be normal.

According to this embodiment, the communicableness status is calculated based on the information related to the loudness of sound around the terminal device. Therefore, the easiness with which the user using the terminal device recognizes communication can be reflected in the communicableness status. By calculating the communicableness status based on the information related to the loudness of sound around a given terminal device and the information related to the loudness of sound around a further terminal device different from the given terminal device, the precision of the communicableness status can be improved. Since the communicableness status indicates the easiness with which the user using the terminal device recognizes communication, the plurality of types of communication modes can be used properly according to the activity status. By causing the management device to create a communicableness status based on the noise status of the terminal devices included in the communication system and notifies each terminal device of the communicableness status, a proper communication mode can be selected regardless of the destination terminal device. By selecting a proper communication mode, the likelihood of wasted communication in which the user at the receiving end cannot recognize transmitted information is reduced. The user operation of the user is prevented from becoming complicated and, at the same time, information can be properly communicated to the receiving end.

Embodiment 5

A description will now be given of embodiment 5. In embodiment 5, a noise level record table that keeps a record of the noise level of each terminal device for each predetermined time zones over a long period of time is created. The communication system 100, the terminal device 16, and the management device 12 according to embodiment 5 are of the same type as those of FIGS. 1, 19, 20, 22, and 23. The description below highlights a difference from the foregoing.

When the communication circuit 334 of the management device 12 receives a noise level packet from each terminal device 16, the controller 338 appends the received noise level packet to the noise level record table. FIG. 28 shows a data structure of the noise level record table stored in the storage 340 of the management device 12. The parameters in the noise level record table are the same as those described with reference to FIG. 21 showing an exemplary configuration of the noise level packet. The figure shows a record for portions of the period covered by the noise level record table. The period and the number of days for which the record is made may be longer than that of this exemplary configuration. Reference is made back to FIG. 23.

The index calculator 350 refers to the noise level record table at a predetermined interval (e.g., once in every one minute) and performs a high-noise area determination process. In a high-noise area determination process, an area with a high noise level at a current point of time is identified by referring to the noise level around each terminal device 16 recorded in the noise level record table, and the terminal device 16 predicted to approach the area is identified. By performing the high-noise area determination process, the communicableness status table 366 in the storage 344 is updated.

A description will now be given of the detail of the high-noise area determination process. The index calculator 350 acquires the current time T from the timer 332. The index calculator 350 searches the noise level record table to identify, in a predetermined period of time (e.g., 30 minutes) that goes back from the current time T, a record with a noise level equal or higher than a predetermined value (e.g., 60 dB). Through this search, the index calculator 350 acquires the point of time of measurement, the position information (the current position in the exemplary configuration of FIG. 28), and the noise level of the record. The index calculator 350 appends the acquired information to a high-noise position table. It will be given that the high-noise position table is initialized (cleared) every time the high-noise area determination process is performed.

FIG. 29 shows a data structure of the high-noise position table stored in the storage 340 of the management device 12. The figure shows an example in which records with a noise level equal to or higher than 60 dB are retrieved (extracted) from the noise level record table of FIG. 28. The index calculator 350 creates a high-noise area map in the storage 340 from the position information (the current position in the exemplary configuration of FIG. 29), the point of time of measurement, and the noise level recorded in the high-noise position table. It will be given that the high-noise area map is initialized (cleared) every time the high-noise area determination process is performed.

FIG. 30 shows a high-noise area map stored in the storage 340 of the management device 12. In the high-noise area map, areas having a radius R (meter) are drawn for each position information shown in the high-noise position table, where the areas are centered at the designated latitude and longitude. Areas included in at least one circle in FIG. 30 are defined as high-noise areas. Due to the high noise level in a high-noise area, it is highly likely that the user 18 of the terminal device 16 cannot hear a call. The radius R (meter) of the high-noise area for each position information may be a predetermined value (e.g., 20 m) or may be calculated according to (formula 8). Referring to (formula 8), NL denotes the noise level (dB), and ΔT denotes a difference (time difference) between the current time T and the point of time of measurement. λ is a predetermined coefficient larger than 0, μ is a predetermined coefficient larger than 0, and H is a monotonically increasing function. The function H may be a linear function or a non-linear function.

$$R = H(\lambda \times NL - \mu \times \Delta T) \quad \text{(formula 8)}$$

According to (formula 8), the larger the noise level and the closer the point of time of measurement to the current time, the wider the range of the high-noise area set at a given position (latitude, longitude). Subsequently, the index calculator 350 searches the noise level record table to identify, in a period of time (e.g., 10 minutes) that goes back from the current time T, the terminal device 16 that is highly likely to move to one of the noise areas drawn in the high-noise area map, by referring to the amount of change in the position information (latitude, longitude) on each terminal device 16 between one point of time to another. The terminal device name and ID of the identified terminal device 16 are recorded in a list AL. It will be given that the list AL is initialized (cleared) every time the high-noise area determination process is performed.

The index calculator 350 refers to the list AL, updates the communicableness status of the terminal device 16 in the communicableness status table 366 that is recorded in the list AL to "0", and updates the communicableness status of the terminal device 16 that is not recorded in the list AL to "1". Thus, the index calculator 350 identifies the high-noise area based on the information related to the loudness of sound around the plurality of terminal devices 16 over a predetermined period of time and calculates the easiness with which the user 18 of the terminal device 16 recognizes communication, based on the position information on the terminal device 16 and the information on the high-noise area. After the high-noise area determination process is terminated, the communication circuit 334 delivers the communicableness status table to each terminal device 16. The process performed by the terminal device 16 according to this embodiment is the same as that of embodiment 4.

According to this embodiment, the high-noise area is identified based on the information related to the loudness of sound around the plurality of terminal devices over a predetermined period of time, and the communicableness status is calculated based on the position information on the terminal device 16 and the information on the high-noise area so that the precision of the communicableness status can be further improved.

Variation of Embodiment 5

A description will be given of a variation of embodiment 5. In the variation of embodiment 5, the noise level record table shown in FIG. 28 is recorded over a relatively long period of time (e.g., for one month). The time zone in which the tendency for a high noise level is high is detected for each terminal device (high-noise time zone detection process). The communication system 100, the terminal device 16, and the management device 12 according to the variation of embodiment 5 are of the same type as those of FIGS. 1, 19, 20, 22, and 23. The description below highlights a difference from the foregoing.

The controller 338 first calculates an average value of the noise levels for each predefined time zone. For example, the controller 38 uses 30-day data to calculate an average value of the noise levels for every hour. In this case, the average noise level of the first terminal device 16a for 10:00-11:00 is calculated to be "50 dB", the average noise level for 11:00-12:00 to be "55 dB", and the average noise level for 12:00-13:00 to be "65 dB". The average noise level of the second terminal device 16b for 10:00-11:00 is calculated to be "62 dB", the average noise level for 11:00-12:00 to be "58 dB", and the average noise level for 12:00-13:00 to be "55 dB", etc. Instead of an average value, a median or a mode may be calculated and used. In other words, a representative value of the noise level may be used.

The index calculator 350 then identifies, for each terminal device 16, a time zone in which the average noise level is of a value equal to or larger than a reference value. Given, for example, that the reference value is "60 dB", the time zone of 12:00-13:00 for the first terminal device 16a and the time zone for 10:00-11:00 of the second terminal device 16b are associated with a value equal to or larger than the reference value, in the above example. The index calculator 350 updates the communicableness status of the identified terminal device 16 in the identified time zone to "0". Alternatively, the communicableness status of the identified terminal device 16 may be updated immediately before the identified time zone arrives. In the case the time zone of 12:00-13:00 is identified, for example, the communicableness status may be updated to "0" five minutes before 12:00. In other words, the communicableness status may be set to "0" based on the identified time zone. Thus, the index calculator 350 calculates the easiness with which the user 18 of the terminal device 16 recognizes communication based on the information related to the loudness of sound averaged for each tome zone.

After the high-noise time zone detection process is terminated, the communication circuit 34 delivers the communicableness status table 366 to each terminal device 16. The process performed by the terminal device 16 according to this variation is the same as that of embodiment 4. The embodiment is not limited to calculating the average noise level for each time zone. As in the process of embodiment 2, the average noise level may be calculated for each combination of the day of week and the time zone. Alternatively, the average noise level may be calculated for each combination of the date and the time zone.

The process of this embodiment is particularly useful in cases where the variation pattern of the noise level around the terminal device 16 is regular. For example, the embodiment is particularly useful in a case where the user 18 of the terminal device 16 moves on a road of a high noise level and heavy traffic during 12:00-13:00 almost every day. According to this embodiment, the communicableness status is calculated based on the information related to the loudness of sound averaged for each tome zone so that the communication mode suited to the time zone can be used. By identifying a time zone of high noise for each terminal device and setting the communicableness status to "0" in the identified time zone even if the current noise level is less than the reference level, the risk of a call being unheard by the user is further reduced.

Embodiment 6

A description will now be given of embodiment 6. In embodiment 6, RBT call origination assistance is not performed in the terminal device, and RBT call origination assistance is performed in the management device. The communication system 100, the terminal device 16, and the management device 12 according to embodiment 6 are of the same type as those of FIGS. 1, 19, 20, 22, and 23. The following description concerns a difference from the foregoing.

As in embodiment 4, the index calculator 350 of the management device 12 calculates the communicableness status as an easiness-of-communication index, based on the information related to the loudness of sound around the given terminal device 16 and the information related to the loudness of sound around the terminal device 16 different from the given terminal device 16. The communicableness status indicates the easiness with which the user 18 using the given terminal device 16 recognizes communication. Meanwhile, the terminal device 16 omits the steps of S1380-S1390 in the flowchart shown in FIG. 27. When a determination of Yes is yielded in S1370, the terminal device 16 performs normal call origination in S1410. When the calling terminal device 16 requests normal call origination, the management device 12 performs steps similar to S1380-S1390. In other words, the controller 338 of the management device 12 refers to the communicableness status table 366. When the communicableness status of the destination terminal device 16 is "0", the controller 338 calls the destination terminal device 16 by using the RBT call origination protocol instead of the normal call origination protocol.

Figure 31:
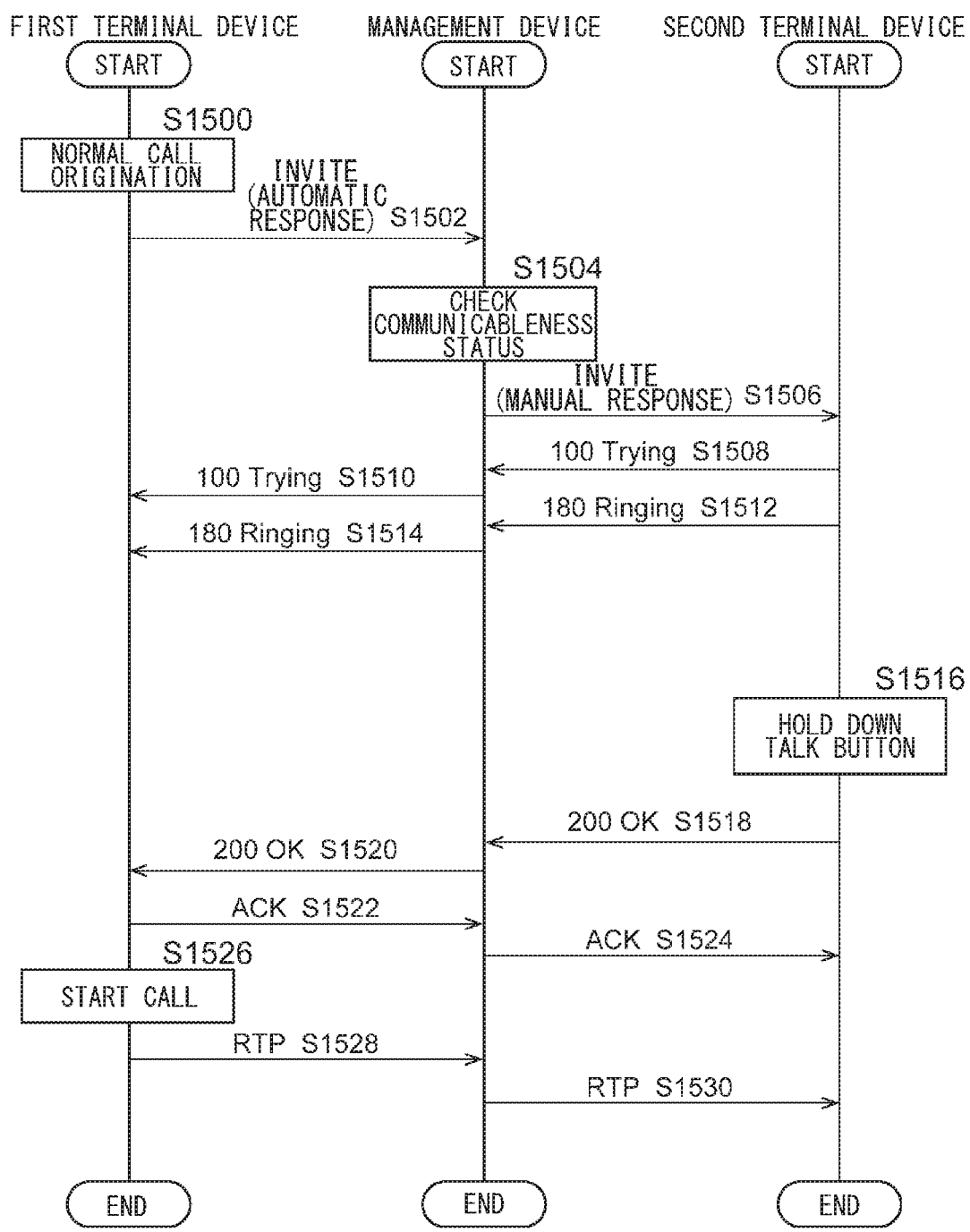
FIG. 31 is a sequence diagram showing steps of communication in the communication system of embodiment 6.

FIG. 31 is a sequence diagram showing steps of communication in the communication system 100. The diagram shows a system operation performed when normal call origination from the first terminal device 16a to the second terminal device 16b is performed. After normal call origination is selected in the first terminal device 16a (S1500), the first terminal device 16a transmits INVITE (automatic response) to the second terminal device 16b (S1502). The transmitted INVITE (automatic response) is received by the management device 12. After receiving INVITE, the management device 12 performs the RBT call origination assistance process (S1380-S1390). In other words, the management device 12 acquires the communicableness status of the destination second terminal device 16b from the communicableness status table 366 of FIG. 25. The management device 12 determines whether the communicableness status of the second terminal device 16b is "0" (S1504). It is assumed here that the communicableness status of the second terminal device 16b is "0". The management device 12 changes INVITE (automatic response) from the first terminal device 16a to INVITE (manual response) and transmits INVITE (manual response) to the second terminal device 16b (transforms the protocol) (S1506).

After receiving INVITE (manual response), the second terminal device 16b transmits a status code 100Trying to the first terminal device 16a (S1508). The transmitted status code 100Trying is transmitted to the first terminal device 16a via the management device 12 (S1510). After transmitting the status code 100Trying, the second terminal device 16b transmits a status code 180Ringing to the first terminal device 16a (S1512). The transmitted status code 180Ringing is transmitted to the first terminal device 16a via the management device 12 (S1514).

Subsequently, when the talk button of the second terminal device 16b is held down (S1516), the second terminal device 16b transmits a status code 200OK to the first terminal device 16a (S1518). The transmitted status code 200OK is transmitted to the first terminal device 16a via the management device 12 (S1520). After receiving the status code 200OK, the first terminal device 16a transmits ACK (S1522). ACK thus transmitted is transmitted to the second terminal device 16b via the management device 12 (S1524). After transmitting ACK, the first terminal device 16a starts transmitting call data by using RTP (S1526, S1528, S1530).

The management device 12 may perform embodiment 5 or the variation of embodiment 5. In other words, the index calculator 350 may identify the high-noise area based on the information related to the loudness of sound around the plurality of terminal devices 16 over a predetermined period of time and calculate the easiness with which the user 18 of the terminal device 16 recognizes communication, based on the position information on the terminal device 16 and the information on the high-noise area. Alternatively, the index calculator 350 may calculate the easiness with which the user 18 of the terminal device 16 recognizes communication, based on the information related to the loudness of sound averaged for each tome zone.

According to this embodiment, the communicableness status is calculated for each of the plurality of terminal devices, and, when the communicableness status meets a predetermined condition, the second communication mode is switched to the first communication mode. Therefore, the plurality of types of communication modes can be used properly. The communicableness status is calculated based on the information related to the loudness of sound around the terminal device. Therefore, the easiness with which the user using the terminal device recognizes communication can be reflected in the communicableness status. By calculating the communicableness status based on the information related to the loudness of sound around a given terminal device and the information related to the loudness of sound around a further terminal device different from the given terminal device, the precision of the communicableness status can be improved. Since the communicableness status indicates the easiness with which the user using the terminal device recognizes communication, the plurality of types of communication modes can be used properly according to the activity status.

The high-noise area is identified based on the information related to the loudness of sound around the plurality of terminal devices over a predetermined period of time, and the communicableness status is calculated based on the position information on the terminal device 16 and the information on the high-noise area so that the precision of the communicableness status can be further improved. The communicableness status is calculated based on the information related to the loudness of sound averaged for each tome zone so that the communication mode suited to the time zone can be used. The process of delivering the communicableness status table from the management device to the terminal device and the RBT call origination assistance process in the terminal device can be omitted so that the amount of processing and necessary memory size of the terminal device can be reduced. Since the amount of processing and necessary memory size of the terminal device can be reduced, the cost of the terminal device can be reduced. Since the RBT call origination assistance process is performed in the management device, which has a higher processing capacity than the terminal device and is provided with rich resources (memory, etc.), a more complicated process can be performed. Modification of the program of the management device is easier than modification of the program of each terminal device so that the RBT call origination assistance process can be modified easily.

Example 7

A description will now be given of embodiment 7. Embodiment 7 is a combination of embodiment 1 and embodiment 4. The communication system 100 according to embodiment 7 is of the same type as that of FIG. 1, the management device 12 is a combination of FIGS. 6, 7, 22, and 23, and the terminal device 16 is a combination of FIGS. 12, 13, 19, and 20. The description below highlights a difference from the foregoing.

As in embodiment 1, the controller 338 of the management device 12 creates the record table 362. In further accordance with this embodiment, the index calculator 350 creates an easiness-of-communication index table for the terminal device 16. An easiness-of-communication index is an index indicating the easiness with which the user 18 of the terminal device 16 receiving a call recognizes communication. When the noise around the terminal device 16 is large, for example, the user 18 will have difficulty to hear the sound of a call or a ring-back tone so that the easiness-of-communication index will have a low value. When the user 18 is not near the terminal device 16, the user cannot recognize the presence of a call so that the easiness-of-communication index will have a low value. When the user 18 is asleep or occupied with some work, the likelihood that the user 18 cannot recognize the presence of a call will be high so that the easiness-of-communication index will have a low value. The communicableness status of embodiment 4 is a binary value of "0" or "1", but the easiness-of-communication index takes on a larger number of values or a continuous value.

The controller 338 detects call information on the terminal device 16 from the communication circuit 334. The index calculator 350 performs an easiness-of-communication estimation process after the controller 338 appends the point of time and a record related to the terminal device 16 to the record table 362 or at a predetermined interval (e.g., at an interval of one minute). The easiness-of-communication estimation process is a process to calculate the easiness-of-communication index of each terminal device 16. The index calculator 350 updates the easiness-of-communication index in the easiness-of-communication index table with the easiness-of-communication index of each terminal device 16 yielded by the easiness-of-communication estimation process. After the easiness-of-communication index table is updated or at a predetermined interval (e.g., at an interval of one minute), the index calculator 350 delivers the whole content of the easiness-of-communication index table to each terminal device 16.

A description will be given of the easiness-of-communication estimation process in specific details. To calculate the easiness-of-communication index of the X-th terminal device 16x, the index calculator 350 searches the records in the record table 362 designating the X-th terminal device 16x as the calling terminal to identify a record with the newest point of time of call origination (the record closest to the current time). The identified record will be referred to as the latest call origination record of the X-th terminal device 16x, and the value of the record No. will be denoted by NS.

In the case there are no call origination records in which the X-th terminal device 16x is the calling terminal, NS is set to "000". The index calculator 350 searches those records designating the X-th terminal device 16x as the receiving terminal and having a value of the record No. larger than NS to identify records with the point of time of reception up to the current time and counts the number of identified records. In other words, the index calculator 350 counts the number of reception records newer than the latest call origination record.

In order to originate a call, it is necessary for the user 18 to manipulate the X-th terminal device 16x actively. It is therefore guaranteed that the user 18 of the X-th terminal device 16x was near the X-th terminal device 16x and was active (not asleep) at the point of time designated by the record "NS". In this embodiment, the status in which the user 18 can know the content of communication (e.g., the status in which the user 18 is not asleep or the status in which the user 18 is not occupied by an activity other than communication) will be referred to as "active status". The number of records counted here represents the number of times that the X-th terminal device 16x receives a call after the last point of time when the user 18 was identified to be active near the X-th terminal device 16x. In other words, it is predicted that the smaller the number of records counted, the more likely it is that the user can know the content of communication and that the larger the number of records counted, the less likely it is that the user can know the content of communication.

In the easiness-of-communication estimation process, the "likelihood that the user can know the content of communication" and the noise level around the terminal device 16 are turned into a numerical value indicating the easiness-of-communication index. Denoting the number of records showing that the X-th terminal device 16x receives a call since the point of time of NS until the current time by CountX, the current noise level by NX, and the maximum value of the easiness-of-communication index by Imax, the easiness-of-communication index CX of the X-th terminal device 16x is calculated as follows.

$$CX = I\text{max} - (\alpha \times \text{CountX}) - (\beta \times NX) \quad \text{(formula 9)}$$

where $\alpha$ and $\beta$ are predetermined coefficients greater than 0. As can be known from (formula 8), the smaller the value of CountX and the smaller the noise level, the higher the easiness-of-communication index CX. In other words, the formula predicts that the smaller the value of CountX and the smaller the noise level, the higher the likelihood that the user can know the content of communication. In the case a negative value of the easiness-of-communication index CX of the X-th terminal device 16x results, the easiness-of-communication index CX can be uniformly "0".

Alternatively, the easiness-of-communication index CX may be calculated according to (Formula 9) by using a value (output) returned from a function G1 with CountX as an argument (input) and a value (output) returned from a function G2 with NX as an argument (input).

$$CX = I\text{max} - (\alpha \times G1(\text{CountX})) - (\beta \times G2(NX)) \quad \text{(formula 10)}$$

where the functions G1, G2 are linear or non-linear monotonically increasing functions. There may be an interval in which the output value does not vary as the input value is increased. The functions G1, G2 may be monotonically increasing functions in the broad sense of the term (monotonically non-decreasing functions). For example, a function having the characteristic shown in FIG. 10A may be used. The function G in the illustrated example is a monotonically increasing function in which the greater the input, the greater the output. The function G also has an exponential nature in which the greater the input, the greater the increase rate of the output. Alternatively, a function having a logarithmic nature, in which the greater the input, the smaller the increase rate of the output, may be used. Using linear monotonically increasing functions as the functions G1, G2 results in the process defined by (formula 8). The function G1 and the function G2 may be identical or different.

The easiness-of-communication index CX may be calculated as follows by using, instead of CountX, an elapsed time TX elapsed since the last call origination from the X-th terminal device 16x until the current time.

$$CX = I\text{max} - (\alpha \times F1(TX)) - (\beta \times F2(NX)) \quad \text{(formula 11)}$$

where the functions F1, F2 are linear or non-linear monotonically increasing functions. There may be an interval in which the output value does not vary as the input value is increased. The functions F1, F2 may be monotonically increasing functions in the broad sense of the term (monotonically non-decreasing functions). For example, a function having the characteristic shown in FIG. 10B may be used. The function F in the illustrated example is a monotonically increasing function in which the greater the input, the greater the output. The function G has a logarithmic nature in which the greater the input, the smaller the increase rate of the output. Alternatively, a function having an exponential nature, in which the greater the input, the greater the increase rate of the output, may be used as the function F. Linear monotonically increasing functions may be used as the functions F1, F2. The function F1 and the function F2 may be identical or different.

The index calculator 350 may calculate the easiness-of-communication index CX by using both CountX and the elapsed time TX as follows.

$$CX = I\text{max} - (\alpha \times G1(\text{CountX})) \times G2(TX) - (\beta \times F1(NX)) \quad \text{(formula 12)}$$

As described above, the functions G1, G2, F1 are linear or non-linear monotonically increasing functions. According to the formula above, the greater CountX, the smaller the easiness-of-communication index CX, and the greater TX, the smaller the easiness-of-communication index CX. Predetermined coefficients $\alpha$ and $\beta$ are used in the formulas, but each of the coefficients may have different values depending on the formula.

Those items like "$\alpha$CountX", "$\alpha \times G1(\text{CountX})$", and "$\alpha \times F1(TX)$" in (formula 9)-(formula 12) that are determined by a factor other than NS are referred to as activity status elements. Items like "$\beta \times NX$" and "$\beta \times G2(NX)$" that are determined by the noise level are referred to as noise elements. It can be said that the easiness-of-communication index is calculated by using the noise level around the terminal device 16 and the value related to the activity status of the user 18 (estimated value of activity status).

The communication circuit 34 of the terminal device 16 receives the easiness-of-communication index table from the management device 12. The easiness-of-communication index table is created in the storage 40 of the terminal device 16. When the easiness-of-communication index table is delivered from the management device 12, the terminal device 16 updates the content of the easiness-of-communication index table in the storage 40. In this embodiment, when the terminal device 16 originates a call to a further terminal device 16, S1380 of the flowchart of FIG. 27 is changed to "acquire easiness-of-communication index of destination terminal device 16 from easiness-of-communication index table", and S1390 is changed to "easiness-ofcommunication index is less than predetermined value", and the steps are performed accordingly.

According to this embodiment, the easiness-of-communication index is calculated by using the noise level around the terminal device and the estimated value of the activity status of the user so that the likelihood that the user may not hear a call can be estimated with high precision. The likelihood that the user may not hear a call is estimated with high precision so that wasted calls are prevented with high precision.

Embodiment 8

A description will now be given of embodiment 8. A call is started in the operation for normal call origination without manipulating the talk button in the receiving terminal device 16. For this reason, the receiving user may not understand or hear the content of a call if the user is not near the terminal device because, for example, the user has left his or her seat, or if the user is taking a sleep, or if the user is driving a car or a motorcycle. When a call is received in a highly public place, etc., the sound output without the manipulation of a wireless device may be annoying to people around. If the content of a call includes confidential information, an improper call may occur (e.g., the secret may be leaked to a third person). The highly public place mentioned above refers to cases where the user is moving by train, ship, airplane, etc. or refers to a place like a hospital and a library where an unspecified number of people are around. If "normal call origination" to a terminal device is performed without considering the current activity status of the user or surrounding environment, the originated information may not be communicated accurately so that the call information is wasted, or situations disadvantageous or uncomfortable to the receiver or people around the receiver may occur. In embodiment 8, the occurrence of wasted calls is reduced by determining whether normal call origination should be performed by referring to the current activity status of the user. The communication system 100 according to embodiment 8 is of the same type as that of FIG. 1. The description below highlights a difference from the foregoing.

Figure 32:
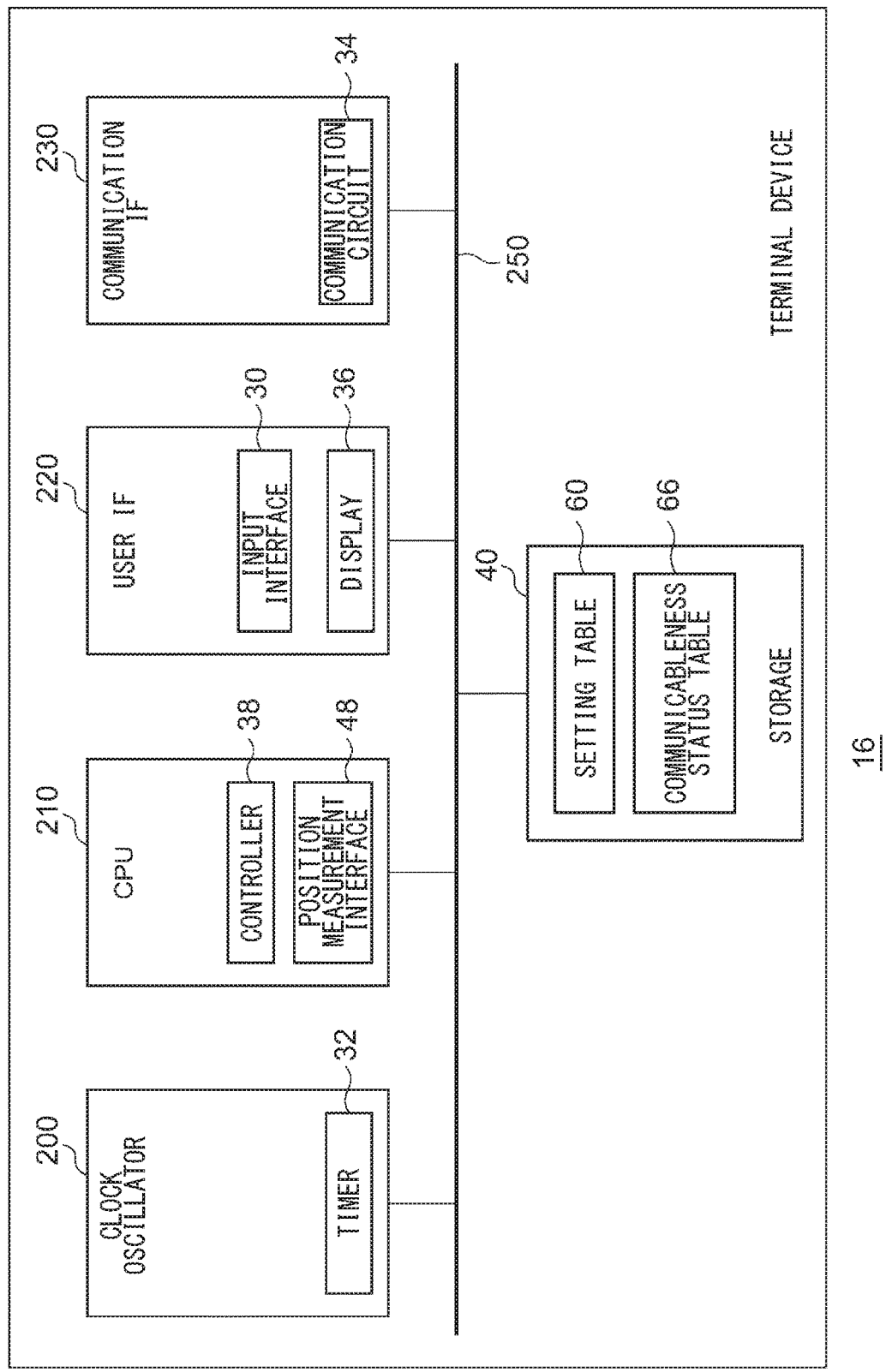
FIG. 32 shows a hardware configuration and functional blocks of the terminal device of embodiment 8.

FIG. 32 shows a hardware configuration and functional blocks of the terminal device 16. The terminal device 16 includes a clock oscillator 200, a CPU 210, a user IF 220, a communication IF 230, and a storage 40. The clock oscillator 200, the CPU 210, the user IF 220, the communication IF 230, and the storage 40 are connected by a bus 250. The clock oscillator 200 includes a timer 32, the CPU 210 includes a controller 38 and a position measurement interface 48, the user IF 220 includes an input interface 30 and a display 36, and the communication IF 230 includes a communication circuit 34. The storage 40 includes the setting table 60 and a communicableness status table 66.

Figure 33:
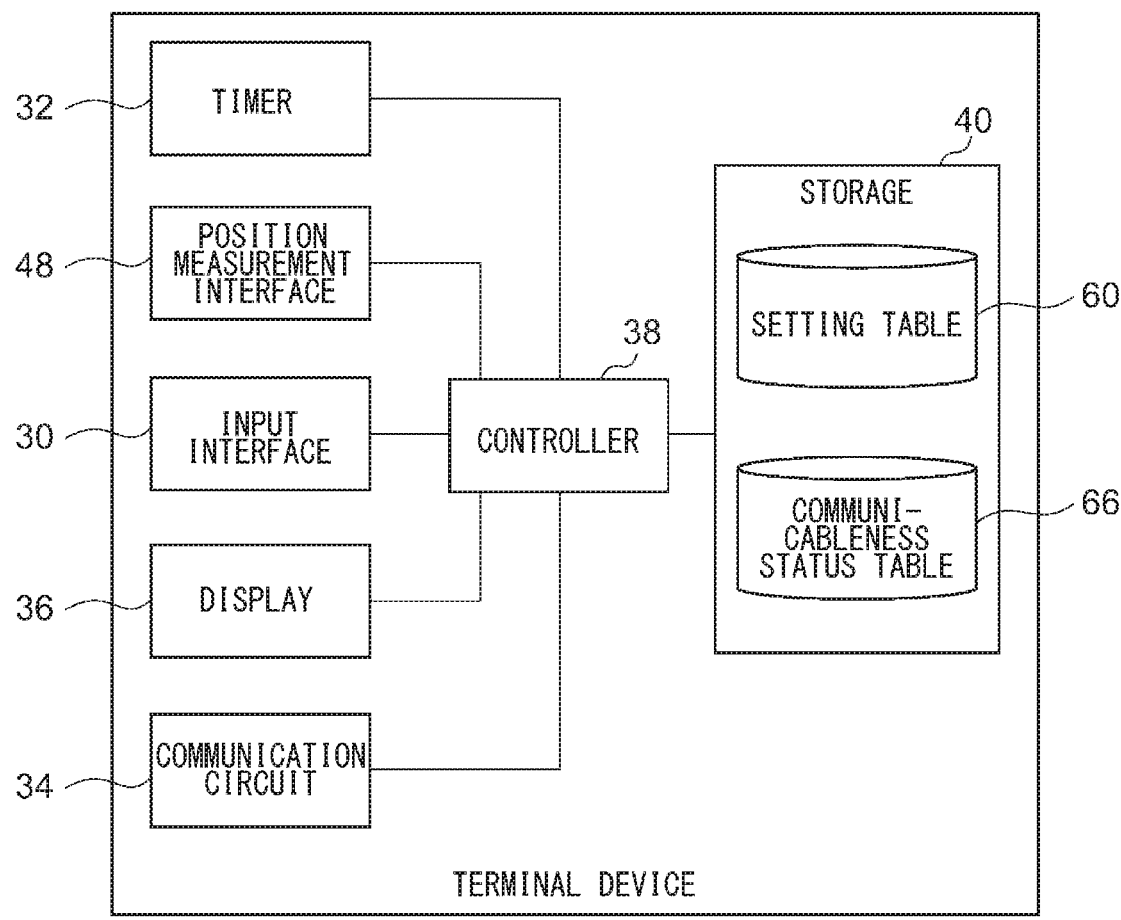
FIG. 33 shows detailed functional blocks of the terminal device.

FIG. 33 shows detailed functional blocks of the terminal device 16. The terminal device 16 includes the input interface 30, the timer 32, the communication circuit 34, the display 36, the controller 38, the storage 40, and the position measurement interface 48. The storage 40 includes the setting table 60 and the communicableness status table 66. As described above, the status of the talk button being held down is detected in the input interface 30 and input to the controller 38. The display 36 is an interface for displaying the setting and call status of the terminal device 16. Various setting information related to the terminal device 16 is recorded in the setting table 60. The communicableness status table 66 stored in the storage 40 maintains the communicableness status of each terminal device 16 received from the management device 12. In this embodiment, the communicableness status is used as one of easiness-of-communication indices. Details will be described later.

The position measurement interface 48 measures the position in which the terminal device 16 is currently located. To describe it more specifically, the position measurement interface 48 acquires the latitude and longitude of the current location from a Global Positioning System (GPS) device. The controller 38 acquires the current time from the timer 32 at a predetermined interval (e.g., one minute) and acquires the position information (latitude, longitude) on the position where the terminal device 16 is currently located from the position measurement interface 48. The controller 38 turns the current time acquired from the timer 32 and the position information (latitude, longitude) acquired from the position measurement interface 48 into a packet. In this embodiment, the packet is called a position information packet.

FIG. 34 shows a data structure of a position information packet transmitted from the terminal device 16. As shown in the figure, the name and ID of the terminal device 16 are entered in the "terminal device name and ID" field. The date (year/date) and the current time acquired from the timer 32 are entered in the "date of measurement" and "point of time of measurement" fields. The position information (latitude, longitude) acquired from the position measurement interface 48 is entered in the "current position (latitude, longitude)" field. An exemplary entry "2018/6/1" in the "date of measurement" field means "Jun. 1, 2018", and an exemplary entry "10:19:14" in the "point of time measurement" field means "19 minutes and 14 seconds past 10 o'clock". In the case the terminal device 16 is located indoors or underground and it is not possible to acquire the position information (latitude, longitude) on the position where the terminal device 16 is currently located from the position measurement interface 48, the communication circuit 34 may suspend transmitting the position information packet to the management device 12. The position information on the host terminal device 16 may be acquired by a means other than GPS. For example, the position information on the host terminal device 16 may be acquired by using information on a wireless LAN access point or information on the base station of a cellular phone system. Alternatively, the terminal device 16 may measure the moving speed of the host terminal device 16 and adds information on the moving speed to the position information packet. Reference is made back to FIG. 33, The communication circuit 34 is used for communication with the management device 12 and for communication with a further terminal device 16. For example, the communication circuit 34 transmits the position information packet to the management device 12.

Figure 35:
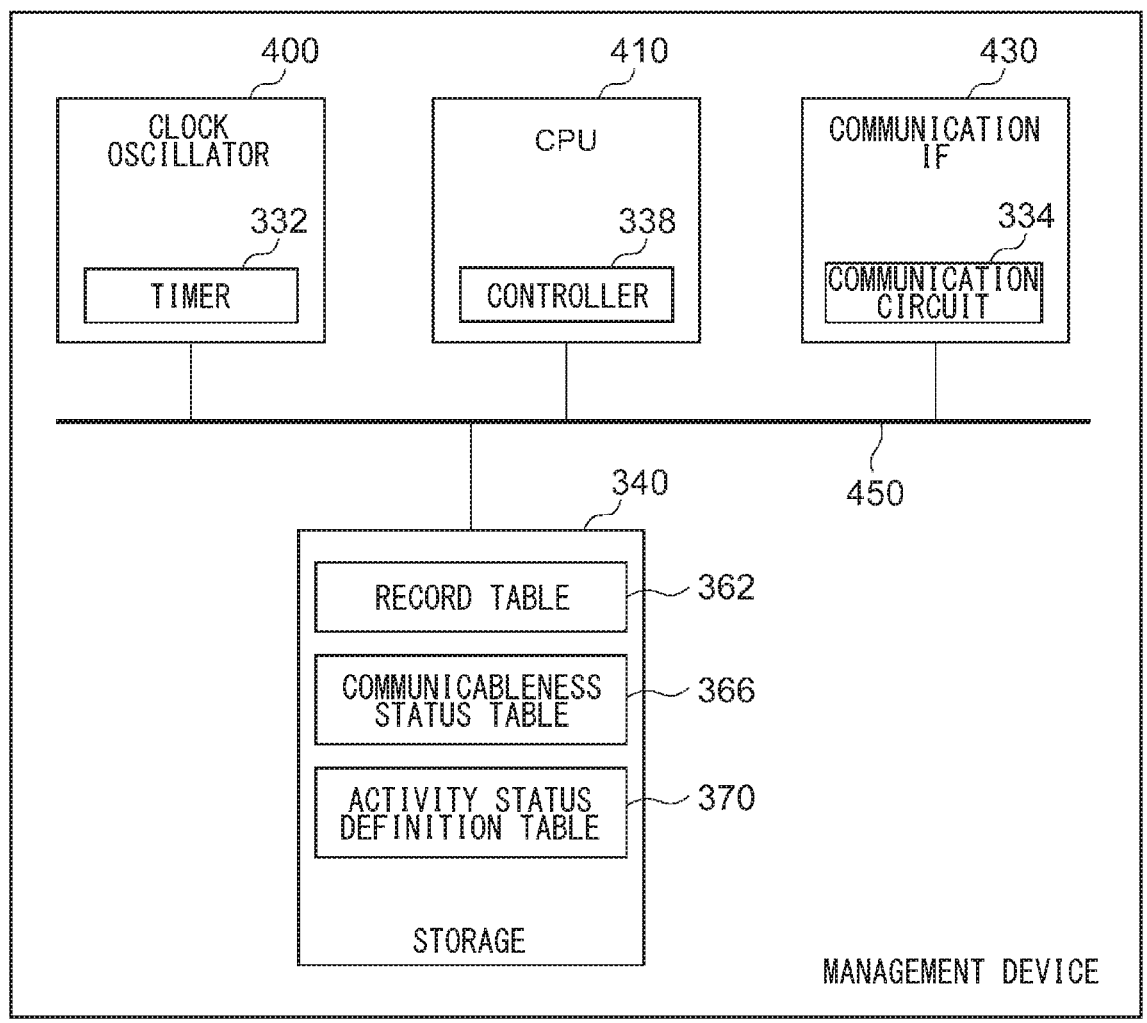
FIG. 35 shows a hardware configuration and functional blocks of the management device.

FIG. 35 shows a hardware configuration and functional blocks of the management device 12. The management device 12 includes a clock oscillator 400, a CPU 410, a communication IF 430, and a storage 340. The clock oscillator 400, the CPU 410, the communication IF 430, and the storage 340 are connected by a bus 450. The clock oscillator 400 includes a timer 332, the CPU 410 includes a controller 338, and the communication IF 430 includes a communication circuit 334. The storage 340 includes a record table 362, a communicableness status table 366, and an activity status definition table 370.

Figure 36:
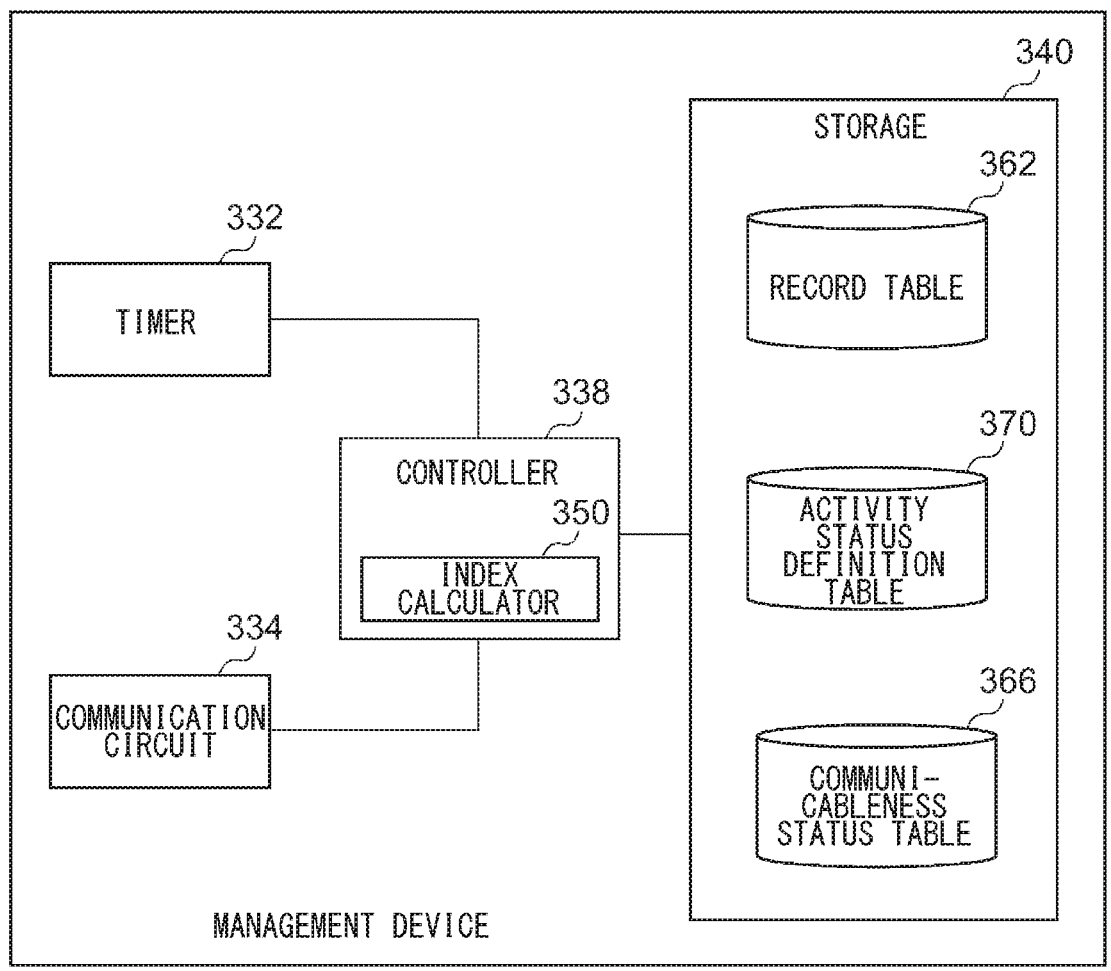
FIG. 36 shows detailed functional blocks of the management device.

FIG. 36 shows detailed functional blocks of the management device 12. The management device 12 includes the timer 332, the communication circuit 334, the controller 338, and the storage 340. The controller 338 includes an index calculator 350, and the storage 340 includes the record table 362, the communicableness status table 366, and the activity status definition table 370. The communication circuit 334 detects a call by receiving a signal from the terminal device 16. The communication circuit 334 transmits the position information packet transmitted from the terminal device 16 at a predetermined interval. The position information packet represents position information or information related to the moving speed of the terminal device 16. The communication circuit 334 outputs the position information packet to the controller 338.

When the position information packet is received from each terminal device 16, the controller 338 appends the received position information packet to the record table 362. FIG. 37 shows a data structure of the record table 362 in the management device 12. The parameters in the record table are the same as those described with reference to FIG. 34 showing an exemplary configuration of the position information packet. The figure shows a record for portions of the period covered by the record table 362. The period and the number of days for which the record is made may be longer than that of this exemplary configuration. Alternatively, the date of measurement and the point of time of measurement (the date and time of measurement) in the position information packet of FIG. 34 may be omitted, and the date and time when the management device 12 receives the position information packet may be entered in the "date of measurement" field and the "point of time of measurement" field of the record table 362. Reference is made back to FIG. 36. Details of the communicableness status table 366 and the activity status definition table 370 will be described later.

The index calculator 350 of the controller 338 refers to the record table 362 and performs a communicableness status determination process at a predetermined interval (e.g., one minute) or at a point of time that the position information packet is received from one of the terminal devices 16. The communicableness status determination process is a process for estimating the activity status of each terminal device 16 by referring to the position information on each terminal device 16 recorded in the record table 362 and determining the communicableness status of each terminal device 16. Details of the communicableness status determination process will be described later. The communicableness status table 366 in the storage 340 is updated by performing the communicableness status determination process.

The data structure of the communicableness status table 366 is the same as that of FIG. 25. The communicableness status represents information indicating the easiness with which the user 18 of the terminal device 16 receiving a call from a further terminal device 16 recognizes the presence of a call and the content of the call. In the case the communicableness status is "1", it means that the likelihood that the user 18 of the terminal device 16 can recognize the presence of a call is high and the likelihood that the user can concentrate on the call is high so that the likelihood that the call proceeds properly is high. In other words, when a further terminal device 16 performs normal call origination to that terminal device 16, the information will be properly communicated to the user 18 so that there will be no particular problems. In the case the communicableness status is "0", it means that the likelihood that the user 18 of the terminal device 16 can recognize the presence of a call is low and the likelihood that the user can concentrate on the call is low so that the activity status of the user 18 is not suited to normal call origination. For this reason, the likelihood that a call originated normally to the terminal device 16 is not heard is high so that the he likelihood that the call proceeds properly is low. In other words, it is likely that the information is not communicated to the user 18 properly if a further terminal device 16 performs normal call origination to the terminal device 16. As mentioned above, the communicableness status indicates the easiness with which the user 18 using the terminal device 16 recognizes communication. The communicableness status of "0" indicates that the likelihood that an unspecified number of people are around is high, and the status is not suited to normal call origination. Reference is made back to FIG. 36.

A description will now be given of the detail of the communicableness status determination process. The index calculator 350 determines the communicableness status of all terminal devices 16 listed in the record table 362. The index calculator 350 acquires the current time C from the timer 332. To determine the communicableness status of the N-th terminal device 16n, the index calculator 350 searches the record table 362 to identify, in a period of time P1 (e.g., five minutes) that goes back from the current time C, the latest record Rn1 for the N-th terminal device 16n in which the latest date of measurement and point of time of measurement are recorded. When the latest record Rn1 for the N-th terminal device 16n is found in the period of time P1 that goes back from the current time C, the index calculator 350 records the date of measurement, point of time of measurement, and position (position information: latitude, longitude) in Rn1 in a variable M1.

When the latest record Rn1 for the N-th terminal device 16n is not found in the period of time P1 that goes back from the current time C, i.e., when the N-th terminal device 16n has not transmitted a position information packet to the management device 12 a single time in the period of time P1 immediately preceding the current time C, the index calculator 350 sets the communicableness status of the N-th terminal device 16n in the communicableness status table 366 to "1" and terminates the process. When the N-th terminal device 16n has not transmitted a position information packet in the period of time P1 immediately preceding the current time C, it is not currently possible to perform the accurate communicableness status determination process for the N-th terminal device 16n. Therefore, priority is given to not reducing the variation of call origination methods, and the communicableness status is set to "1".

The index calculator 350 then searches for a record Hn in the record table 362 related to the N-th terminal device 16n in a period of time P2 (e.g., one minute) that goes back from the point of time of measurement recorded in the variable M1. When a plurality of records Hn are found, the index calculator 350 identifies an arbitrary one record Rn2 of the records Hn. For example, the record Rn2 with the oldest point of time of measurement may be identified. The index calculator 350 records the point of time of measurement and position (latitude, longitude) in the record Rn2 in a variable M2. When the record Hn is not found, i.e., when the N-th terminal device 16n has not transmitted a position information packet to the management device 12 a single time in the period of time P2 that goes back from the point of time of measurement in the variable M1, the index calculator 350 sets the communicableness status of the N-th terminal device 16n in the communicableness status table 366 to "1" and terminates the process. When the N-th terminal device 16n has not continuously transmitted a position information packet in the period of time P2 that goes back from the point of measurement in the variable M1, it is not possible to perform the accurate communicableness status determination process. Therefore, priority is given to not reducing the variation of call origination methods, and the communicableness status is set to "1".

The index calculator 350 calculates the moving speed Vn [km/h] of the N-th terminal device 16n from the points of time of measurement and the positions (latitude, longitude) in the variable M1 and the variable M2. The moving speed Vn [km/h] is obtained by calculating a distance d [km] between two points from the positions (latitude, longitude) in the variable M1 and the variable M2 and calculating a difference ΔT [sec] between the point of time of measurement Tn in the variable M1 and the point of time of measurement Tm in the variable M2. Denoting the latitude, longitude of the position information in the variable M1 by (Nn, En) and denoting the latitude, longitude of the position information in the variable M2 by (Nm, Em), the distance d [km] between (Nn, En) and (Nm, Em) is calculated by (formula 6). Alternatively, the distance d may be calculated by determining an approximate value according to (formula 7). The index calculator 350 determines the moving speed Vn [km/h] of the N-th terminal device 16n according to (formula 13).

$$V_n = \frac{d}{\Delta T} \times 3600 \quad \text{(formula 13)}$$

After calculating the moving speed Vn [km/h] of the N-th terminal device 16n, the index calculator 350 refers to the activity status definition table in the storage 340.

FIG. 38 shows a data structure of the activity status definition table in the management device 12. The "moving speed" is a field for ranges of the moving speed of the terminal device 16, and the "activity status" is a field for examples of estimated activities that the user 18 is currently engaged in and that is estimated from the moving speed. The communicableness status defined for each moving speed is entered in the "communicableness status" field. The ranges of the moving speed [km/h] and the activity statuses may be defined in finer details. In the illustrated example, it is estimated that the activity status of the user 18 is "walking" when the moving speed is "1-7 km/h", and it is estimated that the user is "driving a bicycle" when the moving speed is "16-25 km/h". The communicableness status is set to "1" when the moving speed meets one of these speed ranges. "Walking" and "driving a bicycle" are states in which the user 18 is carrying the terminal device 16 and moving. The likelihood of the user being asleep is extremely low and it is expected that the noise due to the movement is relatively small. Also, the likelihood that a third person is near the user 18 and may overhear the call is low so that it is highly likely that the information is properly communicated to the user 18 is high when a further terminal device 16 performs normal call origination. Hence, the above definition.

In the case of the other speed ranges, it is considered that the likelihood that the information is properly communicated to the user 18 in the event of normal call origination is relatively low, for "reasons (conditions) for unsuitableness for a call" shown below. Therefore, the communicableness status is set to "0". In other words, the other speed ranges meet at least one of the following reasonings: 1) the user 18 may not be carrying the terminal device 16; 2) the user 18 may be asleep; 3) the noise due to the movement is expected to be relatively large; and 4) the likelihood that a third person is near the user 18 and may overhear a call is high. In the case the moving speed is "0 km/h", for example, the activity status of the user 18 is estimated to be "at a stop", but 1) or 2) above may be the case so that the communicableness status is set to "0". In the case the moving speed is "36-km/h", the user 18 may be using the public transportation and it is highly likely that at least one of 2), 3) and 4) above is the case. Therefore, the communicableness status is set to "0". The activity status definition table 370 shown in FIG. 38 is by way of example only and should not be construed as limiting the scope of the embodiment. The ranges of moving speed, estimated activity statuses, and communicableness statuses may be different from those shown in FIG. 38. Reference is made back to FIG. 36.

The index calculator 350 acquires the communicableness status associated with the moving speed Vn [km/h] from the activity status definition table 370 and sets the status in a variable Sn. The index calculator 350 then updates the communicableness status of the N-th terminal device 16n in the communicableness status table 366 with the variable Sn. A plurality of activity status definition tables 370 may be made available depending on the time zone. For example, the activity status definition table 370 for daytime use and the activity status definition table 370 for night-time use may be made available. The index calculator 350 may refer to the activity status definition table 370 for daytime use in the case the current time C is "06:00-22:00" and refer to the activity status definition table 370 for night-time use in the case the current time C is "22:00-06:00". To discuss a difference between the activity status definition table 370 for daytime use and the activity status definition table 370 for night-time use, the communicableness status associated with the moving speed 0 km/h may be set to "1" if the exemplary table of FIG. 38 is for daytime use, because the likelihood that the user is asleep is low. If the table is for night-time use, the communicableness status associated with the moving speed 0 km/h may be set to "0" because the likelihood that the user is asleep is high.

Figure 39:
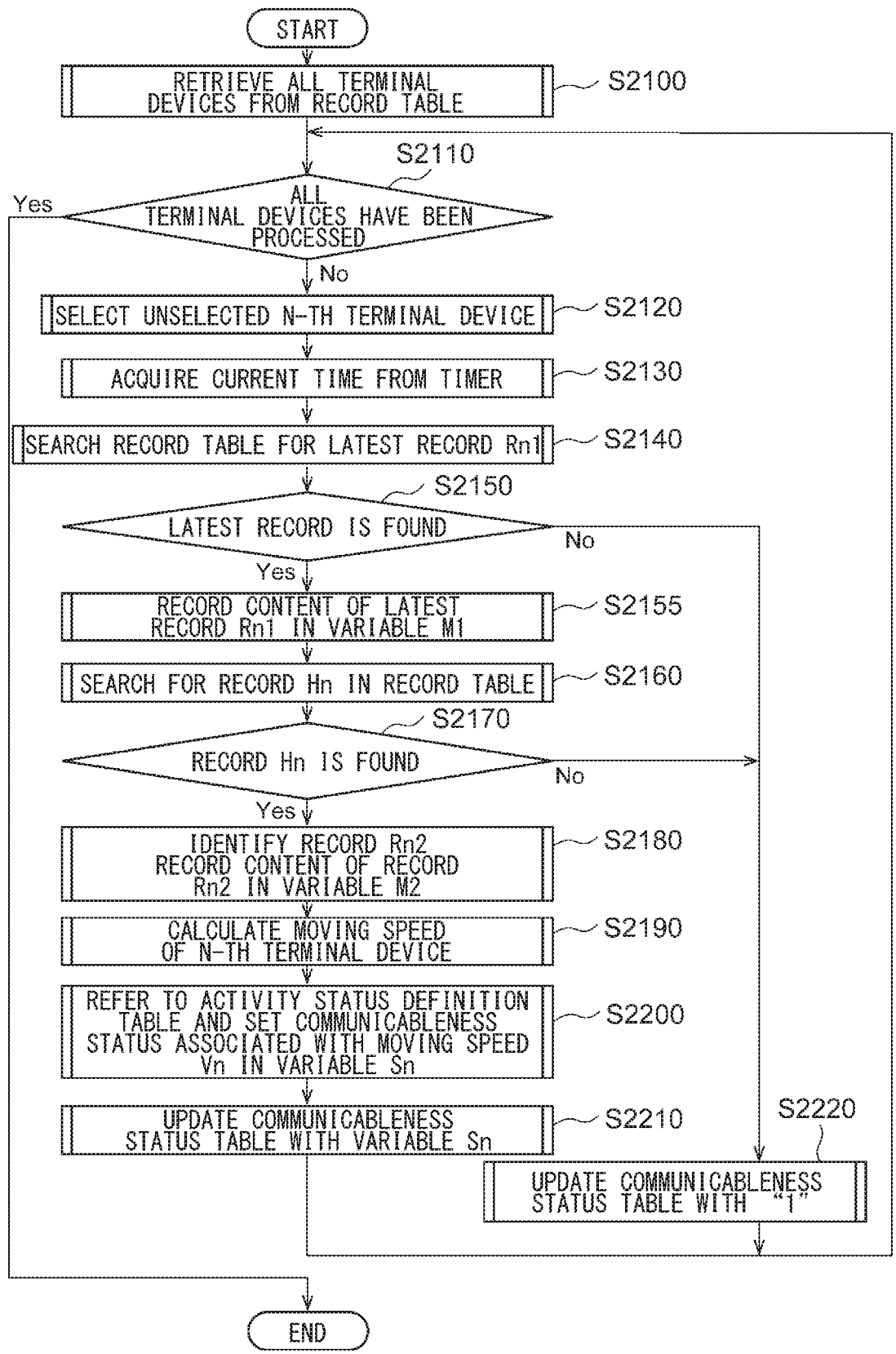
FIG. 39 is a flowchart showing a sequence of steps performed in the management device.

FIG. 39 is a flowchart showing a sequence of steps performed in the management device 12. In S2100, the index calculator 350 refers to the record table 362 and retrieves all terminal devices 16 recorded as terminal devices 16 in the record table 362. The index calculator 35 saves all terminal device names and IDs retrieved are saved in a list ML. The list ML is initialized when the steps are started. The index calculator 350 empties the list ML temporarily and then saves all terminal device names and IDs retrieved in the list. In S2110, the index calculator 350 refers to the list ML and determines whether all terminal devices 16 have been processed. When all terminal devices 16 have been processed, i.e., when one or more terminal device names and IDs are not saved in the list ML (S2110: Yes), the process is terminated. When not all of the terminal devices 16 have been processed, i.e., when one or more terminal device names and IDs are saved in the list ML (S2110: No), control proceeds to S2120.

In S2120, the index calculator 350 selects an arbitrary N-th terminal device 16n from the terminal devices 16 saved in the list ML. In this step, the index calculator 350 retrieves the terminal device name and ID of the N-th terminal device 16n from the list ML and then deletes the terminal device name and ID of the Nth terminal device 16n from the list ML. In other words, information on the unprocessed terminal devices 16 is saved in the list ML, and one of the unprocessed terminal devices 16 is selected in S2120. The index calculator 350 then proceeds to S2130. In S2130, the index calculator 350 acquires the current time C from the timer 332. The index calculator 350 then proceeds to S2140. In S2140, the index calculator 350 searches the record table 362 to identify, in a period of time P1 (e.g., five minutes) that goes back from the current time C, the latest record Rn1 for the N-th terminal device 16n in which the latest date of measurement and point of time of measurement are recorded. The index calculator 350 then proceeds to S2150. In S2150, the index calculator 350 determines whether the latest record Rn1 is found in the search in S2140. When the latest record Rn1 is found (S2150: Yes), the index calculator 350 proceeds to S2155. When the latest record Rn1 is not found (S2150: No), the index calculator 350 proceeds to S2220.

In S2155, the index calculator 350 records the content of the latest record Rn1 in the variable M1. The index calculator 350 then proceeds to S2160. In S2160, the index calculator 350 searches for a record Hn in the record table 362 related to the N-th terminal device 16$n$ in a period of time P2 (e.g., one minute) that goes back from the point of time of measurement recorded in the variable M1. The index calculator 350 then proceeds to S2170. In S2170, the index calculator 350 determines whether the record Hn is found in the search in S2160. When the record Hn is found (S2170: Yes), the index calculator 350 proceeds to S2180. When the record Hn is not found (S2170: No), the index calculator 350 proceeds to S2220. In S2180, the index calculator 350 identifies an arbitrary one record Rn2 (the record with the oldest point of time of measurement) of the records Hn identified in the search of S2160 and records the content of the record Rn2 in the variable M2. The index calculator 350 then proceeds to S2190.

In S2190, the index calculator 350 calculates the current moving speed Vn [km/h] of the N-th terminal device 16$n$ from the points of time of measurement and the positions (latitude, longitude) in the variable M1 and the variable M2, according to the method described above. The index calculator 350 then proceeds to S2200. In S2200, the index calculator 350 acquires the communicableness status associated with the moving speed Vn [km/h] from the activity status definition table 370 and sets the status in the variable Sn. The index calculator 350 then proceeds to S2210. In S2210, the index calculator 350 updates the communicableness status of the N-th terminal device 16$n$ in the communicableness status table 366 with the variable Sn. The index calculator 350 then returns to S2110. In S2220, the index calculator 350 sets the communicableness status of the N-th terminal device 16$n$ in the communicableness status table 366 to "1". The index calculator 350 then returns to S2110. After the communicableness status determination process is terminated, the communication circuit 334 delivers the communicableness status table 366 to each terminal device 16. In this way, the index calculator 350 calculates the degree associated with the activity status of the user 18, which is also the easiness with which the user 18 using the terminal device 16 recognizes communication, based on the position information or the information related to the moving speed of the terminal device 16.

In S2190, the moving speed Vn is calculated by using the position information on two points. Alternatively, a larger number of sets of position information may be used to calculate the moving speed Vn. Alternatively, the terminal device 16 may measure the moving speed, add the information on the moving speed to the position information packet, and transmit the packet to the management device 12, whereupon the management device 12 may record the information in the record table 362 and use it in the communicableness status determination process. More specifically, the management device 12 may retrieve the moving speed included in the variable M1 and define it as the moving speed Vn in S2190. Alternatively, the moving speed included in the variable M1 and the moving speed included in the variable M2 may be used to calculate an average value or a weighted average value thereof, and the average may be defined as the moving speed Vn.

The process performed when the terminal device 16 originates a call to a further terminal device 16 in this embodiment is the same as that of embodiment 4 so that a description thereof is omitted. The flowchart showing steps performed in the terminal device 16 is the same as that of FIG. 27.

According to this embodiment, the communicableness status is calculated based on the position information or the information related to the moving speed of the terminal device. Therefore, the easiness with which the user using the terminal device recognizes communication can be reflected in the communicableness status. By calculating the communicableness status associated with the activity status of the user based on the position information or the information related to the moving speed of the terminal device, the precision of the communicableness status can be improved. Since the communicableness status indicates the easiness with which the user using the terminal device recognizes communication, the plurality of types of communication modes can be used properly according to the activity status. By causing the management device to determine the moving speed of each terminal device and notify the terminal device of the moving speed, the occurrence of wasted calls resulting from changing the communication method in the terminal device is reduced. The user operation of the user is prevented from becoming complicated and, at the same time, information can be properly communicated to the receiving end.

Variation of Embodiment 8

A description will now be given of a variation of embodiment 8. In the variation of embodiment 8, the controller of the management device records the record table for a long period of time and detects the tendency in the moving speed of each terminal device depending on the time zone. The communication system 100, the terminal device 16, and the management device 12 according to embodiment 8 are of the same type as those of FIGS. 1, 32, 33, 35, and 36. The description below highlights a difference from the foregoing.

The controller 338 of the management device 12 records the record table 362 for a relatively long period of time (e.g., one month) and detects the tendency in the moving speed of each terminal device 16 depending on the time zone. For example, 30-day data is used to calculate an average value of the moving speed for every hour. More specifically, the average moving speed of the first terminal device 16$a$ for 10:00-11:00 is calculated to be "4 km/h", the average moving speed for 11:00-12:00 to be "0 km/h", and the average moving speed for 12:00-13:00 to be "16 km/h". The average moving speed of the second terminal device 16$b$ for 10:00-11:00 is calculated to be "30 km/h", the average moving speed for 11:00-42:00 to be "5 km/h", and the average moving speed for 12:00-13:00 to be "20 km/h", etc. Instead of an average value, a median or a mode may be calculated and used. In other words, a representative value of the moving speed for each time zone may be used.

The index calculator 350 then identifies a time zone in which the communicableness status is "0" according to the activity status definition table 370, based on the average moving speed of each terminal device 16. In the above example, the time zone of 11:00-12:00 for the first terminal device 16$a$ and the time zone of 10:00-11:00 for the second terminal device 16$b$ meet the condition. The index calculator 350 updates the communicableness status of the identified terminal device 16 in the identified time zone to "0". Alternatively, the index calculator 350 may update the communicableness status to "0" since a point of time that is a predetermined period of time (e.g., five minutes) before the start time of the identified time zone until a point of time that is a predetermined period of time (e.g., five minutes) after the end time of the identified time zone. In other words, the index calculator 350 may set the communicableness status to "0" in accordance with the identified time zone. After the time zone detection process is terminated, the communication circuit 34 delivers the communicableness status table 366 to each terminal device 16. The process performed in the terminal device 16 in this variation is the same as that of embodiment 8. The controller 338 may calculate the average moving speed for each combination of the day of week and the time zone instead of calculating the average speed for each time zone. The average moving speed may be calculated for each combination of the date and the time zone.

The process of this embodiment is particularly useful in cases where the behavior pattern of the user 18 of the terminal device 16 is regular. For example, the variation is particularly useful in a case where the user 18 of the terminal device 16 moves by public transportation such as a railway during 12:00-13:00 almost every day. According to this variation, the communicableness status is calculated based on the moving speed averaged for each time zone so that the communication mode suited to the time zone can be used. By identifying a time zone for each terminal device in which the communicableness status is "0" and setting the communicableness status to "0" in the identified time zone even if the current moving speed cannot be calculated, the risk of a call being unheard by the user is further reduced.

Embodiment 9

A description will now be given of embodiment 9. In embodiment 9, the communicableness status determination process is performed with higher precision than in embodiment 8, by storing map information in the storage. The communication system 100, the terminal device 16, and the management device 12 according to embodiment 9 are of the same type as those of FIGS. 1, 32, 33, 35, and 36. The description below highlights a difference from the foregoing.

In comparison with the activity status definition table 370 of FIG. 38 of embodiment 8, this embodiment uses an activity status definition table 370 defining more detailed patterns by combining the latest position information on the terminal device 16 and the map information. FIG. 40 shows a data structure of the activity status definition table 370 in the management device 12. As illustrated, given the same range of moving speed, the table defines, depending on the situation of activity, communicableness statuses different from those of the activity status definition table 370 of embodiment 8. More specifically, when the moving speed meets a speed range "36-80 km/h", the index calculator 350 uses the map information to determine whether the means of movement is a car, train, or ship. When the route of movement (past position information) of the terminal device 16 matches a road, the index calculator 350 determines that the user is moving by car. When the route matches a railway track, the index calculator 350 determines that the user is moving by train. When the route of movement is a river or a lake, the index calculator 350 determines that the user is moving by ship.

When the means of movement is determined to be a car, the index calculator 350 further determines whether the user is moving in a passenger car or by bus. More specifically, it is determined whether the user is moving in a passenger car or by bus, by using information related to the variation in the moving speed. When, for example, Vn is "40 km/h", the route of movement is a road, and the speed drops to "0 km/h" substantially periodically, it is highly likely that the stop is at a bus stop so that the index calculator 350 determines that the user is moving by bus. Alternatively, in the case the map information contains information on bus stops and there are many stops at bus stops, the index calculator 350 determines that the user is moving by bus. When the map information does not contain information on bus stops but contains information on traffic lights, the index calculator 350 determines that the user is moving by bus in the case there are a large number of stops at places other than traffic lights. When it cannot be determined that the user is moving by bus, the index calculator 350 determines that the user is moving in a passenger car.

The index calculator 350 changes the communicableness status depending on whether the user is moving in a passenger car, by train, by bus, or by ship. When Vn is "40 km/h" and the activity status is "on board a passenger car on a general road", For example, it is expected that the user 18 of the terminal device 16 is driving the car or sitting in a front passenger seat or a rear passenger seat. In this case, at least the driver should not be asleep, and at least one person should be able to recognize a call. The likelihood that a third person not related to the user 18 of the terminal device 16 at all is low, and it is expected that the noise in the car is not so large. It is therefore determined that the situation is suitable for a call, and the communicableness status is set to "1".

Meanwhile, when Vn is "40 km/h" and the activity status is "on board a local or rapid train", it is expected that a large number of third persons are around the user 18, and it is also likely that the user 18 is asleep. It is therefore determined that the user 18 cannot know a call if the call is started abruptly. Accordingly, the communicableness status is set to "0". When Vn is "40 km/h" and the activity status is "on board a bus on a general road", the communicableness status is set to "0" for a reason similar to that of moving by train. When Vn is "40 km/h" and the activity status is "on board a ship", the communicableness status is set to "0" for a reason similar to that of moving by train. In the case the moving speed meets a speed range "81-300 km/h", a determination is made, as in the case of the speed range of "36-80 km/h", as to whether the means of movement is a car or a train by using the map information. In the case of a car, a further determination may be made to see whether the user is moving in a passenger car or by bus. As a result, the determination "on board a passenger car on a highway", "on board a high-speed railway like Shinkansen", or "on board an express bus" is yielded. The communicableness status may be set in accordance with the result.

A determination is made as to whether the current location of the user 18 is the user's home or elsewhere, by using the position information on the terminal device 16. The user 18 registers the address, latitude, and longitude of the user's home in the management device 12 in advance. When user registers the address of the user's home, the management device 12 converts the address into the latitude, longitude and stores the latitude, longitude in the storage 340. The management device 12 determines whether the current position of the terminal device 16 meets the registered position of the user's home. The user may register the place of work, etc. for use in the process. When Vn is "0 km/h", for example, the activity status is set to "at a stop (at rest) at home" or "at a stop at a place other than home". When the current location of the user 18 is the user's home, it is likely that the user is asleep at home or away from the terminal device 16 so that the communicableness status is set to "0". When the current location of the user 18 is a place other than the user's home, the likelihood that the user 18 is asleep is determined to be low so that the communicableness status is set to "1". Thus, the index calculator 350 uses the map information additionally to calculate the easiness with which the user 18 using the terminal device 16 recognizes communication.

Hereinafter, the communicableness status determination process in the management device 12 in this embodiment will be described. The configuration of the record table 362 and the communicableness status table 366, the timing of performance of the communicableness status determination process, etc. are the same as those of embodiment 8. The index calculator 350 performs the communicableness status determination process of FIG. 39 through S2190 and calculates the speed Vn [km/h] of the N-th terminal device 16n. The index calculator 350 then proceeds to S2195 (not shown). In S2195, the index calculator 350 performs a geographical property determination process based on the current position (Nn, En) of the N-th terminal device 16n recorded in the variable M1, i.e., the latest position information indicating the position where the N-th terminal device 16n is located.

More specifically, the index calculator 350 refers to the map information in the storage 340 and performs the geographical property determination process for the current position (Nn, En) of the N-th terminal device 16n. The geographical property determination process is a process to determine the geographical property (type facility, outdoor, indoor, road, railway, on land, at sea, home, place of work, etc.) of the current position (Nn, En) of the N-th terminal device 16n, by using the map information in the storage 340. The index calculator 350 records the geographical property yielded as the determination result in a variable Q. Information such as "road", "sidewalk", "railway station, railway track", "at sea", "event facility", "home", "place of work", etc. is entered in the variable Q.

Subsequently, in S2200A corresponding to S2200, the index calculator 350 refers to the activity status definition table 370, acquires the communicableness status by using the moving speed Vn and the variable Q, and sets the status in the variable Sn. When, for example, Vn is "40 km/h" and the variable Q is "road" in the example of FIG. 40, it is determined that the user 18 is currently moving by car. Thus, the activity status is "on board a passenger car on a general road" and the communicableness status is "1" so that "1" is set in the variable Sn. When Vn is "40 km/h" and the variable Q is "railway station, railway track", it is determined that the user 18 is currently moving by train. Thus, the activity status is "on board a local or rapid train" and the communicableness status is "0" so that "0" is set in the variable Sn.

When Vn is "0 km/h" and the variable Q is "home", by way of another example, it is likely that the user 18 is asleep at home or away from the terminal device 16, as described above, and the communicableness status is defined to be "0". Therefore, "0" is set in the variable Sn. When Vn is "0 km/h" and the variable Q is "other than home", it is determined to be unlikely that the user 18 is asleep, and the communicableness status is defined to be "1". Therefore, "1" is set in the variable Sn. The index calculator 350 then proceeds to S2210. In S2210, the index calculator 350 updates the communicableness status table 366 with the variable Sn, as in embodiment 8.

In this embodiment, the variable Q is assumed to contain "road", "sidewalk", "railway station, railway track", "at sea", and "event facility" to simplify the explanation. The result yielded by the geographical property determination process may indicate more detailed information or may comprise an identification number instead of character information. The activity statuses in the activity status definition table of FIG. 40 may be defined in a more detailed and segmented manner.

According to this embodiment, the geographical property of the place where the terminal device 16 is located is determined by using map information so that the precision of the communicableness status can be further improved.

Embodiment 10

A description will now be given of embodiment 10. In embodiment 10, RBT call origination assistance is not performed in the terminal device, and RBT call origination assistance is performed in the management device. The communication system 100, the terminal device 16, and the management device 12 according to embodiment 10 are of the same type as those of FIGS. 1, 32, 33, 35, and 36. The following description concerns a difference from the foregoing.

As in embodiment 8, the index calculator 350 of the management device 12 calculates the communicableness status as an easiness-of-communication index, based on the position information or the information related to the moving speed of the terminal device 16. The communicableness status indicates the degree associated with the activity status of the user 18 and also indicates the easiness with which the user 18 using the terminal device 16 recognizes communication. Meanwhile, the terminal device 16 omits the steps of S1380-S1390 in the flowchart shown in FIG. 27. When a determination of Yes is yielded in S1370, the terminal device 16 performs normal call origination in S1410. When the calling terminal device 16 requests normal call origination, the management device 12 performs steps similar to S1380-S1390. In other words, the controller 338 of the management device 12 refers to the communicableness status table 366. When the communicableness status of the destination terminal device 16 is "0", the controller 338 calls the destination terminal device 16 by using the RBT call origination protocol instead of the normal call origination protocol.

The management device 12 may perform the variation of embodiment 9. In other words, the index calculator 350 may calculate the easiness with which the user 18 of the terminal device 16 recognizes communication using the map information additionally. Alternatively, the management device 12 may perform the variation of embodiment 8. In other words, the index calculator 350 may calculate the moving speed of the terminal device 16 for each time zone and calculate the communicableness status based on the calculated speed.

According to this embodiment, the communicableness status is calculated for each of the plurality of terminal devices, and, when the communicableness status meets a predetermined condition, the second communication mode is switched to the first communication mode. Therefore, the plurality of types of communication modes can be used properly. The communicableness status is calculated based on the position information or the information related to the moving speed of the terminal device. Therefore, the easiness with which the user using the terminal device recognizes communication can be reflected in the communicableness status. By calculating the communicableness status associated with the activity status of the user based on the position information or the information related to the moving speed of the terminal device, the precision of the communicableness status can be improved. Since the communicableness status indicates the easiness with which the user using the terminal device recognizes communication, the plurality of types of communication modes can be used properly according to the activity status.

By calculating the communicableness status based on the moving speed averaged for each time zone, the communication mode suited to the time zone can be used. By using the map information additionally, the precision of the communicableness status is further improved. The process of delivering the communicableness status table from the management device to the terminal device and the RBT call origination assistance process in the terminal device can be omitted so that the amount of processing and necessary memory size of the terminal device can be reduced. Since the amount of processing and necessary memory size of the terminal device can be reduced, the cost of the terminal device can be reduced. Since the RBT call origination assistance process is performed in the management device, which has a higher processing capacity than the terminal device and is provided with rich resources (memory, etc.), a more complicated process can be performed. Modification of the program of the management device is easier than modification of the program of each terminal device so that the RBT call origination assistance process can be modified easily.

In embodiment 1 through embodiment 10, the communication system for processing a voice call between the terminal devices 16 is illustrated in the description. Alternatively, communication other than a voice call may be processed. For example, the communication system may process video calls using video and voice. Alternatively, text messages may be exchanged in the communication system. For example, a normal call origination mode and an RBT call origination mode (forced response mode) are defined in a chat system for exchanging text data or image data. In the case it is desired in the first terminal device 16a to transmit text data to the second terminal device 16b, the user 18 (the first user 18a) of the first terminal device 16a can input and transmit text data immediately in the normal call origination mode. The transmitted data is immediately displayed in the second terminal device 16b, but it is not guaranteed that the user 18 (the second user 18b) of the second terminal device 16b is recognizing it.

In the RBT call origination mode, on the other hand, the first terminal device 16a transmits a session start request to the second terminal device 16b. In the second terminal device 16b, it is indicated on the screen that there is a session start request, and an alert sound, etc. is output. A session is established as the second user 18b performs a certain user operation to respond (accept) the session start request. Thereafter, the first user 18a can input a text. The first user 18a performs a user operation such as an input of a text immediately after the second user 18b responds. It is therefore more likely that the second user 18b recognizes the message immediately than in the normal call origination mode. This prevents the user operation of the user 18 from being wasted even in the case of sending a message that would be worthless if the recipient recognizes it when the time passes. Both of the terminal devices 16 may transmit data freely for a predetermined period of time after the user session is established. Alternatively, the system may operate to make it necessary for a user to wait for a response of the recipient before transmitting data. The embodiment can be applied to such a communication system, and the user operation of the calling user 18 is advantageously prevented from being wasted due to absence or inactivity of the recipient.

In the case the present embodiment is applied to a chat system, the activity status definition table 370 may contain values different from those of the example shown in FIG. 40. In the case of "driving a bicycle", for example, there would be no problems with a voice call, but there would be a problem with a chat in which text inputs are required. Therefore, the communicableness status is set to "0". Meanwhile, there would be problems with a voice call but there wouldn't be any problems with a chat if the user is using public transportation such as train, bus, and ship. Therefore, the communicableness status is set to "1". In this way, the activity status definition table 370 may be modified in accordance with the type (kind) of communication. The activity status definition table 370 may be stored for respective types of communication such as a voice call, a video call, and text message exchange (mail, etc.), and the proper activity status definition table 370 may be selected and used depending on the type of communication used.

Embodiment 11

A description will now be given of embodiment 11. Embodiment 11 is a combination of embodiment 1 and embodiment 8. The communication system 100 according to embodiment 11 is of the same type as that of FIG. 1, the management device 12 is a combination of FIGS. 6, 7, 35, and 36, and the terminal device 16 is a combination of FIGS. 12, 13, 32, and 33. The description below highlights a difference from the foregoing.

As in embodiment 1, the controller 338 of the management device 12 creates the record table 362. In further accordance with this embodiment, the index calculator 350 creates an easiness-of-communication index table for the terminal device 16. As described above, an easiness-of-communication index is an index indicating the easiness with which the user 18 of the terminal device 16 receiving a call recognizes communication. In this embodiment, communication for a voice call is illustrated in the description, but, as described above, communication for a chat, etc. for exchanging text messages may be performed. When the user 18 is not near the terminal device 16, for example, the user cannot recognize the presence of a call so that the easiness-of-communication index will have a low value. When the user 18 is asleep or occupied with some work, the likelihood that the user 18 cannot recognize the presence of a call will be high so that the easiness-of-communication index will have a low value. While the user 18 is using public transportation, a voice call will be annoying to people around so that the easiness-of-communication index will have a low value. When the noise around the terminal device 16 is large, for example, the user 18 will have difficulty to hear the sound of a call or a ring-back tone so that the easiness-of-communication index will have a low value. The easiness-of-communication index (communicableness status) of embodiment 8 is a binary value of "0" or "1", but the easiness-of-communication index according to this embodiment takes on a larger number of values or a continuous value.

FIG. 41 shows a data structure of the activity status definition table stored in the storage 340 of the management device 12. The terminal device name and ID of the terminal device 16 are entered in the "terminal device name and ID" field. The easiness-of-communication index is updated (overwritten) by the result of the easiness-of-communication index process described later. FIG. 41 shows that the minimum value of the easiness-of-communication index is 0, and the maximum value is 10 by way of example. The range between the minimum value and the maximum value may be otherwise. For example, the minimum value may be 0 and the maximum value may be 100, etc.

The controller 338 detects call information on the terminal device 16 from the communication circuit 334. The index calculator 350 performs an easiness-of-communication estimation process after the controller 338 appends the point of time and a record related to the terminal device 16 to the record table 362 or at a predetermined interval (e.g., at an interval of one minute). The easiness-of-communication estimation process is a process to calculate the easiness-of-communication index of each terminal device 16. The index calculator 350 updates the easiness-of-communication index in the easiness-of-communication index table with the easiness-of-communication index of each terminal device 16 yielded by the easiness-of-communication estimation process. After the easiness-of-communication index table is updated or at a predetermined interval (e.g., at an interval of one minute), the index calculator 350 delivers the whole content of the easiness-of-communication index table to each terminal device 16.

A description will be given of the easiness-of-communication estimation process in specific details. To calculate the easiness-of-communication index of the X-th terminal device 16x, the index calculator 350 searches the records in the record table 362 designating the X-th terminal device 16x as the calling terminal to identify a record with the newest point of time of call origination (the record closest to the current time). The identified record will be referred to as the latest call origination record of the X-th terminal device 16x, and the value of the record No. will be denoted by NS. In the case there are no call origination records in which the X-th terminal device 16x is the calling terminal, NS is set to "000". The index calculator 350 searches those records designating the X-th terminal device 16x as the receiving terminal and having a value of the record No. larger than NS to identify records with the point of time of reception up to the current time and counts the number of identified records. In other words, of the records related to the X-th terminal device 16x, the index calculator 350 counts the number of reception records newer than the latest call origination record.

In order to originate a call, it is necessary for the user 18 to manipulate the X-th terminal device 16x actively. It is therefore guaranteed that the X-th user 18x of the X-th terminal device 16x was near the X-th terminal device 16x and was active (not asleep) at the point of time designated by the record "NS". In this embodiment, the status in which the user 18 can know the content of communication (e.g., the status in which the user 18 is not asleep or the status in which the user 18 is not occupied by an activity other than communication) will be referred to as "active status". The number of records counted here represents the number of times that the X-th terminal device 16x receives a call after the last point of time when the user 18 was identified to be active near the X-th terminal device 16x. In other words, it is predicted that the smaller the number of records counted, the more likely it is that the user can know the content of communication and that the larger the number of records counted, the less likely it is that the user can know the content of communication.

In the easiness-of-communication estimation process, the "likelihood that the user can know the content of communication" and the noise level around the terminal device 16 are turned into a numerical value indicating the easiness-of-communication index. FIG. 41 shows an exemplary configuration of an activity status index table that maps the activity status to the activity status index. The activity status index is an index indicating the easiness of recognition of communication in an associated activity status. In the illustrated example, the activity status index of "10" associated with "walking" is highest, indicating that it is easiest to recognize a call in that state. It is highly likely that the statuses "at a stop at a place other than home" and "driving a bicycle" do not meet the "reasons for unsuitableness for a call" described above. Therefore, the activity status index has a relatively high value of "8".

The activity status index may be directly used as the easiness-of-communication index, but, in this embodiment, the easiness-of-communication index SX of the X-th terminal device 16x is calculated as follows, using the number of records CountX showing that the X-th terminal device 16x has received a call since the point of time of NS until the current time and the activity status index ActX.

$$SX = \alpha \times ActX - \beta \times CountX \qquad \text{(formula 14)}$$

where $\alpha$ and $\beta$ are predetermined coefficients greater than 0. As can be known from (formula 14), the smaller the value of CountX and the larger the activity status index ActX, the higher the easiness-of-communication index SX. In other words, the formula predicts that the smaller the value of CountX and the larger the activity status index, the higher the likelihood that the user can know the content of communication. In the case a negative value of the easiness-of-communication index SX of the X-th terminal device 16x results, the easiness-of-communication index SX can be uniformly "0".

Alternatively, the index calculator 350 may calculate the easiness-of-communication index SX by using a value (output) returned from a nonlinear function G with CountX as an argument (input).

$$SX = \alpha \times G1(ActX) - \beta \times G2(CountX) \qquad \text{(formula 15)}$$

The functions G1, G2 are linear or non-linear monotonically increasing functions. There may be an interval in which the output value does not vary as the input value is increased. The functions G1, G2 may be monotonically increasing functions in the broad sense of the term (monotonically non-decreasing functions). For example, a function having the characteristic shown in FIG. 10A may be used. The function G in the illustrated example is a monotonically increasing function in which the greater the input, the greater the output. The function G also has an exponential nature in which the greater the input, the greater the increase rate of the output. Alternatively, a function having a logarithmic nature, in which the greater the input, the smaller the increase rate of the output, may be used. Using linear monotonically increasing functions as the functions G1, G2 results in the process defined by (formula 14). The function G1 and the function G2 may be identical or different.

The easiness-of-communication index SX may be calculated as follows by using, instead of CountX, an elapsed time TX elapsed since the last call origination from the X-th terminal device 16x until the current time.

$$\text{Easiness-of-communication index } SX = \alpha \times F1(ActX) - \beta \times F2(TX) \qquad \text{(formula 16)}$$

The functions F1, F2 are linear or non-linear monotonically increasing functions. There may be an interval in which the output value does not vary as the input value is increased. The functions F1, F2 may be monotonically increasing functions in the broad sense of the term (monotonically non-decreasing functions). For example, a function having the characteristic shown in FIG. 10B may be used. The function F in the illustrated example is a monotonically increasing function in which the greater the input, the greater the output. The function F also has a logarithmic nature in which the greater the input, the smaller the increase rate of the output. Alternatively, a function having an exponential nature, in which the greater the input, the greater the increase rate of the output, may be used as the function F. Linear monotonically increasing functions may be used as the functions F1, F2. The function F1 and the function F2 may be identical or different.

The index calculator 350 may calculate the easiness-of-communication index SX as follows by using both CountX and the elapsed time TX.

$$SX = \alpha \times G1(ActX) - \beta \times G2(CountX) \times F1(TX) \quad \text{(formula 17)}$$

As described above, the functions G1, G2, F1 are linear or non-linear monotonically increasing functions. According to the formula above, the greater the activity status index, the greater the easiness-of-communication index SX, the greater CountX, the smaller the easiness-of-communication index SX, and the greater TX, the smaller the easiness-of-communication index SX. Predetermined coefficients $\alpha$ and $\beta$ are used in the formulas, but each of the coefficients may have different values depending on the formula.

The communication circuit 34 of the terminal device 16 receives the easiness-of-communication index table from the management device 12. The easiness-of-communication index table is created in the storage 40 of the terminal device 16. When the easiness-of-communication index table is delivered from the management device 12, the terminal device 16 updates the content of the easiness-of-communication index table in the storage 40. In this embodiment, when the terminal device 16 originates a call to a further terminal device 16, the terminal device 16 acquires the easiness-of-communication index of the destination terminal device 16 from the easiness-of-communication index table in S1380A, which corresponds to S1380 in the flowchart of FIG. 27.

The terminal device 16 determines whether the easiness-of-communication index is less than a predetermined value in S1390A, which corresponds to S1390.

According to this embodiment, the easiness-of-communication index is calculated by using the moving speed of the terminal device and the estimated value of the activity status of the user so that the likelihood that the user may not hear a call can be estimated with high precision. The likelihood that the user may not hear a call can be estimated with high precision so that wasted calls are prevented with higher precision.

Arbitrary combinations of embodiment 1 through embodiment 11 are also useful. According to this variation, the advantage from arbitrary combinations of embodiment 1 through embodiment 11 can be obtained.

The present invention may be defined by the following items.

[Item 1-1]
A management adapted to manage a plurality of terminal devices, comprising:
an index calculator that calculates, for each of the plurality of terminal devices, an easiness-of-communication index indicating a degree to which a user using the terminal device recognizes communication, based on information related to the plurality of terminal devices; and
a transmitter that transmits the easiness-of-communication index calculated in the index calculator to each of the plurality of terminal devices, wherein
the easiness-of-communication index is information that allows the terminal device receiving the easiness-of-communication index to select a first communication mode, in which communication is started after the user of the terminal device performs a predetermined user operation, or a second communication mode, in which communication is started even if the user of the terminal device does not perform a predetermined user operation.

[Item 1-2]
The management device according to Item 1-1, wherein
the index calculator calculates the easiness-of-communication index, based on at least one of the number of times that the terminal device receives a call since call origination from the terminal device and an elapsed time elapsed since a point of time of call origination from the terminal device.

[Item 1-3]
The management device according to Item 1-2, wherein
the index calculator calculates the easiness-of-communication index such that the larger the number of times that the terminal device receives a call since call origination from the terminal device, or the longer the elapsed time elapsed since the point of time of call origination from the terminal device, the lower a value of the easiness-of-communication index.

[Item 1-4]
The management device according to Item 1-2 or 1-3, further comprising:
a receiver that receives a threshold value that should be compared with an activity status of the user from each terminal device, wherein
the transmitter transmits a table aggregating threshold values respectively defined for the plurality of terminal devices to each of the plurality of terminal devices.

[Item 1-5]
The management device according to Item 1-2, wherein
the easiness-of-communication index calculated in the index calculator indicates an activity status of the user averaged for each time zone.

[Item 1-6]
The management device according to Item 1-1, further comprising:
a receiver that receives information related to loudness of sound around the terminal device, wherein
the easiness-of-communication index related to the terminal device calculated in the index calculator is such that the larger the sound, the lower a value of the easiness-of-communication index.

[Item 1-7]
The management device according to Item 1-6, wherein
the index calculator calculates the easiness-of-communication index related to a given terminal device, based on information related to loudness of sound around the given terminal device and information related to loudness of sound around a further terminal device different from the given terminal device.

[Item 1-8]
The management device according to Item 1-6, wherein
the index calculator generates a high-noise map showing a position where the loudness of sound is equal to or larger than a threshold value, based on information related to loudness of sound around the plurality of terminal devices over a predetermined period of time, and calculates easiness with which the user using the terminal device recognizes communication, based on the high-noise map.

[Item 1-9]

The management device according to Item 1-6, wherein the index calculator calculates easiness with which the user using the terminal device recognizes communication, based on information related to loudness of sound averaged for each time zone.

[Item 1-10]

The management device according to Item 1-1, further comprising:

a receiver that receives position information or information related to a moving speed of the terminal device, wherein the index calculator calculates the easiness-of-communication index, based on whether the position information or the moving speed received by the receiver meets a predetermined condition.

[Item 1-11]

The management device according to any one of Items 1-1 through 1-10, wherein the easiness-of-communication index transmitted in the transmitter is information that allows the terminal device transmitting a communication request to select the first communication mode when the easiness-of-communication index is of a value less than a predetermined value.

[Item 1-12]

The management device according to any one of Items 1-1 through 1-11, wherein the index calculator calculates easiness with which the user using the terminal device recognizes communication, by additionally using map information.

[Item 1-13]

A terminal device comprising:

a receiver that receives an easiness-of-communication index indicating a degree to which a user using a further terminal device recognizes communication;

a controller that selects, based on the easiness-of-communication index received in the receiver, a first communication mode, in which communication is started after a predetermined user operation is performed in the further terminal device, or a second communication mode, in which communication is started even if a predetermined user operation is not performed in the further terminal device; and a transmitter that originates a signal to the further terminal device in accordance with the communication mode selected in the controller.

[Item 1-14]

The terminal device according to Item 1-13, wherein the controller selects the first communication mode when the easiness-of-communication index received in the receiver is of a value less than a predetermined value.

[Item 1-15]

The terminal device according to Item 1-13 or 1-14, wherein the receiver further receives a threshold value associated with the further terminal device, and the controller selects the first communication mode when the easiness-of-communication index associated with the further terminal device is of a value less than the threshold value associated with the further terminal device received in the receiver.

[Item 1-16]

A program comprising modules implemented by a computer adapted to manage a plurality of terminal devices, the modules including:

a module that calculates, for each of the plurality of terminal devices, an easiness-of-communication index indicating a degree to which a user using the terminal device recognizes communication, based on information related to the plurality of terminal devices; and a module that transmits the easiness-of-communication index calculated to each of the plurality of terminal devices, wherein the easiness-of-communication index is information that allows the terminal device receiving the easiness-of-communication index to select a first communication mode, in which communication is started after the user of the terminal device performs a predetermined user operation, or a second communication mode, in which communication is started even if the user of the terminal device does not perform a predetermined user operation.

[Item 1-17]

A program comprising computer-implemented modules including:

a module that receives an easiness-of-communication index indicating a degree to which a user using a further terminal device recognizes communication;

a module that selects, based on the received easiness-of-communication index, a first communication mode, in which communication is started after a predetermined user operation is performed in the further terminal device, or a second communication mode, in which communication is started even if a predetermined user operation is not performed in the further terminal device; and a module that originates a signal to the further terminal device in accordance with the selected communication mode.

[Item 2-1]

A management device adapted to manage a terminal device, comprising:

an index calculator that calculates, for the terminal device, an easiness-of-communication index indicating a degree to which a user using the terminal device recognizes communication, by using information related to the terminal device; and a receiver that receives communication request data of a first communication mode or a second communication mode from a first terminal device originating a call, the communication request data designating a second terminal device as a destination of the call; and a transmitter that transmits, when the receiver receives the communication request data of the second communication mode and the easiness-of-communication index of the second terminal device meets a predetermined condition, communication request data of the first communication mode to the second terminal device, wherein the first communication mode is a communication mode in which communication between the first terminal device and the second terminal device is started after a predetermined user operation is performed in the second terminal device, and the second communication mode is a communication mode in which communication between the first terminal device and the second terminal device is started even if a predetermined user operation is not performed in the second terminal device.

[Item 2-2]

The management device according to Item 2-1, wherein the index calculator calculates the easiness-of-communication index such that the larger the number of times that the terminal device receives a call since call origination from the terminal device, or the longer the elapsed time elapsed since a point of time of call origination from the terminal device, the lower a value of the easiness-of-communication index.

[Item 2-3]

The management device according to Item 2-1 or 2-2, wherein the easiness-of-communication index calculated in the index calculator is such that the larger the number of times that the terminal device receives a call since call origination from the terminal device, or the longer the elapsed time elapsed since a point of time of call origination from the terminal device, the lower a value of the easiness-of-communication index.

[Item 2-4]

The management device according to Item 2-2 or 2-3, wherein the receiver further receives a threshold value related to the easiness-of-communication index of the second terminal device, and the transmitter determines that the predetermined condition is met when the easiness-of-communication index of the second terminal device is of a value less than the threshold value.

[Item 2-5]

The management device according to Item 2-1, wherein the information related to the terminal device used in the index calculator is information related to loudness of sound around the terminal device, and the easiness-of-communication index calculated in the index calculator is such that the larger the sound, the lower a value of the easiness-of-communication index.

[Item 2-6]

The management device according to Item 2-5, wherein the index calculator calculates the easiness-of-communication index related to a given terminal device, based on information related to loudness of sound around the given terminal device and information related to loudness of sound around a further terminal device different from the given terminal device.

[Item 2-7]

The management device according to Item 2-6, wherein the index calculator generates a high-noise map showing a position where the loudness of sound is equal to or larger than a threshold value, based on information related to loudness of sound around the plurality of terminal devices over a predetermined period of time, and calculates easiness with which the user using the terminal device recognizes communication, based on the high-noise map.

[Item 2-8]

The management device according to Item 2-5 or 2-6, wherein the index calculator derives information by averaging, for each of a plurality of time zones, the information related to the loudness of sound around the terminal device measured over a predetermined period of time and calculates the easiness-of-communication index for each of the plurality of time zones, based on the information derived, and the transmitter identifies a time zone corresponding to a point of time that the receiver receives the communication request data from among the plurality of time zones and determines whether the easiness-of-communication index associated with the identified time zone meets the predetermined condition.

[Item 2-9]

The management device according to Item 2-1, wherein the index calculator uses, as information related to the terminal device, position information or information related to a moving speed of the terminal device and calculates the easiness-of-communication index of a value lower than a predetermined value when the position information or the moving speed of the terminal device meets a predetermined condition.

[Item 2-10]

The management device according to Item 2-9, wherein the index calculator derives information by averaging, for each of a plurality of time zones, the position information or the moving speed of the terminal device measured over a predetermined period of time and calculates the easiness-of-communication index for each of the plurality of time zones, based on the information derived, and the transmitter identifies a time zone corresponding to a point of time that the receiver receives the communication request data from among the plurality of time zones and determines whether the easiness-of-communication index associated with the identified time zone meets the predetermined condition.

[Item 2-11]

A program comprising modules implemented by a computer adapted to manage a terminal device, the modules including:

a module that calculates, for the terminal device, an easiness-of-communication index indicating a degree to which a user using the terminal device recognizes communication, by using information related to the terminal device; and a module that receives communication request data of a first communication mode or a second communication mode from a first terminal device originating a call, the communication request data designating a second terminal device as a destination of the call; and a module that transmits, when the communication request data of the second communication mode is received and the easiness-of-communication index of the second terminal device meets a predetermined condition, communication request data of the first communication mode to the second terminal device, wherein the first communication mode is a communication mode in which communication between the first terminal device and the second terminal device is started after a predetermined user operation is performed in the second terminal device, and the second communication mode is a communication mode in which communication between the first terminal device and the second terminal device is started even if a predetermined user operation is not performed in the second terminal device.

What is claimed is:

1. A management device adapted to manage a terminal device, comprising:

an index calculator circuit that calculates, for the terminal device, an easiness-of-communication index indicating a degree to which a user using the terminal device recognizes communication, by using information related to the terminal device;

a receiver that receives communication request data of a first communication mode or a second communication mode from a first terminal device originating a call, the communication request data designating a second terminal device as a destination of the call; and a transmitter that transmits, when the receiver receives the communication request data of the second communication mode and the easiness-of-communication index of the second terminal device meets a predetermined condition, the communication request data of the first communication mode to the second terminal device, wherein the index calculator circuit calculates the easiness-of-communication index such that the larger the number of times that the terminal device receives a call since call origination from the terminal device, or the longer an elapsed time elapsed since a point of time of call origination from the terminal device, the lower a value of the easiness-of-communication index, the transmitter determines that the predetermined condition is met when the easiness-of-communication index of the second terminal device is of a value less than a threshold value, and the first communication mode is a communication mode in which communication between the first terminal device and the second terminal device is started after a predetermined user operation is performed in the second terminal device, and the second communication mode is a communication mode in which communication between the first terminal device and the second terminal device is started even if the predetermined user operation is not performed in the second terminal device.

2. A management device adapted to manage a terminal device, comprising:

an index calculator circuit that calculates, for the terminal device, an easiness-of-communication index indicating a degree to which a user using the terminal device recognizes communication, by using information related to the terminal device;

a receiver that receives communication request data of a first communication mode or a second communication mode from a first terminal device originating a call, the communication request data designating a second terminal device as a destination of the call; and a transmitter that transmits, when the receiver receives the communication request data of the second communication mode and the easiness-of-communication index of the second terminal device meets a predetermined condition, the communication request data of the first communication mode to the second terminal device, wherein the receiver further receives a threshold value related to the easiness-of-communication index of the second terminal device, the transmitter determines that the predetermined condition is met when the easiness-of-communication index of the second terminal device is of a value less than the threshold value, and the first communication mode is a communication mode in which communication between the first terminal device and the second terminal device is started after a predetermined user operation is performed in the second terminal device, and the second communication mode is a communication mode in which communication between the first terminal device and the second terminal device is started even if the predetermined user operation is not performed in the second terminal device.

3. The management device according to claim 2, wherein
the receiver further receives information related to loudness of sound around each of a plurality of terminal devices, the index calculator circuit calculates the easiness-of-communication index related to a given terminal device, based on information related to loudness of sound around the given terminal device and information related to loudness of sound around a further terminal device different from the given terminal device.

4. The management device according to claim 2, wherein
the receiver further receives position information on each of a plurality of terminal devices and information related to loudness of sound around each of the plurality of terminal devices, and the index calculator circuit identifies a terminal device for which the loudness of sound measured over a predetermined period of time until the current time is equal to or larger than a predetermined value, identifies an area within a predetermined distance from the identified terminal device as a high-noise area, and calculates the easiness-of-communication index, based on the position information on the terminal device and information on the high-noise area.

5. The management device according to claim 2, wherein
the receiver further receives a moving speed of the terminal device or position information on the terminal device for which it is possible to derive a moving speed, and the index calculator circuit uses, as the information related to the terminal device, the moving speed of the terminal device and calculates the easiness-of-communication index in accordance with whether the moving speed of the terminal device is included in a predetermined speed range.

6. A management device adapted to manage a terminal device, comprising:

an index calculator circuit that calculates, for the terminal device, an easiness-of-communication index indicating a degree to which a user using the terminal device recognizes communication, by using information related to the terminal device;

a receiver that receives communication request data of a first communication mode or a second communication mode from a first terminal device originating a call, the communication request data designating a second terminal device as a destination of the call; and a transmitter that transmits, when the receiver receives the communication request data of the second communication mode and the easiness-of-communication index of the second terminal device meets a predetermined condition, the communication request data of the first communication mode to the second terminal device, wherein the receiver further receives information related to loudness of sound around the terminal device, the index calculator circuit calculates the easiness-of-communication index by using, as the information related to the terminal device, the information related to the loudness of sound such that the larger the sound, the lower a value of the easiness-of-communication index, the transmitter determines that the predetermined condition is met when the easiness-of-communication index of the second terminal device is of a value less than a threshold value, and the first communication mode is a communication mode in which communication between the first terminal device and the second terminal device is started after a predetermined user operation is performed in the second terminal device, and the second communication mode is a communication mode in which communication between the first terminal device and the second terminal device is started even if the predetermined user operation is not performed in the second terminal device.

* * * * *